United States Patent
Kim et al.

(10) Patent No.: US 9,952,051 B2
(45) Date of Patent: Apr. 24, 2018

(54) ADVANCED DRIVER ASSISTANCE APPARATUS, DISPLAY APPARATUS FOR VEHICLE AND VEHICLE

(71) Applicant: LG ELECTRONICS INC., Seoul (KR)

(72) Inventors: Jeongsu Kim, Seoul (KR); Sanghyuk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/097,375

(22) Filed: Apr. 13, 2016

(65) Prior Publication Data

US 2017/0003134 A1     Jan. 5, 2017

(30) Foreign Application Priority Data

Jun. 30, 2015  (KR) .................. 10-2015-0093398

(51) Int. Cl.
*G01C 21/26* (2006.01)
*G01C 21/36* (2006.01)
(Continued)

(52) U.S. Cl.
CPC .............. *G01C 21/26* (2013.01); *B60R 1/00* (2013.01); *B60T 7/12* (2013.01); *G01C 21/3602* (2013.01);
(Continued)

(58) Field of Classification Search
CPC ...... G01C 21/26; G01C 21/3602; B60R 1/00; B60R 2300/802; G01S 19/13; G01S 19/48; B60T 7/12; G08G 1/056; G06K 9/00798; G06K 9/00791
See application file for complete search history.

(56) References Cited

U.S. PATENT DOCUMENTS

2010/0103040 A1*  4/2010  Broadbent .............. G01S 19/48
                                                           342/357.28
2010/0250133 A1    9/2010  Buros
(Continued)

FOREIGN PATENT DOCUMENTS

DE   102010042314   4/2012
JP      2005114535   4/2005
(Continued)

OTHER PUBLICATIONS

Extended European Search Report issued in European Application No. 16176097.0 dated Nov. 24, 2016, 9 pages.

*Primary Examiner* — Thomas Ingram
(74) *Attorney, Agent, or Firm* — Fish & Richardson P.C.

(57) ABSTRACT

A driver assistance apparatus includes an interface configured to receive first navigation information generated based on GPS information of the vehicle, a camera configured to acquire an image of a view ahead of the vehicle, and a processor. The processor is configured to detect an object in the acquired image of the view ahead of the vehicle, determine, based on the detected object, a driving situation of the vehicle, and determine whether the driving situation of the vehicle is consistent with the first navigation information. Based on a determination that the driving situation of the vehicle is not consistent with the first navigation information, the process generates, based on the driving situation of the vehicle, second navigation information of the vehicle, and provides the second navigation information to an output unit.

23 Claims, 66 Drawing Sheets

(51) Int. Cl.
    *G01S 19/48*     (2010.01)
    *G06K 9/00*      (2006.01)
    *B60R 1/00*      (2006.01)
    *B60T 7/12*      (2006.01)
    *G01S 19/13*     (2010.01)
    *G08G 1/056*     (2006.01)
    *G01S 19/39*     (2010.01)
(52) U.S. Cl.
    CPC ............ *G01S 19/13* (2013.01); *G01S 19/39* (2013.01); *G01S 19/48* (2013.01); *G06K 9/00791* (2013.01); *G06K 9/00798* (2013.01); *G08G 1/056* (2013.01); *B60R 2300/802* (2013.01)

(56) References Cited

U.S. PATENT DOCUMENTS

| | | |
|---|---|---|
| 2011/0077862 A1 | 3/2011 | Huang et al. |
| 2015/0049913 A1 | 2/2015 | Zhong |
| 2015/0073705 A1* | 3/2015 | Hiwatashi ............... G01S 19/48 701/468 |
| 2015/0160032 A1* | 6/2015 | Han ................... G01C 21/3658 701/117 |

FOREIGN PATENT DOCUMENTS

| | | |
|---|---|---|
| JP | 2007071539 | 3/2007 |
| JP | 2008181328 | 8/2008 |

* cited by examiner

ADVANCED DRIVER ASSISTANCE APPARATUS, DISPLAY APPARATUS FOR VEHICLE AND VEHICLE

CROSS-REFERENCE TO RELATED APPLICATION

This application claims the benefit of an earlier filing date and right of priority to Korean Patent Application No. 10-2015-0093398, filed on Jun. 30, 2015 in the Korean Intellectual Property Office, the disclosure of which is incorporated herein by reference.

TECHNICAL FIELD

The present disclosure relates to driver assistance for a vehicle.

BACKGROUND

A vehicle is a machine used for transporting people or goods. An example of a vehicle is a car.

A vehicle may include one or more display apparatuses. In some vehicles, a navigation function can be provided through the display apparatus installed in the vehicle.

SUMMARY

Systems and techniques are disclosed that enable a driver assistance apparatus including a display apparatus for a vehicle with a navigation function that uses information acquired through various sensors of the vehicle to provide navigation information to a driver.

In one aspect, a driver assistance apparatus may include an interface configured to receive first navigation information generated based on GPS information of the vehicle, and a camera configured to acquire an image of a view ahead of the vehicle. The driver assistance apparatus may also include a processor configured to detect an object in the acquired image of the view ahead of the vehicle, and determine, based on the object detected in the acquired image, a driving situation of the vehicle. The processor may also be configured to: determine whether the driving situation of the vehicle is consistent with the first navigation information that was generated based on the GPS information; and based on a determination that the driving situation of the vehicle is not consistent with the first navigation information, generate, based on the driving situation of the vehicle, second navigation information of the vehicle, and provide the second navigation information to an output unit.

In some implementations, the processor may be configured to determine the driving situation of the vehicle by: determining, based on the object detected in the image of the view ahead of the vehicle, information regarding at least one of a traffic signal, a surface of the road on which the vehicle is travelling, a structure located around the road, or a moving object; and determining the driving situation of the vehicle based on the determined information regarding at least one of the traffic signal, the surface of the road on which the vehicle is travelling, the structure located around the road, or the moving object.

In some implementations, the processor may be configured to determine that the driving situation of the vehicle is not consistent with the first navigation information by: determining that the first navigation information indicates that the vehicle is travelling on a first type of road; determining, based on the object detected in the acquired image, that the driving situation of the vehicle corresponds to the vehicle travelling on a second type of road; and determining that the second type of road is not consistent with the first type of road.

In some implementations, determining that the driving situation of the vehicle corresponds to the vehicle travelling on the second type of road may include detecting, in the acquired image, at least one of a traffic light, a pedestrian, a two-wheeled vehicle, a crosswalk, a curb, a road sign, a road surface, or a speed limit sign.

In some implementations, determining that the driving situation of the vehicle corresponds to the vehicle travelling on the second type of road may include detecting that the vehicle is travelling on an on-ramp entering a highway; and determining, based on detecting that the vehicle is travelling on the on-ramp entering the highway, that the driving situation of the vehicle corresponds to the vehicle travelling on a highway.

In some implementations, determining, based on the object detected in the acquired image, that the driving situation of the vehicle corresponds to the vehicle travelling on the second type of road may include: detecting that the vehicle is travelling on an off-ramp exiting a highway; and determining, based on detecting that the vehicle is travelling on the off-ramp exiting the highway, that the driving situation of the vehicle corresponds to the vehicle travelling on a local road.

In some implementations, the processor may be configured to determine that the driving situation of the vehicle is not consistent with the first navigation information by: determining, based on the object detected in the acquired image, that the driving situation of the vehicle corresponds to the vehicle travelling on a road with a second elevation that is different from a first elevation of a road indicated by the first navigation information.

In some implementations, the processor may be configured to determine that the driving situation of the vehicle corresponds to the vehicle travelling on the road with the second elevation by: detecting, in the acquired image, at least one of a traffic light, a pedestrian, a two-wheeled vehicle, a crosswalk, a curb, a pillar, a shadow, a road sign, or a road surface.

In some implementations, determining that the driving situation of the vehicle corresponds to the vehicle travelling on a road with a second elevation that is different from a first elevation of a road indicated by the first navigation information may include: detecting, based on the object detected in the acquired image, that the vehicle is travelling on an inclined road; and determining, based on the detection that the vehicle is travelling on an inclined road, that the driving situation of the vehicle corresponds to the vehicle travelling on the road with the second elevation that is different from the first elevation of the road indicated by the first navigation information.

In some implementations, the processor may be configured to determine that the driving situation of the vehicle is not consistent with the first navigation information by: determining, based on the first navigation information, that the vehicle is travelling on one of an outdoor road or a tunnel; and determining, based on the object detected in the acquired image, that the driving situation of the vehicle corresponds to the vehicle travelling on the other of the outdoor road or the tunnel.

In some implementations, determining that the driving situation of the vehicle corresponds to the vehicle travelling on the other of the outdoor road or the tunnel may include: detecting, in the acquired image, at least one of a traffic light, a pedestrian, a two-wheeled vehicle, a crosswalk, a curb, lighting provided to the underground roadway, a traffic sign indicating entry into the underground roadway, an overhead clearance sign, a structure constituting the underground roadway, a road sign, or a road surface.

In some implementations, determining that the driving situation of the vehicle corresponds to the vehicle travelling on the other of the outdoor road or the tunnel may include: determining that the first information has not been received; and based on the determination that first information has not been received, determining that the driving situation of the vehicle corresponds to the vehicle travelling in the tunnel.

In some implementations, the processor may be configured to determine that the driving situation of the vehicle is not consistent with the first navigation information by: determining a direction of travel of the vehicle; determining, based on the object detected in the acquired image, that the vehicle is travelling on a one-way road; and determining, based on the direction of travel of the vehicle and the determination that the vehicle is travelling on the one-way road, that the driving situation of the vehicle corresponds to a wrong-way driving situation.

In some implementations, determining that the vehicle is travelling on a one-way road may include detecting, in the acquired image, at least one of a traffic light, a traffic sign, a road surface, or a neighboring parked vehicle.

In some implementations, the processor may further be configured to, based on the determination that the driving situation of the vehicle corresponds to a wrong-way driving situation, provide a signal to perform an alarm output or a braking operation of the vehicle.

In some implementations, the processor may be configured to provide the second navigation information to an output unit by: determining that the first information has not been received; and providing, to the output unit and based on the determination that the first information has not been received, the second information.

In some implementations, the processor may be configured to generate second navigation information of the vehicle by: determining that the vehicle is traveling indoors; detecting, based on the determination that the vehicle is traveling indoors, a direction sign in the acquired image; and generating the second navigation information based on the direction sign detected in the acquired image.

In some implementations, the processor may be configured to generate second navigation information of the vehicle by: detecting that the vehicle has traveled from an indoor space to an outdoor space; detecting, in the acquired image, at least one of a road sign, a building, or a direction sign; and generating the second navigation information based on the detected at least one of the road sign, the building, or the direction sign.

In some implementations, a display apparatus for a vehicle may include a position information module configured to provide GPS information of the vehicle; and an interface configured to receive second navigation information indicating a position of the vehicle, the second navigation information being generated based on a driving situation of the vehicle determined from an image acquired of a view ahead of the vehicle. The display apparatus may also include a processor configured to determine whether the second navigation information has been received. Based on a determination that the second navigation information has been received, the processor may include the second navigation information in a map and provide a navigation function with the map including the second navigation information. Based on a determination that the second navigation information has not been received, the processor may generate first navigation information of the vehicle based on the GPS information received through the position information module, include the first navigation information in the map, and provide the navigation function with the map including the first navigation information.

In some implementations, the display apparatus may further include a display, and the processor may further be configured to determine whether the first navigation information or the second navigation information is included in the map. Based on a determination that the first navigation information is included in the map, the processor may display a first image corresponding to the first navigation information in a region of the display. Based on a determination that the first navigation information is included in the map, the processor may display a second image corresponding to the second navigation information in the region of the display.

In some implementations, the processor may be configured to determine that information applied to the map is changed from the first navigation information to the second navigation information; and based on the determination that the information applied to the map is changed from the first navigation information to the second navigation information, change a display of the first image to a display of the second image.

In some implementations, the processor may be configured to change a display of the first image to a display of the second image by displaying the first image to gradually become faint and displaying the second image to gradually become distinct over time.

In some implementations, the display apparatus may further include a display, and the processor may be configured to include the second navigation information in the map by: determining a location on the map based on the position of the vehicle indicated by the second navigation information; and displaying, on the display, the map including the position of the vehicle indicated by the second navigation information.

In some implementations, the processor may further be configured to display, on the display, a route generated based on the position of the vehicle indicated by the second navigation information.

In some implementations, the processor may further be configured to determine that the position of the vehicle indicated by the second navigation information is an indoor position.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Vehicles are often equipped with a navigation function that uses a display apparatus to guide a driver to a destination. However, a navigation function provided through a conventional display apparatus typically provides information based on data that is stored in memory or data that is received through a communication interface. In such scenarios, information to the driver that is provided by the navigation function may not be consistent with real-world driving scenarios.

Systems and techniques disclosed herein enable a display apparatus for a vehicle with a navigation function that uses information acquired through various sensors of the vehicle to more accurately provide navigation information to a driver.

In some implementations, a driver assistance apparatus provides a navigation function that determines position information of the vehicle based on analyzing a real-time image that has been acquired of the environment around the vehicle. Such real-time information may be used to supplement or replace other types of position information for the vehicle, for example, position information based on GPS data. The driver assistance apparatus may therefore provide more accurate navigation information to a driver.

A vehicle may include a car and a motorcycle, but implementations are not necessarily limited thereto, and may generally include any suitable vehicle that transports people. Hereinafter, a description will be given based on a car.

The vehicle may include an internal combustion engine vehicle having an engine as a power source, a hybrid vehicle having an engine and an electric motor as a power source, an electric vehicle having an electric motor as a power source, or generally a vehicle that is motorized by any suitable power source.

In the following description, the left side of a vehicle refers to the left side in a driving direction of the vehicle and the right side of the vehicle refers to the right side in the driving direction of the vehicle.

A left-hand drive (LHD) vehicle refers to a vehicle in which a driver's seat is located at the left side of the vehicle. A right-hand drive (RHD) vehicle refers to a vehicle in which a driver's seat is located at the right side of the vehicle. LHD vehicles are used in countries where vehicles travel on a right side of two-way traffic, and RHD vehicles are used in countries where vehicles travel on a left side of two-way traffic.

The following description is based on left hand drive (LHD) vehicles unless otherwise mentioned.

Figure 1:
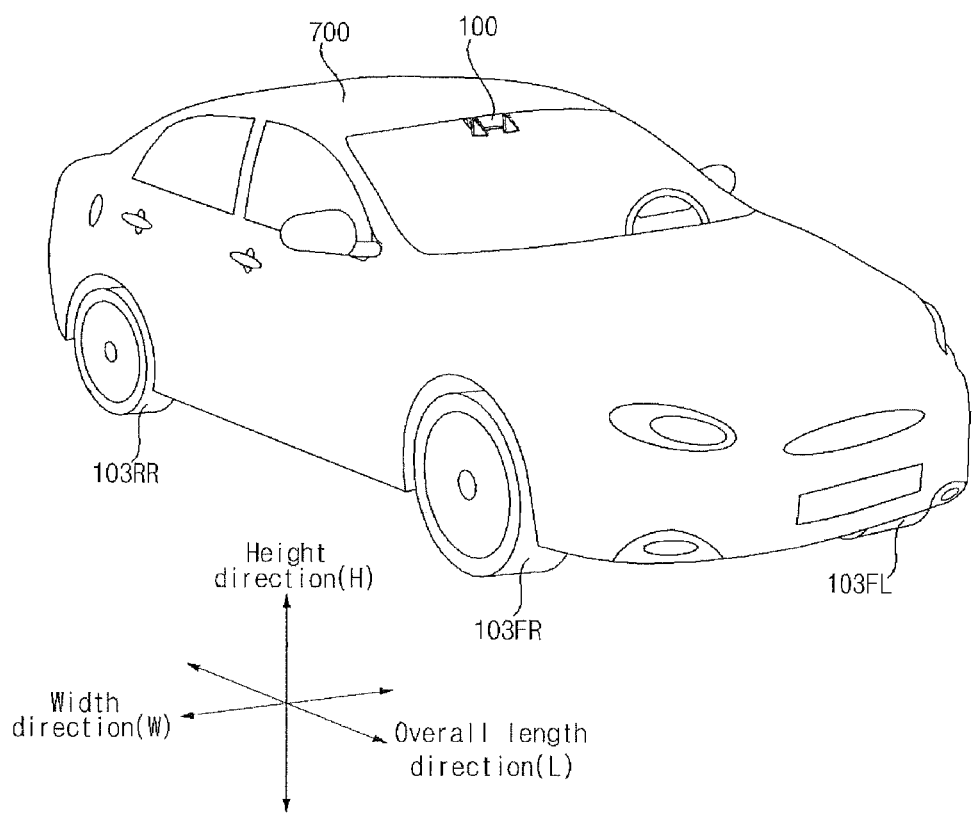
FIG. 1 is a diagram illustrating an example of an exterior of a vehicle including a display apparatus for a vehicle.

FIG. 1 shows the exterior of a vehicle including a display apparatus for a vehicle.

As shown, a vehicle 700 may include wheels 103FR, 103FL and 103RR rotating by a power source, a steering unit for steering the vehicle 700 and a driver assistance apparatus 100 for the vehicle, provided to the inside of the vehicle 700.

The driver assistance apparatus 100 may include at least one camera and an image acquired by the at least one camera may be processed into a signal in a processor.

FIG. 1 shows that the driver assistance apparatus 100 includes two cameras.

The overall length refers to the length between the front part and the rear part of the vehicle 700, the width refers to the width of the vehicle 700, and the height refers to the distance between the lower part of the wheel and the roof of the vehicle. In the following description, an overall length direction L may refer to a direction in which the overall length of the vehicle 700 is measured, a width direction W may refer to a direction in which the width of the vehicle 700 is measured, and a height direction H may refer to a direction in which the height of the vehicle 700 is measured.

Figure 2A:
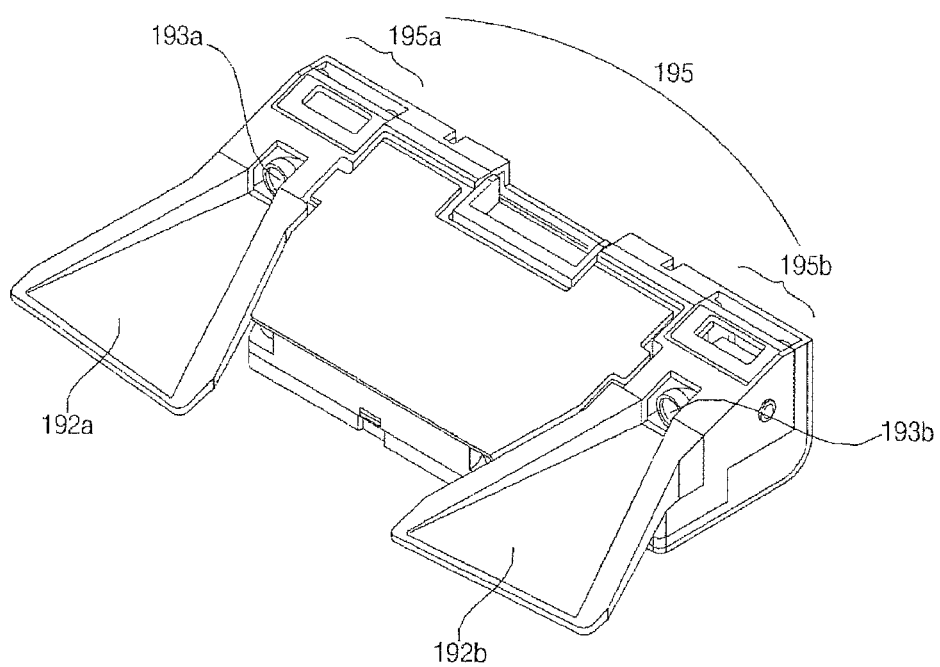
FIGS. 2A to 2C are diagrams illustrating examples of a driver assistance apparatus included in a vehicle according to some implementations.
Figure 2B:
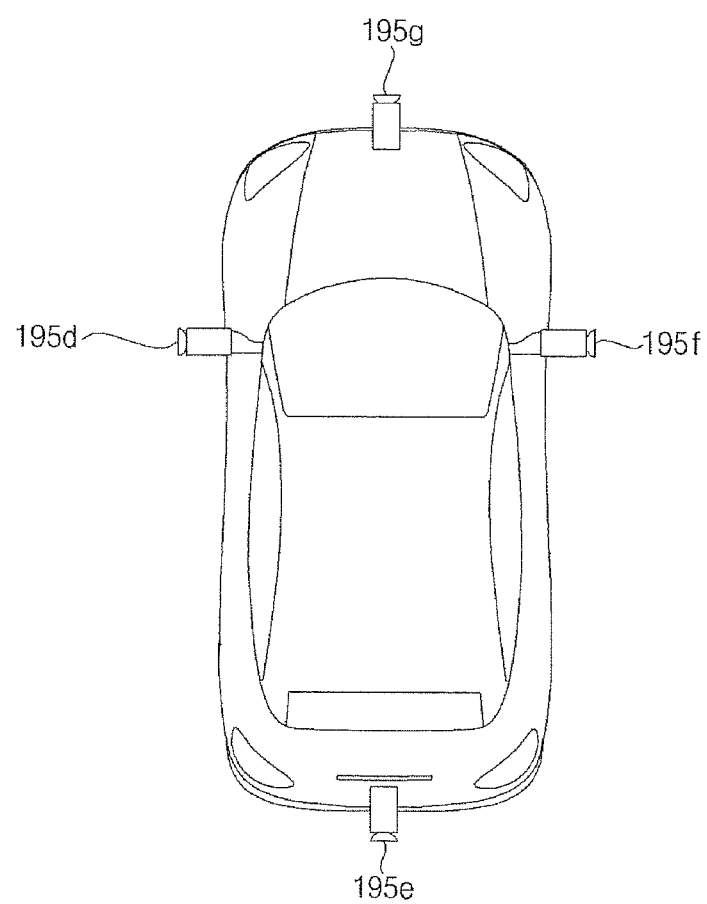
Figure 2C:
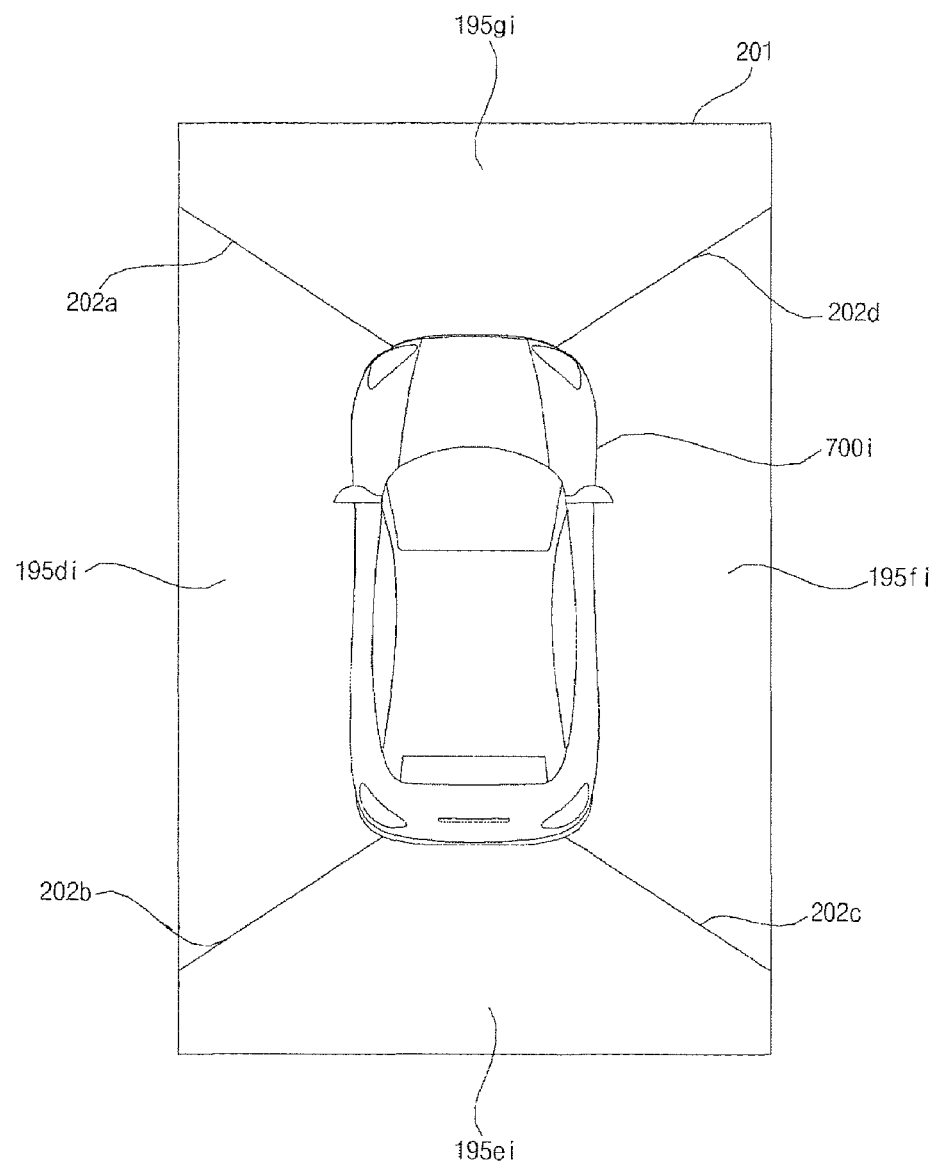

FIGS. 2A, 2B and 2C are views for explaining an example of a driver assistance apparatus (e.g., the driver assistance apparatus included in the vehicle shown in FIG. 1).

A description will be given of a driving assistance device including cameras 195a and 195b for acquiring a front view image of the vehicle.

While FIG. 2A shows that the driver assistance apparatus 100 includes two cameras, the number of cameras is not limited thereto.

As shown, the driver assistance apparatus 100 may include a first camera 195a having a first lens 193a and a second camera 195b having a second lens 193b. In this case, the camera 195 may be called a stereo camera.

In addition, the driver assistance apparatus 100 may include a first light shield 192a and a second light shield 192b for respectively shielding light input to the first lens 193a and the second lens 193b.

The driver assistance apparatus 100 may have a structure that can be attached/detached to/from the ceiling or windshield of the vehicle 700.

The driver assistance apparatus 100 can acquire stereo images of the area in front of the vehicle from the first and second cameras 195a and 195b, perform disparity detection on the basis of the stereo images, detect an object with respect to at least one stereo image on the basis of disparity information and continuously track movement of the object after detection of the object.

A description will be given of a driving assistance device including cameras 195d, 195e, 195f and 195g for acquiring an around view image of the vehicle with reference to FIGS. 2B and 2C.

While FIGS. 2B and 2C show that the driver assistance apparatus 100 includes four cameras, the number of cameras is not limited thereto.

As shown, the driver assistance apparatus 100 may include a plurality of cameras 195d, 195e, 195f and 195g. In this case, the camera 195 may be called an around view camera.

The plurality of cameras 195d, 195e, 195f and 195g may be arranged at the left, back, right and front of the vehicle. The left camera 195d may be provided to the inside of a case of a left side-view mirror. Otherwise, the left camera 195d may be provided to the outside of the case of the left side-view mirror. Alternatively, the left camera 195d may be provided to the left front door, the left rear door or a region of the outside of the left fender.

The right camera 195f may be provided to the inside of a case of a right side-view mirror. Otherwise, the right camera 195f may be provided to the outside of the case of the right side-view mirror. Alternatively, the right camera 195f may be provided to the right front door, the right rear door or a region of the outside of the right fender.

The rear camera 195e may be provided to the rear license plate or near the trunk switch of the vehicle. The front camera 195g may be positioned near the emblem or the radiator grill of the vehicle.

Images photographed by the plurality of cameras 195d, 195e, 195f and 195g are transmitted to a processor 170. The processor 170 can generate an around view image of the vehicle by combining the respective images.

FIG. 2C shows an exemplary around view image of the vehicle. The around view image 201 of the vehicle may include a first image region 195di captured by the left camera 195d, a second image region 195ei captured by the rear camera 195e, a third image region 195fi captured by the right camera 195f and a fourth image region 195gi captured by the front camera 195g.

The around view image 201 may be displayed as a top view image or a bird's eye image.

When the around view image is generated from the plurality of cameras, a boundary between image regions is generated. The boundary may be smoothly displayed through image blending.

In addition, boundary lines 202a, 202b, 202c and 202d may be displayed on the boundaries of the plurality of images.

The around view image 201 of the vehicle may include a vehicle image 700i. The vehicle image 700i may be an image generated by the processor 170.

The around view image 201 of the vehicle may be displayed through a display 741 of the vehicle or a display 180 of the driver assistance apparatus 100.

Figure 3A:
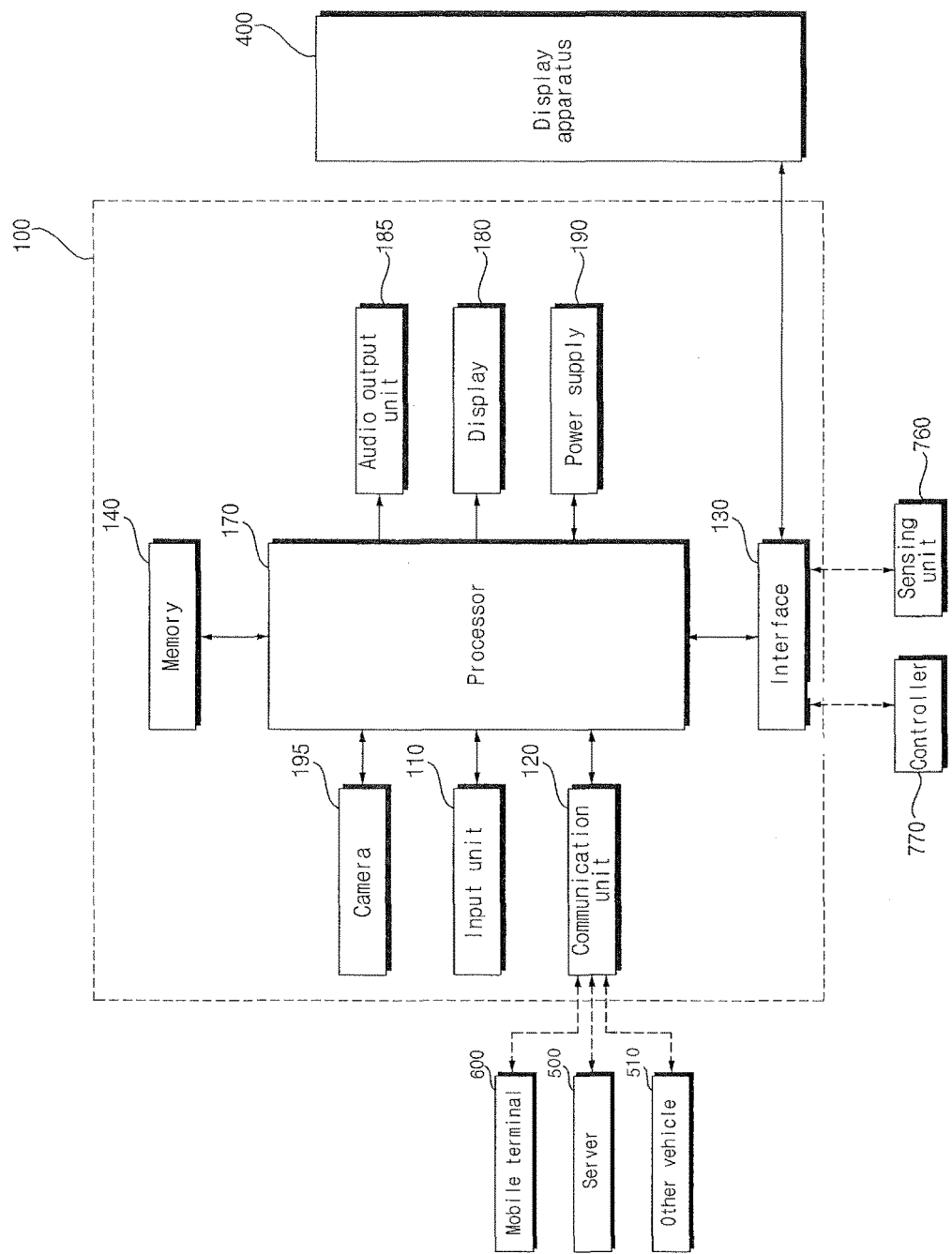
FIGS. 3A to 3C are block diagrams illustrating examples of a driver assistance apparatus according to some implementations.
Figure 3B:
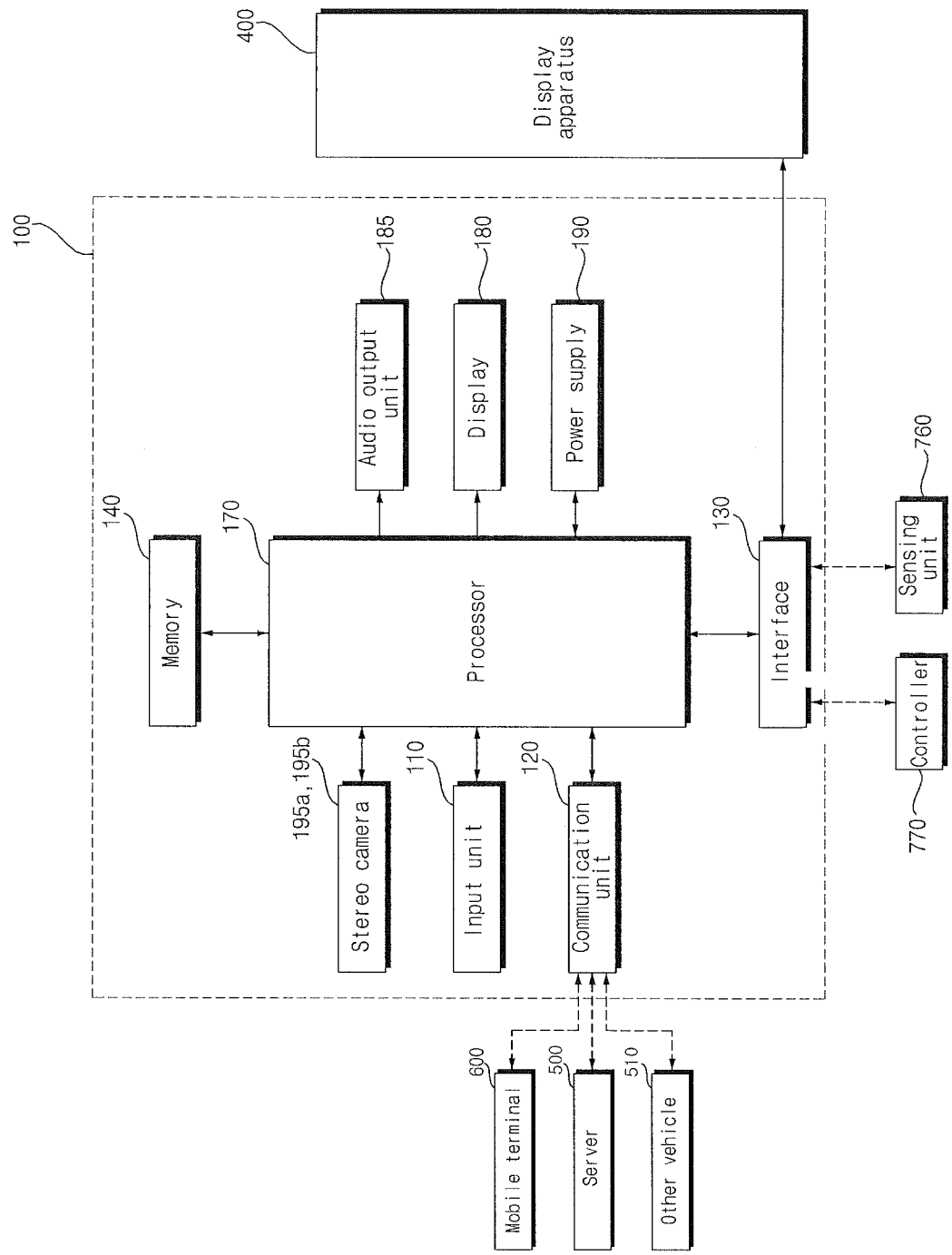
Figure 3C:
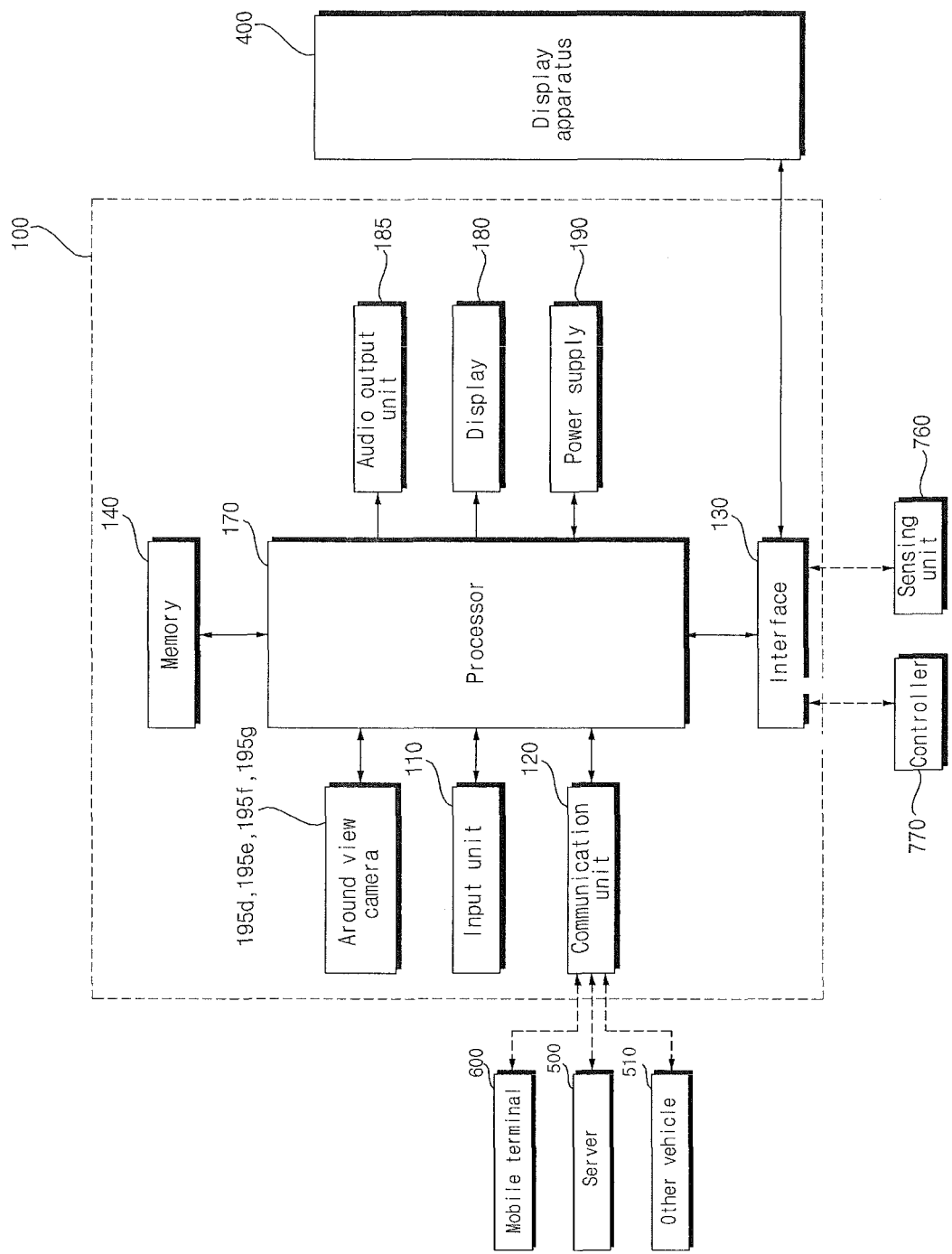

FIGS. 3A, 3B, and 3C are block diagrams of a driver assistance apparatus.

The driver assistance apparatus 100 shown in FIGS. 3A and 3B may process an image received from the camera 195 on the basis of computer vision so as to generate vehicle related information. Here, the vehicle related information may include vehicle control information for direct control of the vehicle or vehicle driving assistance information for providing driving guidance to a vehicle driver.

Here, the camera 195 may be a mono camera. Otherwise, the camera 197 may be the stereo cameras 195a and 195b for photographing a front view image of the vehicle. Alternatively, the camera 195 may be around view cameras 195d, 195e, 195f and 195g for photographing an around view image of the vehicle.

FIG. 3A is a block diagram of the driver assistance apparatus 100.

Referring to FIG. 3A, the driver assistance apparatus 100 may include an input unit 110, a communication unit 120, an interface 130, a memory 140, the processor 170, a power supply 190, the camera 195, the display 180 and an audio output unit 185.

The input unit 110 may include a plurality of buttons or a touchscreen attached to the driver assistance apparatus 100, particularly, the camera 195. It is possible to turn on and operate the driver assistance apparatus 100 through the plurality of buttons or the touchscreen. In addition, various input operations may be performed through the buttons or the touchscreen.

The communication unit 120 may exchange data with a mobile terminal 600, a server 500 or another vehicle 510 in a wireless manner. Particularly, the communication unit 120 may wirelessly exchange data with a mobile terminal of the vehicle driver. Various data communication schemes such as Bluetooth, Wi-Fi Direct, Wi-Fi, APiX and NFC may be employed as a wireless data communication scheme.

The communication unit 120 may receive various types of information from different components of the vehicle. For example, the communication unit 120 may receive weather information and traffic information, for example, TPEG (Transport Protocol Expert Group) information from the mobile terminal 600 or the server 500. The driver assistance apparatus 100 may transmit acquired real-time information to the mobile terminal 600 of the server 500.

When a user enters the vehicle, the mobile terminal 600 of the user and the driver assistance apparatus 100 may be paired automatically or according to execution of an application by the user.

The communication unit 120 may receive information on traffic light change from an external server 500. Here, the external server 500 may be a server located at a traffic control center.

The interface 130 may receive vehicle related data and transmit signals processed or generated in the processor 170 to the outside. To this end, the interface 130 may perform data communication with a controller 770 provided to the inside of the vehicle, a display apparatus 400 for the vehicle and a sensing unit 760 of the vehicle through a wired or wireless communication scheme.

The interface 130 may receive first information generated on the basis of GPS through data communication with the controller 770, the display apparatus 400 for the vehicle or a separate navigation system. The first information may include, for example, information regarding a set destination, route information depending on the destination, map information related to driving of the vehicle, and/or information on the current position of the vehicle. In addition, the first information may include information on the position of the vehicle on a road. In general, the first information may include any suitable location-related information that is derived from the GPS information of a vehicle.

The interface 130 may receive sensor information from the controller 770 or the sensing unit 760. Here, the sensor information may include at least one of vehicle direction information, vehicle position information (GPS information), vehicle heading information, vehicle speed information, vehicle acceleration information, vehicle inclination information, information on forward/reverse movement of the vehicle, battery information, fuel information, tire information, vehicle lamp information, vehicle internal temperature information and vehicle internal humidity information.

Such sensor information may be acquired from a heading sensor, a yaw sensor, a gyro sensor, a position module, a vehicle front/rear sensor, a wheel sensor, a speed sensor, a car body tilting sensor, a battery sensor, a fuel sensor, a tire sensor, a steering sensor, a vehicle internal temperature sensor, a vehicle internal humidity sensor and the like. The position module may include a GPS module for receiving GPS information.

From among the sensor information, the vehicle direction information, vehicle position information, vehicle heading information, vehicle speed information and vehicle inclination information, which are related to driving of the vehicle, may be called vehicle driving information.

The memory 140 may store various types of data for overall operation of the driver assistance apparatus 100, such as a program for processing or control of the processor 170.

The memory 140 may store data for object identification. For example, when a predetermined object is detected from an image acquired through the camera 195, the memory can store data for identifying the object according to a predetermined algorithm.

The memory 140 may store data regarding traffic information. For example, when predetermined traffic information is detected from an image acquired through the camera 195, the memory 140 can store data for identifying the traffic information according to a predetermined algorithm.

The memory 140 may be a storage device such as a ROM, a RAM, an EPROM, a flash drive and a hard drive.

The processor 170 controls overall operation of each unit of the driver assistance apparatus 100.

The processor 170 may process a front view image or an around view image of the vehicles, acquired through the camera 195. Particularly, the processor 170 performs computer vision based signal processing. Accordingly, the processor 170 can acquire a front view image or an around view image of the vehicle from the camera 195 and perform object detection and object tracking on the basis of the acquired image. Particularly, the processor 170 can perform lane detection (LD), vehicle detection (VD), pedestrian detection (PD), bright spot detection (BD), traffic sign recognition (TSR), road surface detection and the like during object detection.

The processor may detect an object in the image of the view ahead of the vehicle. For example, the object may be a traffic signal provision unit, road surface indication, a structure located around a road, or a moving object on or around the road, etc.

As a particular example, if the object is a traffic signal provision unit, then the object may include a traffic light, a traffic sign, or a traffic electronic signboard, etc.

As another example, road surface indication may include lane information, velocity information, road information, direction information, a crosswalk, a stop line and direction change information (e.g., go straight, left turn, right turn, U-turn and the like), which are indicated on a road surface.

As yet another example, the structure located around a road may include a curb, a streetlamp, a street tree, a pillar, a guard rail, a structure (e.g., ceiling or wall) constituting an underground road and lighting provided to the underground road.

As a further example, the moving object may be a pedestrian, a two-wheeled vehicle or other vehicles.

Based on the object that is detected in the image, the processor may detect a driving situation of the vehicle, such as a type of road on which the vehicle is currently traveling or expected to travel, and/or information about the vehicle's movement on the road.

As an example, the processor 170 may detect a road on which the vehicle is traveling on the basis of the detected object. The processor 170 may check whether the vehicle 700 is traveling on an expressway or a general national road on the basis of the detected object.

If the vehicle 700 travels on a general national road near an expressway or on an expressway near a general national road, the processor 170 can detect the expressway or the general national road on the basis of the detected object.

For example, the processor 170 can detect the general national road as the road on which the vehicle 700 is traveling when at least one of a traffic light, a pedestrian, a two-wheeled vehicle, a crosswalk and a curb that separates a roadway from a sidewalk is detected from an acquired image because a traffic light, a pedestrian, a two-wheeled vehicle, a crosswalk and a curb are not detected from expressways.

The processor 170 can detect the expressway as the road on which the vehicle is traveling when a traffic light, a pedestrian, a two-wheeled vehicle, a crosswalk and a curb that separates a roadway from a sidewalk are not detected from the acquired image.

For example, the processor 170 can detect the expressway or the general national road on the basis of information indicated on at least one of a road sign, a road surface and a speed limit sign from the acquired image. Here, the road sign, the road surface and the speed limit sign may display information suitable for the expressway or the general national road. That is, a road sign, a road surface and a speed limit sign of the expressway may display information different from that displayed on a road sign, a road surface and a speed limit sign of the general national road.

For example, the processor 170 can detect an image of an intersection of the expressway or the general national road from the acquired image. The processor 170 can detect the expressway or the general national road by tracking the intersection and determining the direction of the vehicle 700 at the intersection.

The processor 170 may check whether the road on which vehicle 700 is traveling is a high-level road or a general road on the basis of the detected object.

When the vehicle 700 travels on a general road near a high-level road or on a high-level road near a general road, the processor 170 may detect the general road or the high-level road on the basis of the detected object.

For example, the processor 170 can detect the general road as the road on which the vehicle 700 is traveling when at least one of a traffic light, a pedestrian, a two-wheeled vehicle, a crosswalk, a curb that separates a roadway from a sidewalk, a pillar supporting the high-level road and a shadow of the high-level road is detected from the acquired image since a traffic light, a pedestrian, a two-wheeled vehicle, a crosswalk, a curb that separates a roadway from a sidewalk, a pillar supporting a high-level road and a shadow of the high-level road are not detected from high-level roads.

The processor 170 can detect the high-level road as the road on which the vehicle is traveling when a traffic light, a pedestrian, a two-wheeled vehicle, a crosswalk, a curb that separates a roadway from a sidewalk, a pillar supporting the high-level road and a shadow of the high-level road are not detected from the acquired image.

For example, the processor 170 can detect the high-level road or the general road from the acquired image on the basis of information indicated on at least one of a road sign, a road surface and a speed limit sign. Here, the road sign and the road surface may display information suitable for the high-level road or the general road. That is, a road sign and a road surface of the high-level road may display information different from that displayed on a road sign and a road surface of the general road.

For example, the processor 170 can detect an image of an intersection of the high-level road or the general road from the acquired image. The processor 170 can detect the high-level road or the general road by tracking the intersection and determining the direction of the vehicle 700 at the intersection.

The processor 170 may check whether the road on which the vehicle 700 is traveling is an underground roadway or a general road on the basis of the detected object.

When the vehicle 700 travels on a general road near an underground roadway or on an underground roadway near a general road, the processor 170 may detect the underground roadway or the general road on the basis of the detected object.

For example, the processor 170 can detect the general road as the road on which the vehicle 700 is traveling when at least one of a traffic light, a pedestrian, a two-wheeled vehicle, a crosswalk and a curb that separates a roadway from a sidewalk is detected from the acquired image since a traffic light, a pedestrian, a two-wheeled vehicle, a crosswalk and a curb that separates a roadway from a sidewalk are not detected from underground roadways.

The processor 170 can detect the underground roadway as the road on which the vehicle is traveling when a traffic light, a pedestrian, a two-wheeled vehicle, a crosswalk and a curb that separates a roadway from a sidewalk are not detected from the acquired image. When at least one of lighting provided to the underground roadway, a traffic sign indicating entry into the underground roadway and a sign indicating overhead clearance is detected from the acquired image, the processor 170 may detect the underground roadway as the road on which the vehicle 700 is traveling since the lighting provided to the underground roadway, the traffic sign indicating entry into the underground roadway and the sign indicating overhead clearance are detected only when the vehicle 700 is traveling on the underground roadway.

For example, the processor 170 can detect the underground roadway or the general road from the acquired image on the basis of information indicated on at least one of a road sign and a road surface. Here, the road sign and the road surface may display information suitable for the underground roadway or the general road. That is, a road sign and a road surface of the underground roadway may display information different from that displayed on a road sign and a road surface of the general road.

For example, the processor 170 can detect an image of an intersection of the underground roadway or the general road from the acquired image. The processor 170 can detect the underground roadway or the general road by tracking the intersection and determining the direction of the vehicle 700 at the intersection.

The processor 170 may determine whether the vehicle 700 is traveling on the underground roadway or the general road on the basis of whether the first information generated on the basis of GPS information is not received through the interface 130 since GPS information cannot be acquired when the vehicle 700 is traveling on the underground roadway.

The processor 170 may detect a driving situation on the basis of the detected object. As an example, the processor 170 may detect an expressway traveling situation on the basis of the detected object.

For example, the processor 170 can detect a situation in which the vehicle is traveling on a ramp from the acquired image. If at least one of a traffic sign indicating entry into a ramp and a junction of a ramp or a main road is detected from the acquired image, the processor 170 can detect an expressway traveling situation on the basis of the ramp-traveling situation.

The processor 170 may detect an uphill road traveling situation on the basis of the acquired image or sensing information received from the sensing unit 760. The processor 170 may detect an expressway traveling situation on the basis of the uphill road traveling situation.

For example, the processor 170 can generate a depth map on the basis of a pre-processed stereo image. The processor 170 can profile a road surface on the basis of the depth map. The processor 170 can determine whether a front road is an uphill road or a downhill road on the basis of the profiled road surface. When the profiled road surface can provide height on the Y-Z plane and the road surface is extended to a predetermined distance or more toward the positive direction of the Y-axis at a predetermined angle, the processor 170 can determine that the front road is an uphill road. If the road surface is extended to a predetermined distance or more toward the negative direction of the Y-axis at a predetermined angle, the processor 170 can determine that the front road is a downhill road. The processor 170 may determine the gradient of an uphill road or a downhill road by profiling a road surface. That is, the processor 170 may determine the gradient of an uphill road or a downhill road on the basis of the length of the road surface on the Z-axis and the length of the road surface on the Y-axis.

For example, the processor 170 can detect a lane from a stereo image. The processor 170 can determine whether a front road is an uphill road or a downhill road on the basis of the detected lane. When the lane is extended toward the positive direction of the Y-axis at a predetermined angle, the processor 170 can determine that the front road is an uphill road. When the lane is extended toward the negative direction of the Y-axis at a predetermined angle, the processor 170 can determine that the front road is a downhill road. The processor 170 may determine the gradient of an uphill road or a downhill road on the basis of the lane. That is, the processor 170 may determine the gradient of an uphill road or a downhill road on the basis of the length of the lane on the Z-axis and the length of the lane on the Y-axis.

For example, the processor 170 can detect a plurality of fixed objects near a road from a stereo image. Here, the objects may be streetlamps, street trees or telephone poles. The processor 170 may determine whether a front road is an uphill road or a downhill road by tracking positions, relative movement or sizes of objects continuously arranged along a road. When a plurality of streetlamps having the same size is arranged along one side of a road, the processor 170 can calculate distances between the vehicle and the streetlamps through disparity calculation. Here, the processor 170 can determine whether the front road is an uphill road or a downhill road by comparing distances to first and second streetlamps, from among the plurality of streetlamps, on the Z-axis and distances to the first and second streetlamps on the Y-axis. In addition, the processor 170 can determine the gradient of an uphill road or a downhill road on the basis of the plurality of objects. That is, the processor 170 can determine the gradient of an uphill road or a downhill road on the basis of distances to the first and second streetlamps on the Z-axis and the Y-axis.

For example, the processor 170 can determine an uphill road or a downhill road on the basis of a vanishing point indicated on a stereo image. When the vanishing point is located above a reference line in the stereo image, the processor 170 can determine that the front road is an uphill road. When the vanishing point is located below the reference line in the stereo image, the processor 170 can determine that the front road is a downhill road.

For example, the processor 170 can determine an uphill road or a downhill road on the basis of data sensed by a tilt sensor included in the sensing unit 760.

When the vehicle 700 travels the wrong way on a one-way road, the processor 170 may detect a wrong-way driving situation of the vehicle 700 on the one-way road on the basis of a detected object.

There is a case in which information provided by the navigation system indicates a general road that is actually a one-way road. In this case, when the vehicle enters the one-way road in a reverse direction according to the navigation information and travels on the one-way road, the processor 170 can detect a wrong-way traveling situation of the vehicle 700 on the one-way road on the basis of the detected object.

For example, the processor 170 can detect a wrong-way traveling situation from the acquired image on the basis of one of a traffic light, a traffic sign, a road surface and a neighboring parked vehicle.

When the wrong-way traveling situation is detected, the processor 170 may provide a signal for outputting an alarm to the controller 770 through the interface 130. In this case, the controller 770 can output the alarm through the output unit 740 according to the received signal.

When the wrong-way traveling situation is detected, the processor 170 may provide a signal for braking to the controller 770 through the interface 130. In this case, the controller 770 can control a vehicle driving unit 750 to stop the vehicle according to the received signal.

The processor 170 may receive the first information from the display apparatus 400 for the vehicle through the interface 130. Here, the first information may be position information of the vehicle 700, which is generated on the basis of GPS information.

If the first information is not received or is determined to be insufficient or inaccurate, then the processor 170 can provide second information to the display apparatus 400 through the interface 130. Here, the second information may be position information of the vehicle 700, which is generated on the basis of an acquired image.

When the vehicle 700 is traveling indoors, the first information based on GPS information may not be received. In this case, the processor 170 can provide the second information generated on the basis of a direction sign detected from the acquired image.

When the vehicle 700 is moved from an indoor space to the outside, the GPS based first information can be received after a lapse of predetermined time from when the vehicle 700 is moved to the outside. In this case, the processor 170 can provide the second information generated on the basis of at least one of a road sign, a building, and a direction sign detected from the acquired image when the first information is not received. In general, other features of the environment around the vehicle may be detected from the acquired image to generate the second information.

The processor 170 may determine whether the detected driving situation corresponds to the first information. Here, the first information may be position information of the vehicle 700, generated on the basis of GPS information. The processor 170 may receive the first information from the display apparatus 400 for the vehicle through the interface 130.

When the detected driving situation does not correspond to the first information, the processor 170 can provide the second information generated on the basis of the detected driving situation. Here, the second information may be position information of the vehicle 700, which is generated on the basis of the acquired image. The processor 170 can provide the second information to the display apparatus 400 through the interface 130.

In some implementations, the processor 170 may compare the detected information with stored information to identify the information.

In addition, in some scenarios, the processor 170 may control zoom of the camera 195. For example, the processor 170 can control zoom of the camera 195 depending on an object detection result. When a road sign is detected but the sign thereon is not detected, the processor 170 can control the camera 195 to zoom in.

Furthermore, the processor 170 may receive weather information and traffic condition information on roads, for example, TPEG (Transport Protocol Expert Group) information through the communication unit 120.

The processor 170 may recognize information on traffic conditions around the vehicle, detected by the driver assistance apparatus 100 on the basis of an image.

The processor 170 may receive navigation information and the like from the display apparatus 400 for the vehicle or a separate navigation system (not shown) through the interface 130.

The processor 170 may receive sensor information from the controller 770 or the sensing unit 760 through the interface 130. Here, the sensor information may include at least one of vehicle direction information, vehicle location information (GPS information), vehicle heading information, vehicle speed information, vehicle acceleration information, vehicle inclination information, vehicle advance/reverse movement information, battery information, fuel information, tire information, vehicle lamp information, vehicle internal temperature information, vehicle internal humidity information and steering wheel rotation information.

The processor 170 may receive the first information, generated on the basis of GPS, from the controller 770, the display apparatus 400 or a separate navigation system (not shown) through the interface 130.

The processor 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and other electrical units for executing the corresponding functions.

The processor 170 may be controlled by the controller 770.

The display 180 may display information processed by the processor 170. The display 180 may display images related to operation of the driver assistance apparatus 100. For such image display, the display 180 may include a cluster or an HUD (Heads-Up Display) provided to the front part of the inside of the vehicle. When the display 180 is an HUD, a projection module for projecting images may be provided to the windshield glass of the vehicle 700. The display 180 may include a transparent display. In this case, the transparent display may be attached to the windshield.

The audio output unit 185 may output sound on the basis of an audio signal processed by the processor 170. To this end, the audio output unit 185 may include at least one speaker.

An audio input unit (not shown) may receive user voice. To this end, the audio input unit may include a microphone. The received voice may be converted into an electrical signal and transmitted to the processor 170.

The power supply 190 may supply power necessary for operations of the components under control of the processor 170. The power supply 190 may be provided with power from a battery of the vehicle.

The camera 195 acquires a front view image or an around view image of the vehicle. The camera 195 may be a mono camera or stereo cameras 195a and 195b for photographing a front view image of the vehicle. The camera 195 may be around view cameras 195d, 195e, 195f and 195g for photographing an around view image of the vehicle.

The camera 195 may include an image sensor (e.g., CMOS or CCD) and an image processing module. The camera 195 may process a still image or video acquired by the image sensor. The image processing module may process the still image or video acquired through the image sensor. The image processing module may be configured separately from the processor 170 or integrated with the processor 170 according to some implementations.

A zoom of the camera 195 may be set under the control of the processor 170. For example, a zoom barrel (not shown) included in the camera 195 is moved to set a zoom under the control of the processor 170.

A focus of the camera 195 may be set under the control of the processor 170. For example, a focus barrel (not shown) included in the camera 195 is moved to set a focus under the control of the processor 170. A focus may be automatically set on the basis of zoom setting. The processor 170 may automatically control focus in response to zoom control of the camera 195.

FIG. 3B is a block diagram of the driver assistance apparatus 100 according to another implementation.

Referring to FIG. 3B, the driver assistance apparatus 100 differs from the driver assistance apparatus 100 of FIG. 3a in that the former includes the stereo cameras 195a and 195b. The following description is based on such difference.

The driver assistance apparatus 100 may include the first and second cameras 195a and 195b. Here, the first and second cameras 195a and 195b can be called stereo cameras. The stereo cameras 195a and 195b may be attached/detached to/from the ceiling or windshield of the vehicle 700. The stereo cameras 195a and 195b may include a first lens 193a and a second lens 193b.

In addition, the stereo cameras 195a and 195b may include a first light shield 192a and a second light shield 192b for respectively shielding light input to the first lens 193a and the second lens 193b.

The first camera 195a acquires a first front view image of the vehicle and the second camera 195b acquires a second front view image of the vehicle. The second camera 195b is spaced apart from the first camera 195a by a predetermined distance. Since the first and second cameras 195a and 195b are spaced apart from each other, a disparity is generated and thus distances between the first and second cameras 195*a* and 195*b* and an object according to the disparity can be detected.

When the driver assistance apparatus 100 includes the stereo cameras 195*a* and 195*b*, the processor 170 performs computer vision based signal processing. Accordingly, the processor 170 can acquire stereo images of the front view of the vehicle from the stereo cameras 195*a* and 195*b*, calculate a disparity with respect to the front view of the vehicle on the basis of the stereo images, perform object detection for at least one of the stereo images on the basis of the calculated disparity, detect an object and continuously track movement of the detected object. Here, the stereo images are based on the first image received from the first camera 195*a* and the second image received from the second camera 195*b*.

Particularly, the processor 170 may perform lane detection (LD), vehicle detection (VD), pedestrian detection (PD), bright spot detection (BD), traffic sign recognition (TSR), road surface detection and the like during object detection.

In addition, the processor 170 may perform calculation of a distance to a detected neighboring vehicle, calculation of the speed of the detected vehicle, calculation of a speed difference between the corresponding vehicle 700 and the detected vehicle and the like.

The processor 170 may individually control zoom of the first and second cameras 195*a* and 195*b*. The processor 170 may periodically change the zoom ratio of the second camera 195*b* while fixing the zoom of the first camera 195*a*. The processor 170 may periodically change the zoom ratio of the first camera 195*a* while fixing the zoom of the second camera 195*b*.

The processor 170 may control the first or second camera 195*a* or 195*b* to periodically zoom in or zoom out.

The processor 170 may set the zoom of the first camera 195*a* to high magnification for object detection at a long distance. In addition, the processor 170 may set the zoom of the second camera 195*b* to low magnification for object detection at a short distance. Here, the processor 170 may control the first camera 195*a* to zoom in and control the second camera 195*b* to zoom out.

Conversely, the processor 170 may set the zoom of the first camera 195*a* to low magnification for object detection at a short distance. In addition, the processor 170 may set the zoom of the second camera 195*b* to high magnification for object detection at a long distance. Here, the processor 170 may control the first camera 195*a* to zoom out and control the second camera 195*b* to zoom in.

For example, the processor 170 can control the zoom of the first camera 195*a* or the second camera 195*b* depending on an object detection result. When a road sign is detected but the sign thereon is not detected, the processor 170 can control the first camera 195*a* or the second camera 195*b* to zoom in.

The processor 170 may automatically control focus in response to zoom control of the camera 195.

FIG. 3C is a block diagram of the driver assistance apparatus 100 according to yet another implementation.

Referring to FIG. 3C, the driver assistance apparatus 100 differs from the vehicle driving assistance device 100 of FIG. 3A in that the former includes around view cameras 195*d*, 195*e*, 195*f* and 195*g*. The following description is based on such difference.

The driver assistance apparatus 100 may include the around view cameras 195*d*, 195*e*, 195*f* and 195*g*. The around view cameras 195*d*, 195*e*, 195*f* and 195*g* may respectively include lenses and light shields for shielding light input to the lenses. The around view cameras 195*d*, 195*e*, 195*f* and 195*g* may include a left camera 195*d*, a rear camera 195*e*, a right camera 195*f* and a front camera 195*g*. The left camera 195*d* acquires a left-side view image of the vehicle and the rear camera 195*e* acquires a rear view image of the vehicle. The right camera 195*f* acquires a right-side view image of the vehicle and the front camera 195*g* acquires a front view image of the vehicle.

The images acquired through the around view cameras 195*d*, 195*e*, 195*f* and 195*g* are transmitted to the processor 170. The processor 170 may generate an around view image of the vehicle by combining the left-side view image, rear view image, right-side view image and front view image of the vehicle. Here, the around view image of the vehicle may be a top view image or a bird's eye view image. The processor 170 may generate the around view image by respectively receiving the left-side view image, rear view image, right-side view image and front view image of the vehicle, combining the received images and converting the combined images into a top view image.

The processor 170 may detect an object on the basis of the around view image of the vehicle. Particularly, the processor 170 may perform lane detection (LD), vehicle detection (VD), pedestrian detection (PD), bright spot detection (BD), traffic sign recognition (TSR), road surface detection and the like during object detection.

Furthermore, the processor 170 may individually control zoom of the around view cameras 195*d*, 195*e*, 195*f* and 195*g*. Zoom control of the processor 170 may be performed in the same manner as that with respect to the stereo cameras, described with reference to FIG. 3B.

Figure 4A:
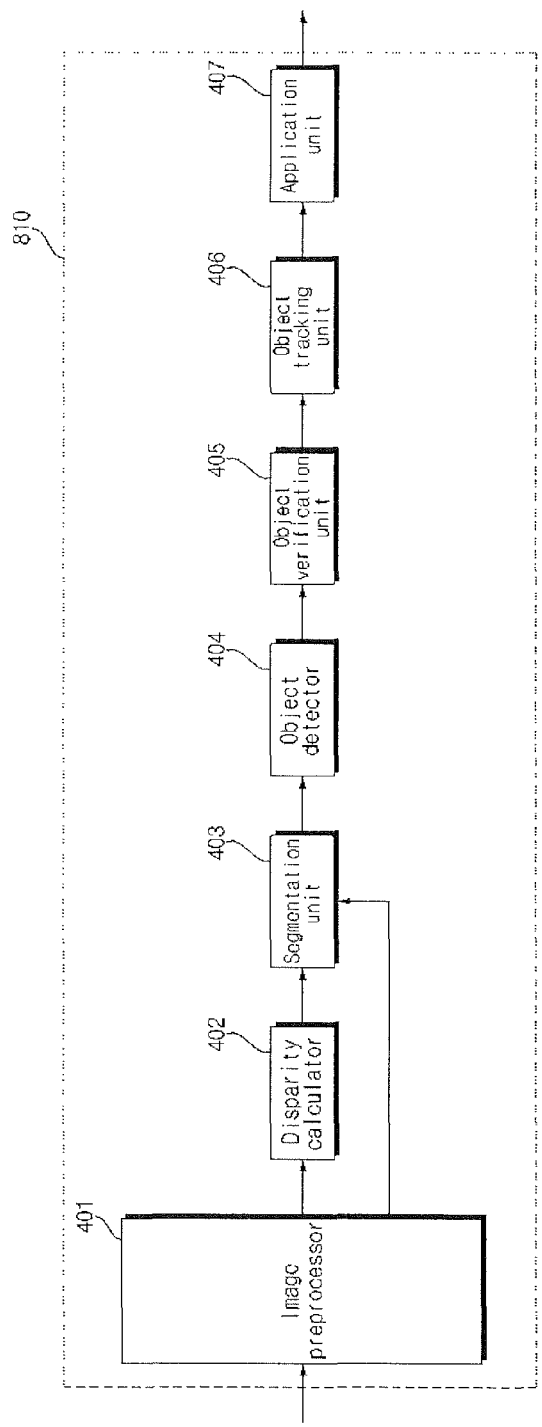
FIGS. 4A and 4B are block diagrams illustrating examples of processors that may be used in a driver assistance apparatus.
Figure 4B:
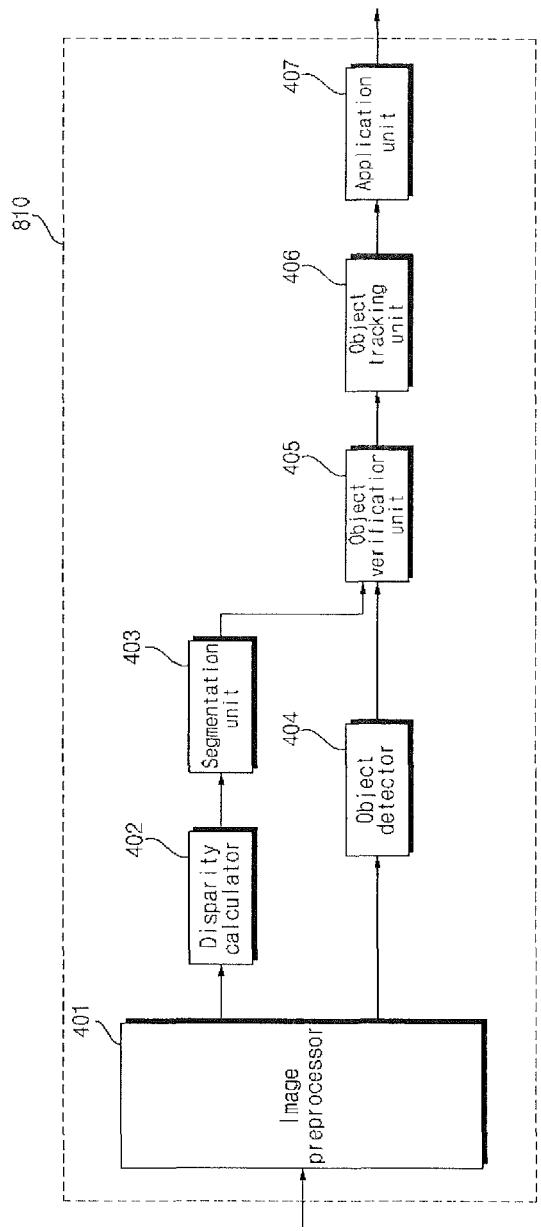

FIGS. 4A and 4B are block diagrams of the processor shown in FIGS. 3A, 3B and 3C and FIGS. 5A and 5B are views for explaining operation of the processor shown in FIGS. 4A and 4B.

Referring to FIG. 4A, the processor 170 included in the driver assistance apparatus 100 may include an image preprocessor 401, a disparity calculator 402, an object detector 404, an object tracking unit 406, and an application unit 407.

The image preprocessor 401 may receive an image from the camera 195 and preprocess the image. Specifically, the image preprocessor 401 may perform noise reduction, rectification, calibration, color enhancement, color space conversion (CSC), interpolation, camera gain control and the like on an image. Accordingly, a clearer image than stereo images photographed by the camera 195 can be acquired.

The disparity calculator 402 may receive the image processed by the image preprocessor 401, perform stereo matching on the received image and acquire a disparity map according to stereo matching. That is, the disparity calculator 402 can acquire disparity information about stereo images of the front view of the vehicle.

Here, stereo matching can be performed per pixel of the stereo images or on a block by block basis. The disparity map refers to a map that represents binocular parallax information of stereo images, that is, left and right images, as numerical values.

A segmentation unit 403 may perform segmentation and clustering on at least one image on the basis of the disparity information from the disparity calculator 402. Specifically, the segmentation unit 403 may separate a background and a foreground from at least one of the stereo images on the basis of the disparity information.

For example, the segmentation unit 403 can calculate a region corresponding to disparity information less than a predetermined value in the disparity map as a background and remove the corresponding region. Accordingly, a foreground can be relatively separated.

Alternatively, the segmentation unit 403 can calculate a region corresponding to disparity information that exceeds the predetermined value in the disparity map as a foreground and extract the corresponding region, thereby separating the foreground.

When the foreground and the background are separated on the basis of the disparity information extracted based on the stereo images, a signal processing speed can be increased and the quantity of processed signals can be reduced during object detection.

The object detector 404 may detect an object on the basis of image segmentation of the segmentation unit 403. That is, the object detector 404 may detect an object from at least one image on the basis of the disparity information.

Specifically, the object detector 404 may detect an object from at least one image. For example, the object detector 404 can detect an object from a foreground separated according to image segmentation.

An object verification unit 405 may classify and verify the detected object. To this end, the object verification unit 405 may use an identification method using a neural network, a support vector machine (SVM) method, an identification method according to AdaBoost using Haar-like characteristics, histograms of oriented gradients (HOG) or the like.

The object verification unit 405 may verify the detected object by comparing the detected object with objects stored in the memory 140. For example, the object verification unit 405 can verify vehicles, lanes, road surfaces, road signs, danger areas, tunnels and the like, located around the corresponding vehicle.

The object tracking unit 406 may track the verified object. For example, the object tracking unit 406 can verify an object included in sequentially acquired stereo images, calculate motion or a motion vector of the verified object and track movement of the object on the basis of the calculated motion or motion vector. Accordingly, the object tracking unit 406 can track vehicles, lanes, road surfaces, road signs, danger zones, tunnels and like around the corresponding vehicle.

The application unit 407 may calculate a degree of car accident risk of the vehicle 700 on the basis of various objects around the vehicle, for example, other vehicles, lanes, road surfaces, road signs and the like. In addition, the application unit 407 may calculate possibility of rear-end collision, slip of the vehicle and the like.

Furthermore, the application unit 407 may output messages for informing the user of the information on the calculated hazard, rear-end collision possibility or vehicle slip as vehicle driving assistance information on the basis of the calculated hazard, rear-end collision possibility or vehicle slip. In addition, the application unit 407 may generate a control signal for attitude control or driving control of the vehicle 700 as vehicle control information.

Figure 7:
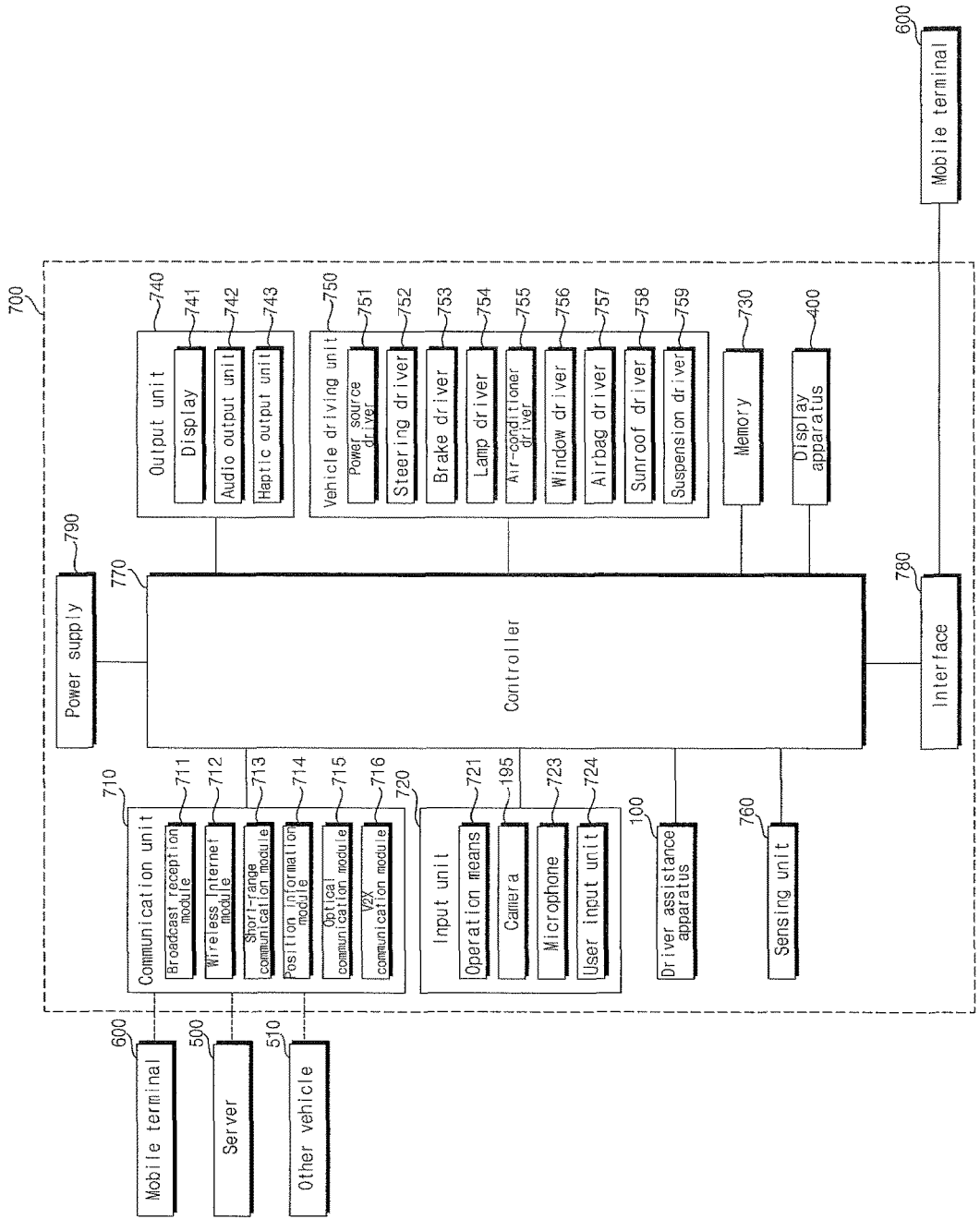
FIG. 7 is an internal block diagram illustrating an example of a vehicle with a driver assistance apparatus.

The image preprocessor 401, the disparity calculator 402, the segmentation unit 403, the object detector 404, the object verification unit 405, the object tracking unit 406 and the application unit 407 may be internal components of an image processing unit 810 in the processor 170 in FIG. 7 and the following figures.

The processor 170 may include part of the image preprocessor 401, the disparity calculator 402, the segmentation unit 403, the object detector 404, the object verification unit 405, the object tracking unit 406 and the application unit 407 according to an implementation. When the camera 195 is configured as a mono camera or around view cameras, the disparity calculator 402 may be excluded according to an implementation. Furthermore, the segmentation unit 403 may be excluded according to an implementation.

FIG. 4B is a block diagram of the processor according to another implementation.

As shown, the processor 170 of FIG. 4B has the same internal component units as the processor 170 of FIG. 4A but differs from the processor 170 of FIG. 4A with respect to signal processing order. Only such difference is described in the following.

The object detector 404 receives stereo images and detects an object from at least one stereo image. Distinguished from the processor 170 shown in FIG. 4A, the object detector 404 may directly detect an object from a stereo image instead of detecting the object from segmented images on the basis of disparity information.

The object verification unit 405 classifies and verifies detected and separated objects on the basis of image segments from the segmentation unit 403 and objects detected by the object detector 404.

To this end, the object verification unit 405 may use an identification method using a neural network, a support vector machine (SVM) method, an identification method according to AdaBoost using Haar-like characteristics or histograms of oriented gradients (HOG).

Figure 5A:
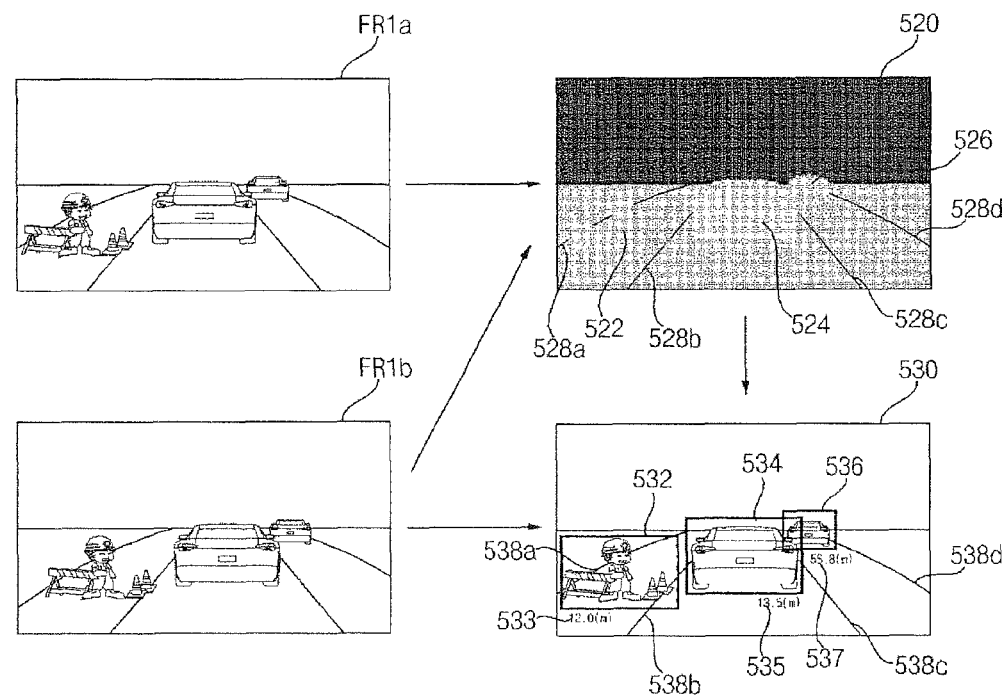
FIGS. 5A and 5B are diagrams illustrating examples of operations of a processor in a driver assistance apparatus based on stereo images respectively acquired in first and second frame intervals.
Figure 5B:
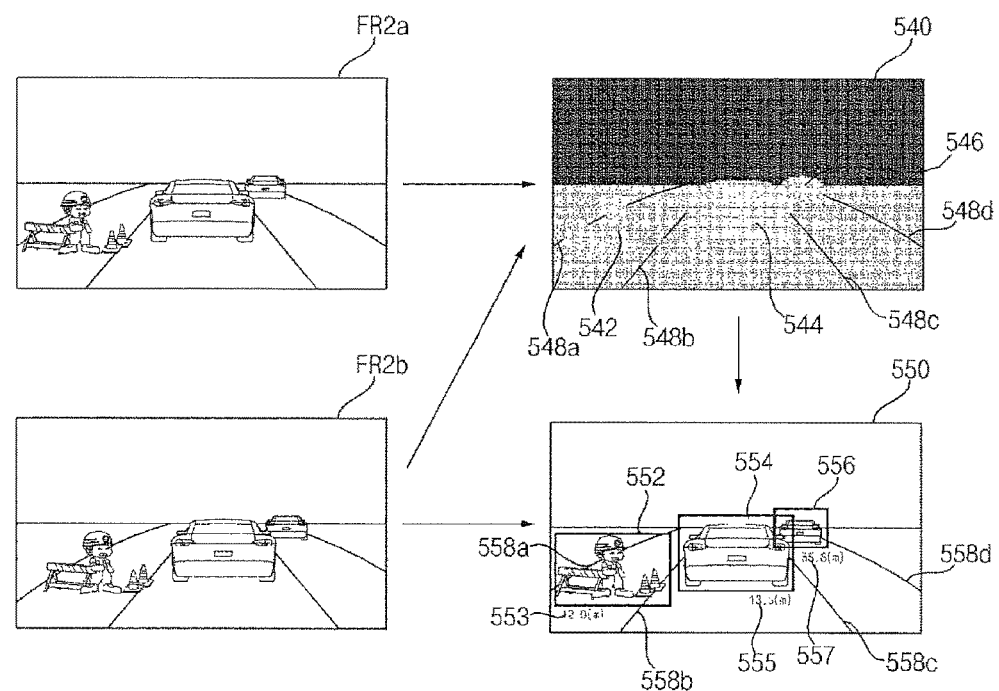

FIGS. 5A and 5B are views for explaining operation of the processor 170 shown in FIG. 4A on the basis of stereo images respectively acquired in first and second frame intervals.

Referring to FIG. 5A, the stereo camera 195 acquires stereo images in the first frame interval. The disparity calculator 402 included in the processor 170 receives stereo images FR1a and FR1b, which are processed into signals by the image preprocessor 401, and performs stereo matching on the received stereo images FR1a and FR1b so as to acquire a disparity map 520.

The disparity map 520 represents levels of disparity between the stereo images FR1a and FR1b. A distance to the vehicle is recognized to be shorter as the disparity level increases and is recognized to be longer as the disparity level decreases.

When the disparity map is displayed, a higher disparity level may be represented as higher brightness and a lower disparity level may be represented as lower brightness.

In FIG. 5A, first to fourth lanes 528a, 528b, 528c and 528d respectively have disparity levels corresponding thereto and a construction zone 522, a first preceding vehicle 524 and a second preceding vehicle 526 respectively have disparity levels corresponding thereto in the disparity map 520.

The segmentation unit 403, the object detector 404 and the object verification unit 405 respectively perform segmentation, object detection and object verification on at least one of the stereo images FR1a and FR1b on the basis of the disparity map 520.

FIG. 5A illustrates that object detection and verification are performed on the second stereo image FR1b using the disparity map 520. That is, the first to fourth lanes 538a, 538b, 538c and 538d, the construction zone 532, the first preceding vehicle 534 and the second preceding vehicle 536 in an image 530 can be detected and verified.

Referring to FIG. 5B, the stereo camera 195 acquires stereo images in the second frame interval. The disparity calculator 402 included in the processor 170 receives stereo images FR2a and FR2b, which are processed into signals by the image preprocessor 401, and performs stereo matching on the received stereo images FR2a and FR2b so as to acquire a disparity map 540.

In FIG. 5B, first to fourth lanes 548a, 548b, 548c and 548d respectively have disparity levels corresponding thereto and a construction zone 542, a first preceding vehicle 544 and a second preceding vehicle 546 respectively have disparity levels corresponding thereto in the disparity map 540.

The segmentation unit 403, the object detector 404 and the object verification unit 405 respectively perform segmentation, object detection and object verification on at least one of the stereo images FR2a and FR2b on the basis of the disparity map 540.

FIG. 5B illustrates that object detection and verification are performed on the second stereo image FR2b using the disparity map 540. That is, the first to fourth lanes 558a, 558b, 558c and 558d, the construction zone 552, the first preceding vehicle 554 and the second preceding vehicle 556 in an image 550 can be detected and verified.

The object tracking unit 406 tracks the verified objects by comparing FIG. 5A and FIG. 5B. Specifically, the object tracking unit 406 may track movement of the objects verified in FIGS. 5A and 5B on the basis of motions or motion vectors of the objects. Accordingly, the object tracking unit 406 can track the lanes, the construction zone, the first preceding vehicle and the second preceding vehicle, which are located around the corresponding vehicle.

Figure 6A:
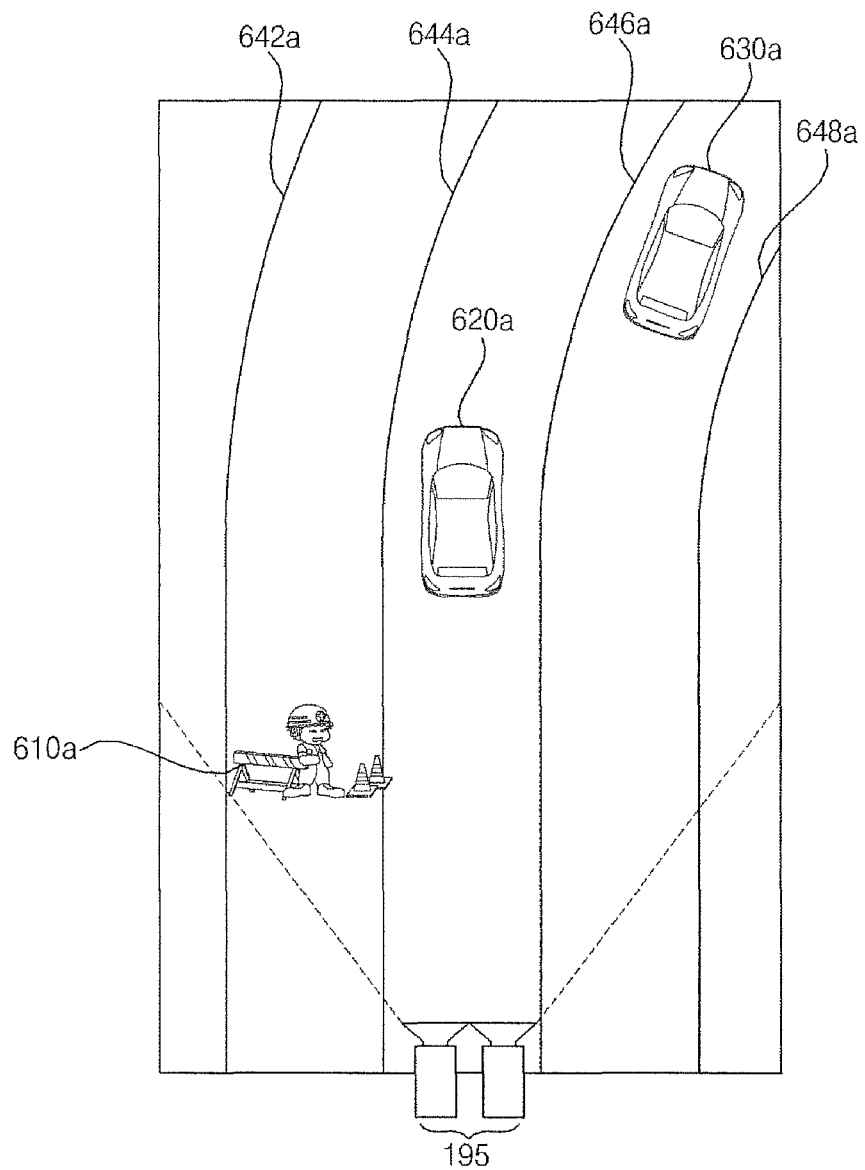
FIGS. 6A and 6B are diagrams illustrating examples of operations of a driver assistance apparatus.
Figure 6B:
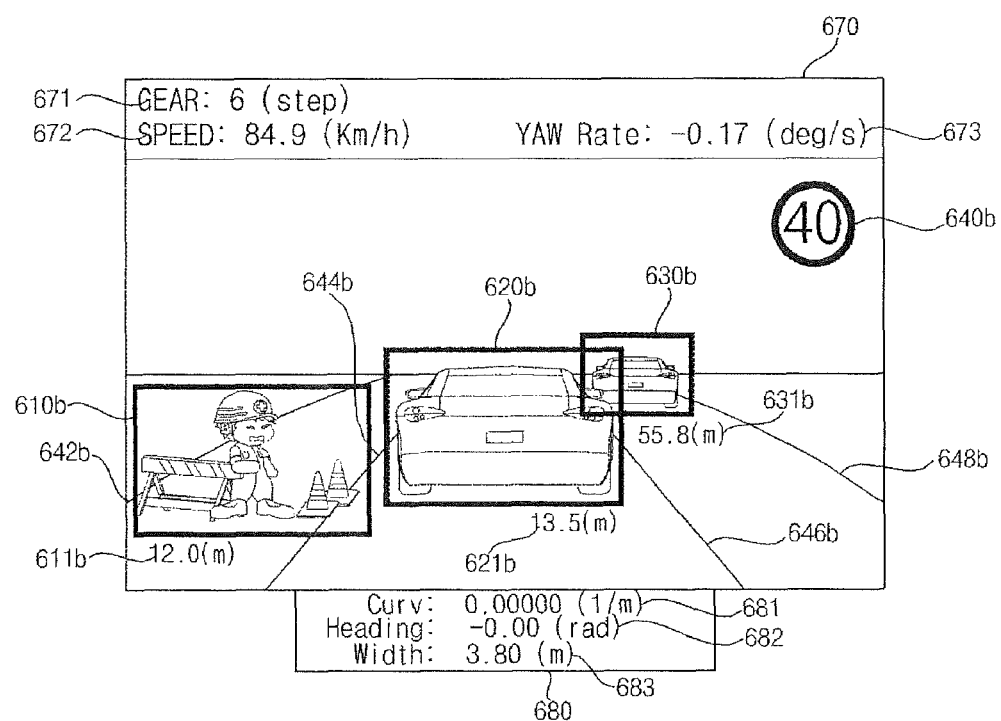

FIGS. 6A and 6B are views for explaining operation of the driver assistance apparatus shown in FIGS. 3A, 3B and 3C.

FIG. 6A illustrates a front view image of the vehicle, photographed by the stereo camera 195 included in the vehicle. Particularly, the front view image is displayed as a bird's eye view image.

Referring to FIG. 6A, first, second, third and fourth lanes 642a, 644a, 646a and 648a are present from left to right, a construction zone 610a is located between the first lane 642a and the second lane 644a, a first preceding vehicle 620a is positioned between the second lane 644a and the third lane 646a, and a second preceding vehicle 630a is positioned between the third lane 646a and the fourth lane 648a.

FIG. 6B illustrates display of situations in front of the vehicle, recognized by the driver assistance apparatus, along with various types of information. Particularly, the image shown in FIG. 6B may be displayed on the display 180 of the driver assistance apparatus, the display apparatus 400 for the vehicle or the display 741.

FIG. 6B illustrates display of information on the basis of an image captured by the stereo camera 195, distinguished from FIG. 6A.

Referring to FIG. 6B, first, second, third and fourth lanes 642b, 644b, 646b and 648b are present from left to right, a construction zone 610b is located between the first lane 642b and the second lane 644b, a first preceding vehicle 620b is positioned between the second lane 644b and the third lane 646b, and a second preceding vehicle 630b is positioned between the third lane 646b and the fourth lane 648b.

The driver assistance apparatus 100 may verify objects with respect to the construction zone 610b, the first preceding vehicle 620b and the second preceding vehicle 630b by processing stereo images acquired by the stereo cameras 195a and 195b into signals.

FIG. 6B shows that the borders of the construction zone 610b, the first preceding vehicle 620b and the second preceding vehicle 630b are highlighted in order to indicate object verification with respect to the construction zone 610b, the first preceding vehicle 620b and the second preceding vehicle 630b.

The driver assistance apparatus 100 may calculate distances between the corresponding vehicle and the construction zone 610b, the first preceding vehicle 620b and the second preceding vehicle 630b on the basis of the stereo images acquired by the stereo camera 195. FIG. 6B illustrates display of first distance information 611b, second distance information 621b and third distance information 631b respectively corresponding to the construction zone 610b, the first preceding vehicle 620b and the second preceding vehicle 630b.

The driver assistance apparatus 100 may receive sensor information about the vehicle from the controller 770 or the sensing unit 760. Particularly, the driver assistance apparatus 100 may receive a vehicle speed, gear information, a yaw rate that indicates a rotation angle (yaw angle) of the vehicle, and vehicle heading information and display the received information.

Referring to FIG. 6B, while a vehicle speed 672, gear information 671 and a yaw rate 673 are displayed on the upper part 670 of the front view image of the vehicle, and heading information 682 is displayed on the lower part 680 of the front view image of the vehicle, various other examples are possible. In addition, the width 683 of the vehicle and road curvature information 681 may be displayed along with the heading information 682.

The driver assistance apparatus 100 may receive information on a speed limit with respect to the road in which the vehicle is being driven through the communication unit 120 or the interface 130. FIG. 6B shows display of information on speed limit 640b.

While the driver assistance apparatus 100 can display the information shown in FIG. 6B through the display 180, the driver assistance apparatus 100 may store the information without displaying the same. In addition, the driver assistance apparatus 100 may use the information for various applications.

FIG. 7 is an internal block diagram of the vehicle shown in FIG. 1.

The vehicle 700 may include a communication unit 710, an input unit 720, a sensing unit 760, an output unit 740, a vehicle driving unit 750, a memory 730, an interface 780, a controller 770, a power supply 790, the driver assistance apparatus 100 and the display apparatus 400 for the vehicle.

The communication unit 710 may include one or more modules for enabling wireless communication between the vehicle 700 and the mobile terminal 600, between the vehicle 700 and the external server 500 or between the vehicle 700 and another vehicle 510. In addition, the communication unit 710 may include one or more modules for linking the vehicle to one or more networks.

The communication unit 710 may include a broadcast reception module 711, a wireless Internet module 712, a short-range communication module 713, a position information module 714, an optical communication module 715 and a V2X communication module 716.

The broadcast reception module 711 receives broadcast signals or broadcast related information from an external broadcast management server through broadcast channels. Here, broadcast includes radio broadcast and TV broadcast.

The wireless Internet module 712 refers to a module for wireless Internet access and may be embedded in the vehicle 700 or provided to the outside of the vehicle 700. The wireless Internet module 712 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 712 transmits and receives data according to at least one of wireless Internet technologies including those not above-mentioned. For example, the wireless Internet module 712 can wirelessly exchange data with the external server 500. The wireless Internet module 712 can receive weather information and traffic information (e.g., TPEG (Transport Protocol Expert Group) information) from the external server 500.

The short-range communication module 713 is a module for short-range communication and can support short range communication using at least one of Bluetooth™ RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 713 can perform short range communication between the vehicle 700 and at least one external device by establishing wireless area networks. For example, the short-range communication module 713 can exchange data with the mobile terminal 600. The short-range communication module 713 can receive weather information and traffic information (e.g., TPEG information) from the mobile terminal 600. When the user gets in the vehicle 700, the mobile terminal 600 of the user and the vehicle 700 can be paired automatically or according to execution of an application by the user.

The position information module 714 is a module for acquiring the location of the vehicle 700 and a typical example thereof is a GPS (Global Positioning System) module. For example, the vehicle can acquire the location thereof using signals sent from a GPS satellite using the GPS module.

The optical communication module 715 may include a light transmission unit and a light receiving unit. The light receiving unit converts a light signal into an electrical signal so as to receive information. The light receiving unit may include a photodiode (PD) for receiving light. The photodiode converts light into an electrical signal. For example, the light receiving unit can receive information on a preceding vehicle through light emitted from a light source included in the preceding vehicle.

The light transmission unit may include at least one light-emitting element for converting an electrical signal into a light signal. As an example, the light-emitting element may be an LED (Light Emitting Diode). The light transmission unit converts an electrical signal into a light signal and emits the light signal. For example, the light transmission unit can emit a light signal through flickering of the light-emitting element, which corresponds to a predetermined frequency. According to an implementation, the light transmission unit may include a plurality of light-emitting element arrays. According to an implementation, the light transmission unit may be integrated with a lamp provided to the vehicle 700. For example, the light transmission unit can be at least one of a headlight, a taillight, a brake lamp, a turn signal lamp and a sidelight. For example, the optical transmission module 715 can exchange data with the other vehicle 510 through optical communication.

The V2X communication module 716 is a module for wireless communication between the vehicle 700 and the external server 500 or the other vehicle 510. The V2X module 716 includes a module in which a vehicle-to-vehicle communication (V2V) or vehicle-to-infrastructure communication (V2I) protocol can be implemented. The vehicle 700 can perform wireless communication with the external server 500 or the other vehicle 510 through the V2X communication module 716.

The input unit 720 may include an operation unit 721, the camera 195, a microphone 723 and a user input unit 724. The operation unit 721 receives user input for driving the vehicle 700. The operation unit 721 may include a steering input unit 721a, a shift input unit 721b, an acceleration input unit 721c and a brake input unit 721d.

The user applies steering input to the steering input unit 721a. The steering input unit 721a may be configured in the form of a wheel such that steering input can be applied according to rotation. According to an implementation, the steering input unit 721a may be configured as a touchscreen, a touch pad or a button.

The user applies inputs with respect to parking P, driving (D), neutral (N), reverse (R) of the vehicle 700 through the shift input unit 721b. The shift input unit 721b may be configured in the form of a lever. According to an implementation, the shift input unit 721b may be configured in the form of a touchscreen, a touch pad or a button.

The user applies input with respect to acceleration of the vehicle 700 through the acceleration input unit 721c. The user applies input with respect to reduction of the speed of the vehicle 700 to the brake input unit 721d. The acceleration input unit 721c and the brake input unit 721d may be configured in the form of a pedal. According to an implementation, the acceleration input unit 721c or the brake input unit 721d may be configured in the form of a touchscreen, a touch pad or a button.

The camera 195 may include an image sensor and an image processing module. The camera 195 may process still images or video acquired through the image sensor (e.g., CMOS or CCD). The image processing module may process still images or video acquired through the image sensor to extract necessary information and transmit the extracted information to the controller 770. The vehicle 700 may include the camera 195 for photographing a front view image or an around view image of the vehicle and an internal camera 195c for photographing the inside of the vehicle.

The internal camera 195c may acquire an image of a person who enters the vehicle. The internal camera 195c may acquire an image for biometrics of the person. In addition, the internal camera 195c may detect the number of people getting in the vehicle by acquiring an image of the people.

While FIG. 7 shows that the camera 195 is included in the input unit 720, the camera 195 may be included in the driver assistance apparatus 100 as described above with reference to FIGS. 2 to 6.

The microphone 723 may process an external audio signal into electrical data. The processed data may be used in various manners according to functions executed in the vehicle 700. The microphone 723 may convert a voice command of the user into electrical data. The converted electrical data may be transmitted to the controller 770.

According to an implementation, the camera 195 or the microphone 723 may be included in the sensing unit 760 instead of the input unit 720.

The user input unit 724 is used to receive information from the user. Upon input of information through the user input unit 724, the controller 770 may control operation of the vehicle 700 to respond to the input information. The user input unit 724 may include a touch type input unit or a mechanical input unit. According to an implementation, the user input unit 724 may be provided to a region of the steering wheel of the vehicle. In this case, the driver can operate the user input unit 724 with a finger while gripping the steering wheel.

The sensing unit 760 senses signals related to driving of the vehicle 700 and the like. To this end, the sensing unit 760 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, radar, lidar and the like.

Accordingly, the sensing unit 760 may acquire sensing signals with respect to vehicle collision information, vehicle position information (GPS information), heading information, speed information, acceleration information, vehicle inclination information, driving/reversing information, battery information, fuel information, tire information, vehicle lamp information, vehicle internal temperature information, vehicle internal humidity information, steering wheel rotation angle information and the like.

In addition, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensor unit 760 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the internal camera 195*c* and the microphone 723 can operate as a sensor. The biometric information sensor can acquire information on a hand shape and face recognition information through the internal camera 195*c*.

The output unit 740 outputs information processed in the controller 770 and may include the display, an audio output unit 742 and a haptic output unit 743. The display 741 may display information processed in the controller 770. For example, the display 741 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 741 may include at least one of a liquid crystal display (LCD), a thin film transistor-liquid crystal display (TFT LCD), an organic light-emitting diode (OLED), a flexible display, a 3D display and an e-ink display.

The display 741 may implement a touchscreen by forming a layered structure with a touch sensor or by being integrated with the touch sensor. Such touchscreen can function as the user input unit 724 that provides an input interface between the vehicle 700 and the user and, simultaneously, provide an output interface between the vehicle 700 and the user. In this case, the display 741 may include a touch sensor for sensing touch applied to the display 741 such that a control command is input to the display 741 through touch. When touch is applied to the display 741, the touch sensor can sense the touch and the controller 770 can generate a control command corresponding to the touch on the basis of the sensed touch. Input applied through touch may be text, figures or menu items that can be indicated or designated in various modes.

The display 741 may include a cluster to enable the driver to drive the vehicle and, simultaneously, to check vehicle state information or vehicle driving information. The cluster may be provided on the dashboard. In this case, the driver can check information displayed on the cluster while looking forward.

According to an implementation, the display 741 may be implemented as an HUD (Head Up Display). When the display 741 is implemented as an HUD, information can be output through a transparent display provided to the windshield of the vehicle. Alternatively, the display 741 may include a projection module so as to output information through an image projected to the windshield.

The audio output unit 742 outputs an electrical signal from the controller 770 into an audio signal and outputs the audio signal. To this end, the audio output unit 742 may include a speaker. The audio output unit 742 can output sound corresponding to operation of the user input unit 724.

The haptic output unit 743 generates haptic output. For example, the haptic output unit 743 can vibrate the steering wheel, a safety belt or a seat to enable the user to recognize haptic output.

The vehicle driving unit 750 may control operations of various devices of the vehicle. The vehicle driving unit 750 may include a power source driver 751, a steering driver 752, a brake driver 753, a lamp driver 754, an air-conditioner driver 755, a window driver 756, an airbag driver 757, a sunroof driver 758 and a suspension driver 759.

The power source driver 751 can perform electronic control of a power source of the vehicle 700. For example, when the power source is a fossil fuel based engine (not shown), the power source driver 751 can perform electronic control of the engine so as to control the output torque of the engine. When the power source driver 751 is an engine, the speed of the vehicle can be limited by restricting an engine output torque under the control of the controller 770.

Alternatively, when an electric motor (not shown) is a power source, the power source driver 751 can control the motor. Accordingly, revolutions per minute (RPM), torque and the like of the motor can be controlled.

The steering driver 752 may electronically control a steering apparatus of the vehicle 700 so as to steer the vehicle 700.

The brake driver 753 may electronically control a brake apparatus (not shown) of the vehicle 700. For example, the brake driver 753 can reduce the speed of the vehicle 700 by controlling the operation of a brake provided to the wheels. As another example, the brake driver 753 can adjust the direction of the vehicle 700 to the left or right by differently operating brakes respectively provided to the left and right wheels.

The lamp driver 754 may turn on/turn off lamps provided to the inside and outside of the vehicle 700. In addition, the lamp driver 754 may control illuminance, directions and the like of the lamps. For example, the lamp driver 754 can control the turn signal, brake lamp and the like.

The air-conditioner driver 755 may electronically control an air conditioner (not shown) of the vehicle 700. For example, the air-conditioner driver 755 can control the air conditioner to supply chilly air to the inside of the vehicle 700 when the internal temperature of the vehicle is high.

The window driver 756 may electronically control a window apparatus of the vehicle 700. For example, the window driver 756 can control opening or closing of left and right windows provided to the side of the vehicle.

The airbag driver 757 may electronically control an airbag apparatus provided to the inside of the vehicle 700. For example, the airbag driver 757 can control the airbag apparatus to operate in a dangerous situation.

The sunroof driver 758 may electronically control a sunroof apparatus (not shown) of the vehicle 700. For example, the sunroof driver 758 can control opening or closing of a sunroof.

The suspension driver 759 may electronically control a suspension apparatus (not shown) of the vehicle 700. For example, the suspension driver 759 can reduce vibration of the vehicle 700 by controlling the suspension apparatus when the surface of the road is rough.

The memory 730 is electrically connected to the controller 770. The memory 730 may store fundamental data about the units, control data for operation control of the units and input/output data. The memory 730 may be various types of storage devices such as a ROM, a RAM, an EPROM, a flash drive and a hard drive. The memory 730 may store various types of data for the overall operation of the vehicle 700, such as programs for processing or control.

The interface 780 may function as a passage to various external devices connected to the vehicle 700. For example, the interface 780 can include a port that can be connected to the mobile terminal 600 and be connected to the mobile terminal 600 via the port. In this case, the interface 780 can exchange data with the mobile terminal 600.

In addition, the interface 780 may serve as a passage through which electric energy is supplied to the mobile terminal 600 connected thereto. When the mobile terminal 600 is electrically connected to the interface 780, the interface 780 provides electric energy supplied from the power supply 790 to the mobile terminal 600 under the control of the controller 770.

The controller 770 may control operations of the respective units of the vehicle 700. The controller 770 may be called an ECU (Electronic Control Unit).

The controller 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply 790 may supply power necessary for operations of the respective components under the control of the controller 770. Particularly, the power supply 790 may be provided with power from a battery (not shown) inside the vehicle 700.

The driver assistance apparatus 100 may exchange data with the controller 770. A control signal generated in the driver assistance apparatus 100 may be output to the controller 770. The driver assistance apparatus 100 may be the driver assistance apparatus described above with reference to FIGS. 1 to 6B.

The display apparatus 400 for the vehicle may exchange data with the controller 770. The controller 770 may receive navigation information from the display apparatus 400 or a separate navigation system (not shown). Here, the first information may be GPS based vehicle position information. The first information may include information on a set destination, route information depending on the destination, map information regarding vehicle driving and vehicle location information.

Figure 8:
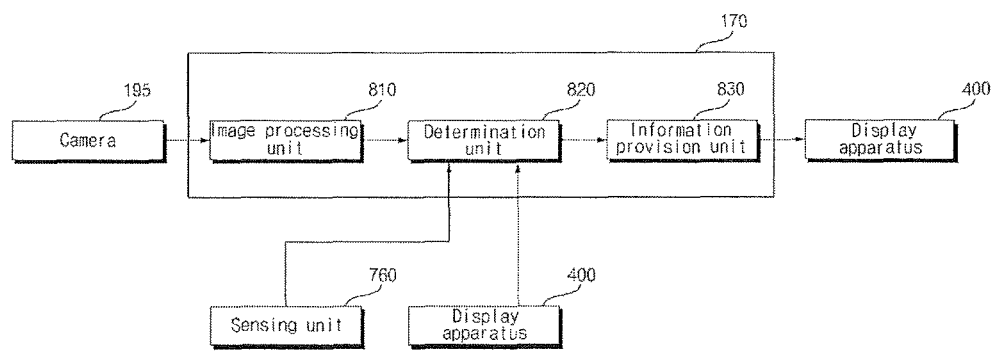
FIG. 8 is a block diagram illustrating an example of a processor of a driver assistance apparatus according to some implementations.

FIG. 8 is a block diagram of a processor of a driver assistance apparatus.

Referring to FIG. 8, the processor 170 may include an image processing unit 810, a determination unit 820 and an information provision unit 830.

The image processing unit 810 may receive an image acquired by the camera 195. The image processing unit 810 may detect an object from the acquired image and track the object. The image processing unit 810 may detect a driving situation on the basis of the detected object.

Here, the object may be a traffic signal provision unit, road surface indication, a structure located around a road, or a moving object. For example, the traffic signal provision unit may include a traffic light, a traffic sign and a traffic electronic signboard. In general, any suitable object may be detected from the acquired image and used for detecting the driving situation. Some examples are provided below.

Road surface indication may include lane information, velocity information, road information, direction information, crosswalks, stop lines and direction change information (e.g., go straight, left turn, right turn, U-turn and the like), which are indicated on a road surface.

The structure located around a road may include a curb, a streetlamp, a street tree, a pillar, a guardrail, a structure constituting an underground road and lighting provided to the underground road. The moving object may be a pedestrian, a two-wheeled vehicle or another vehicle.

The image processing unit 810 may include the image preprocessor 401, the disparity calculator 402, the segmentation unit 403, the object detector 404, the object verification unit 405, the object tracking unit 406 and the application unit 407.

The image processing unit 810 may detect a driving road on the basis of the detected object. The image processing unit 810 may detect whether the road on which the vehicle 700 is traveling is an expressway or a general national road on the basis of the detected object.

When the vehicle 700 travels on a general national road near an expressway or on an expressway near a general national road, the image processing unit 810 can detect the expressway or the general national road on the basis of the detected object.

For example, the image processing unit 810 can detect the general national road as the road on which the vehicle 700 is traveling when at least one of a traffic light, a pedestrian, a two-wheeled vehicle, a crosswalk and a curb that separates a roadway from a sidewalk is detected from the acquired image because a traffic light, a pedestrian, a two-wheeled vehicle, a crosswalk and a curb are not detected from expressways.

The image processing unit 810 can detect the expressway as the road on which the vehicle is traveling when a traffic light, a pedestrian, a two-wheeled vehicle, a crosswalk and a curb that separates a roadway from a sidewalk are not detected from the acquired image.

For example, the image processing unit 810 can detect the expressway or the general national road on the basis of information indicated on at least one of a road sign, a road surface and a speed limit sign from the acquired image. Here, the road sign, the road surface and the speed limit sign may display information suitable for the expressway or the general national road. That is, a road sign, a road surface and a speed limit sign of the expressway may display information different from that displayed on a road sign, a road surface and a speed limit sign of the general national road.

The image processing unit 810 may detect whether the road on which vehicle 700 is traveling is a high-level road or a general road on the basis of the detected object.

When the vehicle 700 travels on a general road near a high-level road or on a high-level road near a general road, the image processing unit 810 may detect the general road or the high-level road on the basis of the detected object.

For example, the image processing unit 810 can detect the general road as the road on which the vehicle 700 is traveling when at least one of a traffic light, a pedestrian, a two-wheeled vehicle, a crosswalk, a curb that separates a roadway from a sidewalk, a pillar supporting the high-level road and a shadow of the high-level road is detected from the acquired image since a traffic light, a pedestrian, a two-wheeled vehicle, a crosswalk and a curb that separates a roadway from a sidewalk, a pillar supporting a high-level road and a shadow of a high-level road are not detected from high-level roads.

The image processing unit 810 can detect the high-level road as the road on which the vehicle is traveling when a traffic light, a pedestrian, a two-wheeled vehicle, a crosswalk, a curb that separates a roadway from a sidewalk, a pillar supporting the high-level road and a shadow of the high-level road are not detected from the acquired image.

For example, the image processing unit 810 can detect the high-level road or the general road from the acquired image on the basis of information indicated on at least one of a road sign and a road surface. Here, the road sign and the road surface may display information suitable for the high-level road or the general road. That is, a road sign and a road surface of the high-level road may display information different from that displayed on a road sign and a road surface of the general road.

The image processing unit 810 may detect whether the road on which the vehicle 700 is traveling is an underground roadway or a general road on the basis of the detected object.

When the vehicle 700 travels on a general road near an underground roadway or on an underground roadway near a general road, the image processing unit 810 may detect the underground roadway or the general road on the basis of the detected object.

For example, the image processing unit 810 can detect the general road as the road on which the vehicle 700 is traveling when at least one of a traffic light, a pedestrian, a two-wheeled vehicle, a crosswalk and a curb that separates a roadway from a sidewalk is detected from the acquired image since a traffic light, a pedestrian, a two-wheeled vehicle, a crosswalk and a curb that separates a roadway from a sidewalk are not detected from underground roadways.

The image processing unit 810 can detect the underground roadway as the road on which the vehicle is traveling when a traffic light, a pedestrian, a two-wheeled vehicle, a crosswalk and a curb that separates a roadway from a sidewalk are not detected from the acquired image.

When lighting provided to the underground roadway, a traffic sign indicating entry into the underground roadway, a sign indicating overhead clearance or a structure constituting the underground roadway is detected from the acquired image, the processor 170 may detect the underground roadway as the road on which the vehicle 700 is traveling since the lighting provided to the underground roadway, the traffic sign indicating an entrance of the underground roadway and the sign indicating overhead clearance are detected only when the vehicle 700 is traveling on the underground roadway.

For example, the image processing unit 810 can detect the underground roadway or the general road from the acquired image on the basis of information indicated on at least one of a road sign and a road surface. Here, the road sign and the road surface may display information suitable for the underground roadway or the general road. That is, a road sign and a road surface of the underground roadway may display information different from that displayed on a road sign and a road surface of the general road.

The image processing unit 810 may detect a driving situation on the basis of the detected object. As an example, the image processing unit 810 may detect an expressway traveling situation on the basis of the detected object.

For example, the image processing unit 810 can detect a ramp traveling situation from the acquired image. If at least one of a traffic sign indicating entry into a ramp and a junction of a ramp or a main road is detected from the acquired image, the image processing unit 810 can detect an expressway traveling situation on the basis of the ramp traveling situation.

The image processing unit 810 may detect an uphill road traveling situation on the basis of the acquired image. The image processing unit 810 may detect an expressway traveling situation on the basis of the uphill road traveling situation.

When the vehicle 700 travels the wrong way on a one-way road, the image processing unit 810 may detect a wrong-way driving situation of the vehicle 700 on the one-way road on the basis of a detected object.

There is a case in which information provided by the navigation system indicates a general road that is actually a one-way road. In this case, when the vehicle enters the one-way road in the wrong direction according to the navigation information and travels on the one-way road, the image processing unit 810 can detect a wrong-way traveling situation of the vehicle 700 on the one-way road on the basis of the detected object.

For example, the image processing unit 810 can detect a wrong-way traveling situation from the acquired image on the basis of one of a traffic light, a traffic sign, a road surface and a neighboring pre-parked vehicle.

The image processing unit 810 may check whether the vehicle 700 is located indoors on the basis of an image. The image processing unit 810 may check whether the vehicle 700 is located indoors on the basis of a ceiling, a pillar, a wall, parked vehicles, parking area signs and the like.

The image processing unit 810 may check whether the vehicle 700 is moved from the indoor space to the outside on the basis of an image. The image processing unit 810 can check whether the vehicle 700 is moved from the indoor space to the outside by tracking a detected exit while the vehicle is located indoors.

The determination unit 820 may determine whether the first information is received. The first information may be position information of the vehicle 700, which is generated on the basis of a GPS. The first information can be received from the display apparatus 400 through the interface 130.

The determination unit 820 may determine whether the driving situation detected by the image processing unit 810 is consistent with the first information.

For example, when the location of the vehicle 700 according to the first information is a general national road near an expressway while the location of the vehicle 700 according to the detected driving situation is the expressway, the determination unit 820 can determine that the detected driving situation is not consistent with the first information.

For example, when the location of the vehicle 700 according to the first information is an expressway near a general national road while the location of the vehicle 700 according to the detected driving situation is the general national road, the determination unit 820 can determine that the detected driving situation is not consistent with the first information.

For example, when the location of the vehicle 700 according to the first information is a general road near a high-level road while the location of the vehicle 700 according to the detected driving situation is the high-level road, the determination unit 820 can determine that the detected driving situation is not consistent with the first information.

For example, when the location of the vehicle 700 according to the first information is a high-level road near a general road while the location of the vehicle 700 according to the detected driving situation is the general road, the determination unit 820 can determine that the detected driving situation is not consistent with the first information.

For example, when the location of the vehicle 700 according to the first information is a general road near an underground roadway while the location of the vehicle 700 according to the detected driving situation is the underground roadway, the determination unit 820 can determine that the detected driving situation is not consistent with the first information.

For example, when the location of the vehicle 700 according to the first information is an underground roadway near a general road while the location of the vehicle 700 according to the detected driving situation is the general road, the determination unit 820 can determine that the detected driving situation is not consistent with the first information.

For example, when the driving situation of the vehicle 700 according to the first information is forward driving while the driving situation of the vehicle 700 according to the detected driving situation is reverse driving, the determination unit 820 can determine that the detected driving situation is not consistent with the first information.

For example, when the driving situation of the vehicle 700 according to the first information is driving on a road while the situation of the vehicle 700 according to the detected driving situation is being located indoors, the determination unit 820 can determine that the detected driving situation is not consistent with the first information.

When the determination unit determines that the first information is not received, the information provision unit 830 may generate and provide the second information. Here, the second information may be position information of the vehicle 700, which is generated on the basis of an image acquired by the camera 195. In general, other features of the environment around the vehicle may be detected from the acquired image and may be used to generate the second information. The information provision unit 830 may provide the second information to the display apparatus 400 through the interface 130.

When the vehicle 700 is traveling indoors, the GPS based first information may not be received. In this case, the information provision unit 830 may generate the second information on the basis of a direction sign, or other feature in the environment around the vehicle, detected from an image acquired through the camera 195 and provide the generated second information.

When the vehicle 700 is moved to the outside, the GPS based first information can be received after a predetermined time from when the vehicle 700 is moved to the outside. In this case, the information provision unit 830 may generate the second information generated on the basis of, for example, a road sign, a building, or a direction sign detected from an acquired image, and provide the generated second information when the first information is not received.

When the determination unit 820 determines that the detected driving situation is not consistent with the first information, the information provision unit 830 may generate the second information on the basis of the driving situation and provide the generated second information. The information provision unit 830 may provide the second information to the display apparatus 400 through the interface 130.

Figure 9:
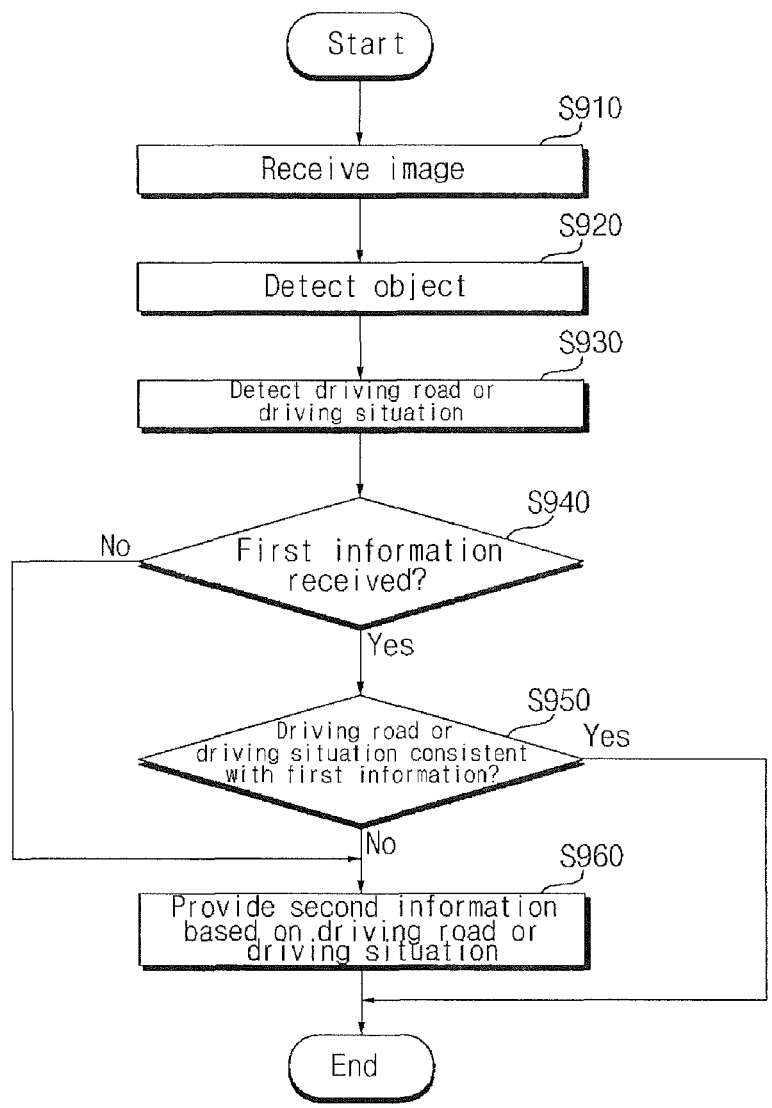
FIG. 9 is a flowchart illustrating an example of operations of a driver assistance apparatus according to some implementations.

FIG. 9 is a flowchart illustrating an examples of operations of a driver assistance apparatus.

Referring to FIG. 9, the processor 170 may receive, form the camera 195, an image acquired by the camera 195 (S910). Here, the image may be a front view image or an around view image of the vehicle. The image may be an image captured by the stereo cameras 195a and 195b or the around view cameras 195d, 195e, 195f and 195g.

The processor 170 may detect an object from the received image (S920). Object detection operation may be performed by the image processing unit 810 of the processor 170. Here, the object may be a traffic sign provision unit, road surface indication, a structure located around a road or a moving object.

The traffic sign provision unit may include a traffic light, a traffic sign and a traffic electronic signboard. Road surface indication may include lane information, velocity information, road information, direction information, crosswalks, stop lines and direction change information (e.g., go straight, left turn, right turn, U-turn and the like), which are indicated on a road surface.

The structure located around a road may include a curb, a streetlamp, a street tree, a pillar, a guard rail, a structure (e.g., ceiling or wall) constituting an underground road and lighting provided to the underground road. The moving object may be a pedestrian, a two-wheeled vehicle or another vehicle.

The processor 170 may detect a driving situation of the vehicle on the basis of the detected object (S930). Operation of detecting a driving situation may be performed by the image processing unit 810 of the processor 170.

The processor 170 may check whether the road on which the vehicle 700 is traveling is an expressway or a general national road on the basis of the detected object. When the vehicle 700 travels on a general national road near an expressway or on an expressway near a general national road, the processor 170 can detect the expressway or the general national road on the basis of the detected object.

The processor 170 may check whether the road on which the vehicle 700 is traveling is a high-level road or a general road on the basis of the detected object. When the vehicle 700 travels on a general road near a high-level road or on a high-level road near a general road, the processor 170 can detect the general road or the high-level road on the basis of the detected object.

The processor 170 may check whether the road on which the vehicle 700 is traveling is an underground roadway or a general road on the basis of the detected object. When the vehicle 700 travels on a general road near an underground roadway or on an underground roadway near a general road, the processor 170 can detect the underground roadway or the general road on the basis of the detected object.

When the vehicle 700 travels the wrong way on a one-way road, the processor 170 may detect a wrong-way traveling situation of the vehicle 700 on the one-way road on the basis of the detected object.

The processor 170 may check whether the vehicle 700 is located indoors on the basis of the detected object. The processor 170 may check whether the vehicle 700 is moved to the outside on the basis of the detected object.

The processor 170 may determine whether the first information is received (S940). The determination unit 820 of the processor 170 may determine whether the first information is received.

Here, the first information may be position information of the vehicle 700, which is generated on the basis of a GPS. The first information can be received from the display apparatus 400 through the interface 130. When the first information is received, the processor 170 may determine whether the detected driving situation is consistent with the first information (S950). The determination unit 820 of the processor 170 may determine whether the detected driving situation is consistent with the first information.

When the detected driving situation is not consistent with the first information, the processor 170 may generate the second information on the basis of the driving situation and provide the second information (S960). The processor 170 may provide the second information to the display apparatus 400 through the interface 130.

When the first information is not received in step S940, the processor 170 may generate and provide the second information. Here, the second information may be position information of the vehicle 700, which is generated on the basis of the image acquired by the camera 195. The processor 170 may provide the second information to the display apparatus 400 through the interface 130 (S960).

Figure 10:
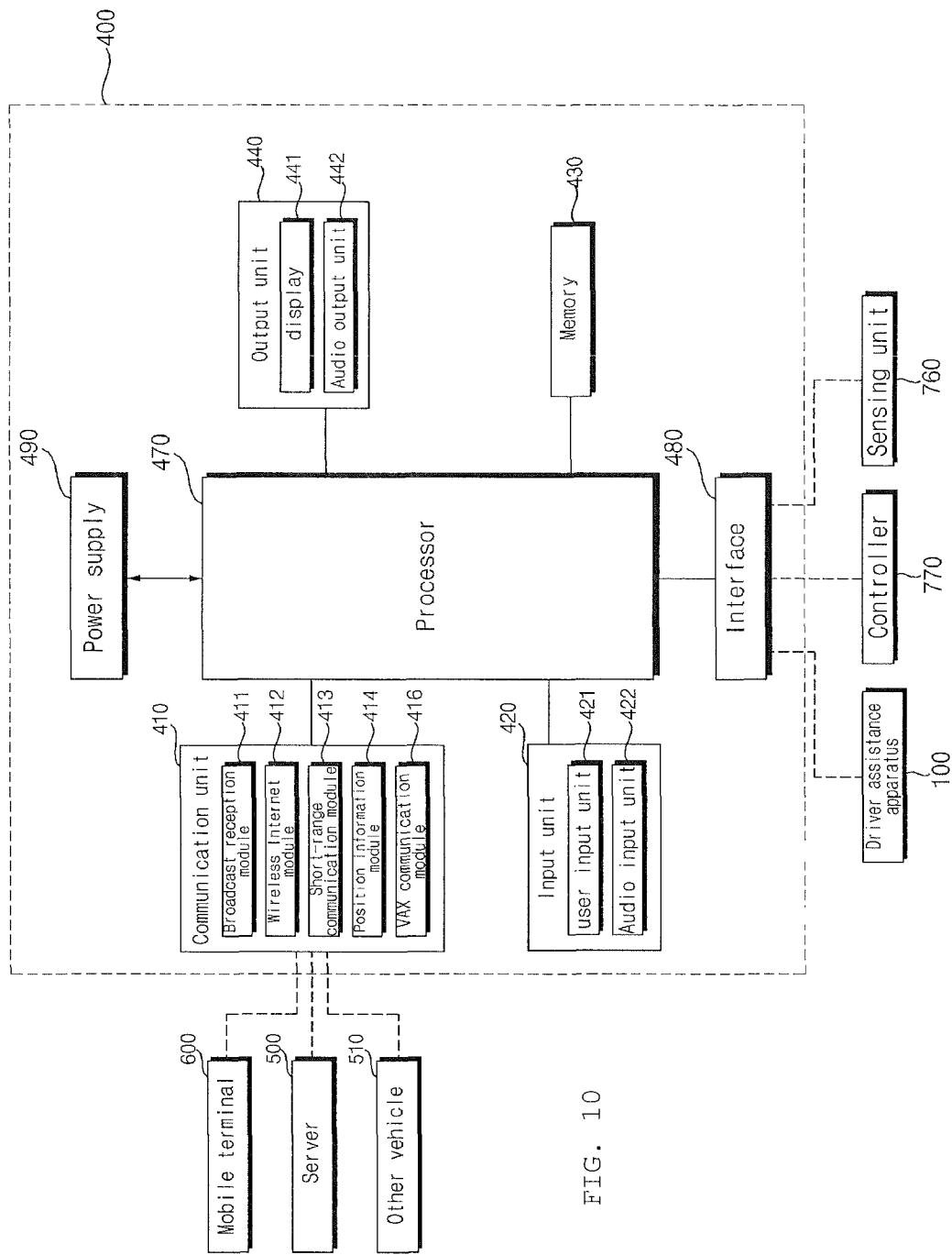
FIG. 10 is a block diagram illustrating an example of a display apparatus for a vehicle according to some implementations.

FIG. 10 is a block diagram of a display apparatus for a vehicle.

The display apparatus 400 for the vehicle may be used as an interface (human machine interface (HMI)) between the user and the vehicle 700.

The display apparatus 400 for the vehicle may provide a function of outputting audio and video content. In addition, the display apparatus 400 for the vehicle may provide a navigation function.

The display apparatus 400 for the vehicle may receive user input. The display apparatus 400 for the vehicle may include a plurality of units for executing the HMI function.

Referring to FIG. 10, the display apparatus 400 for the vehicle may include a communication unit 410, an input unit 420, a memory 430, an output unit 440, an interface 480 and a power supply 490.

The communication unit 410 may include one or more modules for enabling wireless communication between the vehicle 700 and the mobile terminal 600, between the vehicle 700 and the external server 500 or between the vehicle 700 and another vehicle 510. In addition, the communication unit 410 may include one or more modules for linking the vehicle to one or more networks. The communication unit 410 may include a broadcast reception module 411, a wireless Internet module 412, a short-range communication module 413, a position information module 414, and a V2X communication module 416.

The broadcast reception module 411 receives broadcast signals or broadcast related information from an external broadcast management server through broadcast channels. Here, broadcast includes radio broadcast and TV broadcast.

The wireless Internet module 412 refers to a module for wireless Internet access and may be embedded in the vehicle 700 or provided outside the vehicle 700. The wireless Internet module 412 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 412 transmits and receives data according to at least one of wireless Internet technologies including those not mentioned above. For example, the wireless Internet module 412 can wirelessly exchange data with the external server 500. The wireless Internet module 412 can receive weather information and traffic information of roads (e.g., TPEG information) from the external server 500.

The short-range communication module 413 is a module for short-range communication and can support short range communication using at least one of Bluetooth™ RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 413 may perform short range communication between the vehicle 700 and at least one external device by establishing wireless area networks. For example, the short-range communication module 413 can exchange data with the mobile terminal 600. The short-range communication module 413 can receive weather information and traffic information of roads (e.g., TPEG information) from the mobile terminal 600. When the user enters the vehicle 700, the mobile terminal 600 of the user and the vehicle 700 can be paired automatically or according to execution of an application by the user.

The position information module 414 is a module for acquiring the location of the vehicle 700 and a typical example thereof is a GPS module. For example, the vehicle can acquire the location thereof using signals sent from a GPS satellite by using the GPS module.

The V2X communication module 416 is a module for wireless communication between the vehicle 700 and the external server 500 or the other vehicle 510. The V2X module 416 includes a module in which a vehicle-to-vehicle communication (V2V) or vehicle-to-infrastructure communication (V2I) protocol can be implemented. The vehicle 700 may perform wireless communication with the external server 500 or the other vehicle 510 through the V2X communication module 416.

The input unit 420 may include a user input unit 421 and an audio input unit 422.

The user input unit 421 receives information from the user. Upon input of information through the user input unit 424, a processor 470 may control operation of the display apparatus 400 for the vehicle in response to the input information. The user input unit 424 may include a touch-type input unit or a mechanical input unit.

The audio input unit 422 may process an external audio signal into electrical data. The processed data may be used in various manners according to a function being executed in the display apparatus 400 for the vehicle. The audio input unit 422 may convert a voice command of the user into electrical data. The electrical data may be transmitted to the processor 470.

The memory 430 is electrically connected to the processor 470. The memory 430 may store fundamental data about the units, control data for operation control of the units and input/output data. The memory 430 may be various types of storage devices such as a ROM, a RAM, an EPROM, a flash drive and a hard drive. The memory 430 may store various types of data for the overall operation of the vehicle 700, such as programs for processing or control of the processor 470.

The memory 430 may store map data for implementing the navigation function. Here, the map data may be pre-stored during production of the vehicle 700. Alternatively, the map data may be received from an external device through the communication unit 410 or the interface 480.

The output unit 440 outputs information processed by the processor 470 and may include a display 441 and an audio output unit 442.

The display 441 may display information processed by the processor 470. For example, the display 441 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 441 may include at least one of a liquid crystal display (LCD), a thin film transistor-liquid crystal display (TFT LCD), an organic light-emitting diode (OLED), a flexible display, a 3D display and an e-ink display.

The display 441 may implement a touchscreen by forming a layered structure with a touch sensor or by being integrated with the touch sensor. Such touchscreen may function as the user input unit 424 that provides an input interface between the display apparatus 400 for the vehicle and the user and, simultaneously, provides an output interface between the display apparatus 400 for the vehicle and the user. In this case, the display 441 may include a touch sensor for sensing touch applied to the display 441 such that a control command is input to the display 441 through touch. When touch is applied to the display 441, the touch sensor can sense the touch and the processor 470 can generate a control command corresponding to the touch on the basis of the sensed touch. Input applied through touch may be text, figures or menu items that can be indicated or designated in various modes.

The display 441 may be implemented such that an image is displayed on a region of the windshield of the vehicle.

The display 441 may include a transparent display. In this case, the transparent display can be attached to the windshield. Accordingly, the display apparatus 400 for the vehicle can output information through the transparent display.

The transparent display may display a predetermined screen with predetermined transparency. For transparency, the transparent display may include at least one of a transparent TFEL (Thin Film Electroluminescent) display, a transparent OLED (Organic Light-Emitting Diode) display, a transparent LCD (Liquid Crystal Display), a transmission type transparent display and a transparent LED (Light Emitting Diode) display. The transparency of the transparent display may be controlled by the processor 470.

The display 441 may include a projection module. In this case, the display apparatus 400 can output information through an image projected onto the windshield.

The projection module projects a beam onto the windshield. The projection module may include a light source and a projection lens. The projection module may generate an image corresponding to information processed by the processor 470. That is, the projection module may generate an image using light generated from the light source and project the image onto the windshield. Here, the light source may be an LED, laser and the like.

The audio output unit 442 converts an electrical signal from the processor 470 into an audio signal and outputs the audio signal. To this end, the audio output unit 442 may include a speaker. The audio output unit 442 may output a sound corresponding to operation of the user input unit 421.

The interface 480 may receive data or transmit a signal processed or generated in the processor 470 to the outside. To this end, the interface 480 may perform data communication with the controller 770 of the vehicle, the driver assistance apparatus 100 and the sensing unit 760 according to a radio communication scheme.

The interface 480 may receive sensor information from the controller 770 or the sensing unit 760. Here, the sensor information may include at least one of vehicle direction information, vehicle position information (GPS information), vehicle heading information, vehicle speed information, vehicle acceleration information, vehicle inclination information, information on forward/reverse movement of the vehicle, battery information, fuel information, tire information, vehicle lamp information, vehicle internal temperature information and vehicle internal humidity information.

Such sensor information may be acquired from a heading sensor, a yaw sensor, a gyro sensor, a position module, a vehicle front/rear sensor, a wheel sensor, a speed sensor, a car body tilting sensor, a battery sensor, a fuel sensor, a tire sensor, a steering sensor, a vehicle internal temperature sensor, a vehicle internal humidity sensor and the like. The position module may include a GPS module for receiving GPS information.

From among the sensor information, the vehicle direction information, vehicle position information, vehicle heading information, vehicle speed information and vehicle inclination information, which are related to driving of the vehicle, may be called vehicle driving information.

The interface 480 may receive information or data from the driver assistance apparatus 100. Particularly, the interface 480 may receive the second information from the driver assistance apparatus. Here, the second information may be information on a location of the vehicle, which is generated on the basis of a driving situation detected from an image. The interface 480 may receive front view image data or around view image data of the vehicle, which is acquired through the camera 195 included in the driver assistance apparatus 100.

The interface 480 may receive information or data obtained by processing a front view image or an around view image of the vehicle by the processor 170 of the driver assistance apparatus 100.

The interface 480 may receive information on passengers, acquired through the internal camera 195c. Here, the passenger information may include information on the number of passengers.

The processor 470 controls overall operation of each unit of the display apparatus 400.

The processor 470 may control the output unit 440 to output information or data received through the communication unit 410, the input unit 420 or the interface 480. The processor 470 may control the output unit 440 to output information or data stored in the memory 430. The processor 470 may directly output received information or data or process the information or data and then output the processed information or data. The processor 470 may visually output information or data through the display 441. The processor 470 may acoustically output information or data through the audio output unit 442.

The processor 470 may generate new information on the basis of information or data received through the interface 480. The processor 470 may control the display 441 to display the generated information or an image corresponding to the generated information.

The processor 470 may receive GPS information from the position information module 414. The processor 470 may generate the first information on the position of the vehicle 700 on the basis of the received GPS information.

The processor 470 may apply the first information to a map and provide a navigation function through the output unit 440. Here, the map may be stored in the memory 430 or received from external devices 600, 500 and 510 through the communication unit 410 or the interface 480.

The processor 470 may receive the second information. Here, the second information may be information on the position of the vehicle 700, which is generated on the basis of an image.

When the second information is received, the processor 470 may apply the second information to a map and provide the navigation function through the output unit 440. The map may be stored in the memory 430 or received from external devices 600, 500 and 510 through the communication unit 410 or the interface 480.

The processor 470 may apply the second information to the map. That is, when the second information is received, the processor 470 can apply the second information instead of the first information to the map.

When the second information is not received, the processor 470 can apply the first information to the map.

When the first information is applied to the map, the processor 470 may display a first image corresponding to the first information in a region of the display 441. When the second information is applied to the map, the processor 470 may display a second image corresponding to the second information in a region of the display 441.

When information applied to the map is changed from the first information to the second information, the processor 470 may control the first image displayed on the display 441 to be changed to the second image. In this case, the processor 170 may control the first image to gradually become faint and control the second image to gradually become clear over time. This can aid in safe driving since the driver is less distracted by the displayed information.

When the second information is applied to the map, the processor 470 may match the position of the vehicle, based on the second information, on the map and display the position of the vehicle through the display 441. For example, the processor 470 can display an image corresponding to the vehicle 700 on the map to which the second information has been applied. When the first information and the second information are not consistent with each other, the position of the vehicle image on the map may be changed when the map to which the first information has been applied is changed to the map to which the second information has been applied.

The processor 470 may display a route, generated from the vehicle position based on the second information, on the display 441. When the first information and the second information are not consistent with each other, a route according to a predetermined destination may be changed when the map to which the first information has been applied is changed to the map to which the second information has been applied. In this case, the processor 170 can display the changed route on the display 441.

If the vehicle 700 is moved from an indoor space to the outside, the vehicle position based on the second information may be an indoor position. In this case, the processor 470 can display a route from the indoor vehicle position based on the second information to a destination on the display 441.

The processor 470 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and other electronic units for executing the corresponding functions.

The power supply 490 may supply power necessary for operations of the respective components under the control of the processor 470. Particularly, the power supply 490 may be provided with power from the battery of the vehicle 700.

Figure 11:
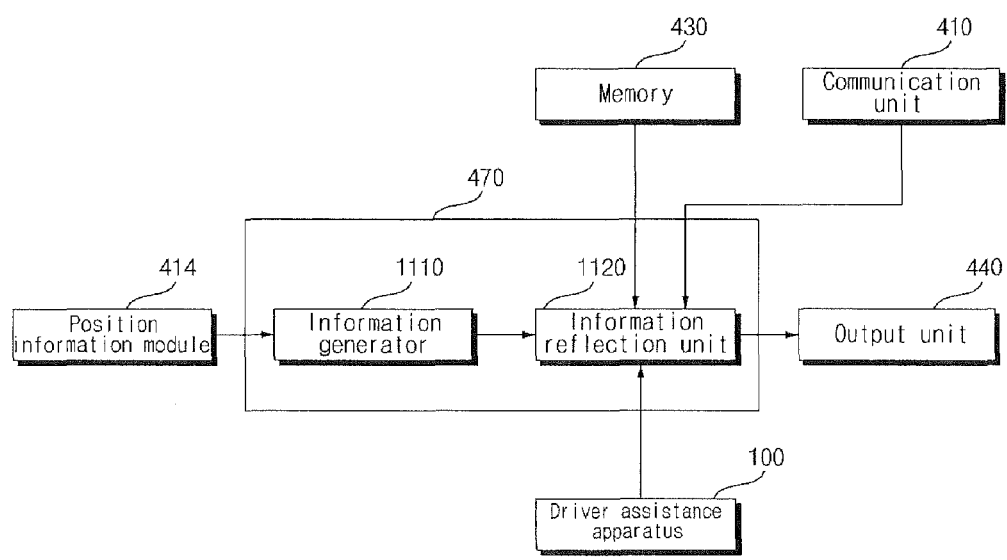
FIG. 11 is a block diagram illustrating an example of a processor of a display apparatus for a vehicle according to some implementations.

FIG. 11 is a block diagram of a processor of a display apparatus for a vehicle.

Referring to FIG. 11, the processor 470 may include an information generator 1110 and an information reflection unit 1120.

The information generator 1110 may receive GPS information from the position information module 414. The information generator 1110 may generate the first information on the position of the vehicle 700 on the basis of the received GPS information.

The information reflection unit 1120 may reflect the first information or the second information in the map. The second information may be information about the position of the vehicle 700, which is generated on the basis of an image. The second information may be received from the driver assistance apparatus through the interface 480. The map may be stored in the memory 430 or received from external devices 600, 500 and 510 through the interface 480.

The information reflection unit 1120 may reflect the second information to the map. That is, when the second information is received, the information reflection unit 1120 can reflect the second information instead of the first information in the map. When the second information is not received, the information reflection unit 1120 can reflect the first information in the map.

When the first information is reflected in the map, the information reflection unit 1120 may display a first image corresponding to the first information in a region of the display 441. When the second information is reflected in the map, the information reflection unit 1120 may display a second image corresponding to the second information in a region of the display 441.

When the second information is reflected in the map, the information reflection unit 1120 may match the position of the vehicle, based on the second information, on the map and display the position of the vehicle through the display 441.

The information reflection unit 1120 may display a route, generated from the vehicle position based on the second information, on the display 441.

If the vehicle 700 is moved from an indoor space to the outside, the vehicle position based on the second information may be an indoor position.

The processor 470 may further include a determination unit (not shown) according to an implementation. The processor 470 may receive video data from the driver assistance apparatus 100. Here, the video data may be video data acquired by the camera 195 or data obtained by processing the video data.

The determination unit (not shown) may determine whether the first information is consistent with a driving situation based on the video data. When the first information is consistent with the driving situation, the information reflection unit 1120 may reflect the first information in the map. When the first information is not consistent with the driving situation, the information reflection unit 1120 may reflect the driving situation based on the video data in the map.

Figure 12:
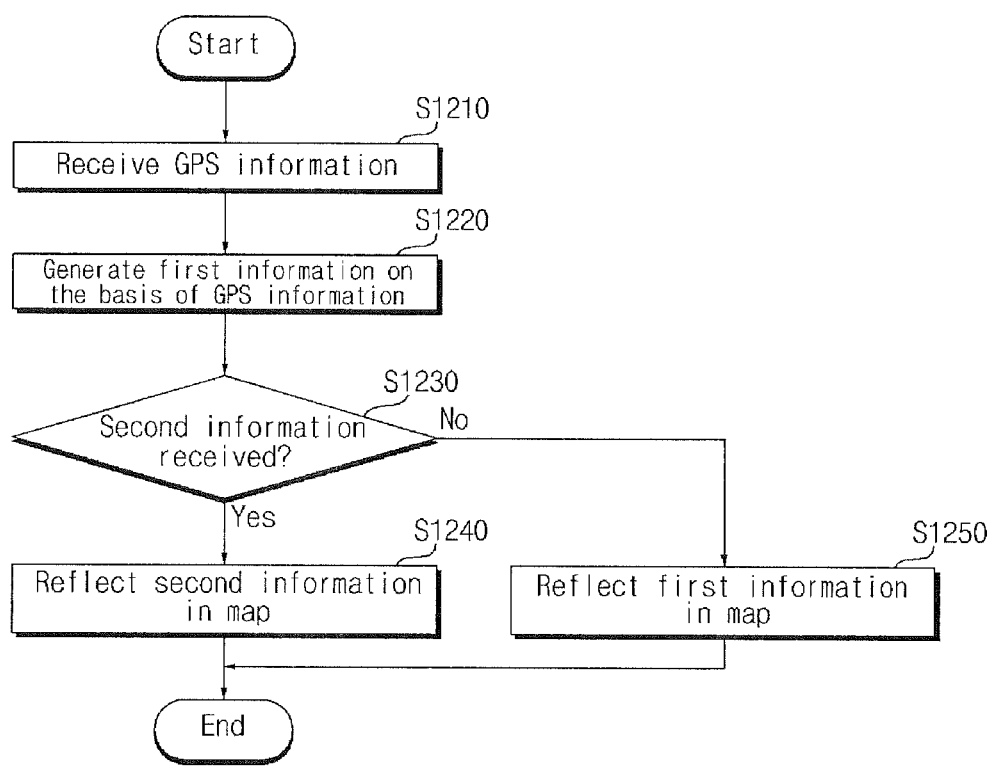
FIG. 12 is a flowchart illustrating an example of operations of a display apparatus for a vehicle with a driver assistance apparatus according to some implementations.

FIG. 12 is a flowchart illustrating an example of operations of a display apparatus for a vehicle.

Referring to FIG. 12, the processor 470 may receive GPS information from the position information module 414 (S1210). The processor 470 may generate the first information on the basis of the GPS information. Operation of generating the first information may be performed by the information generator 1110. The first information may be information on the position of the vehicle 700 on the basis of the GPS information.

The processor 470 may receive second information from the driver assistance apparatus 100 through the interface 480. The second information may be information on the position of the vehicle 700, which is generated on the basis of an image.

When the second information is received (S1230), the processor 470 may reflect the second information instead of the first information in the map (S1240). The processor 470 may display the map in which the second information has been reflected through the display 441. The processor 470 may display an image corresponding to the second information in a region of the display 441.

When the second information is not received (S1230), the processor 470 may reflect the first information in the map (S1250). The processor 470 may display the map in which the first information has been reflected through the display 441. The processor 470 may display an image corresponding to the first information in a region of the display 441.

Figure 13A:
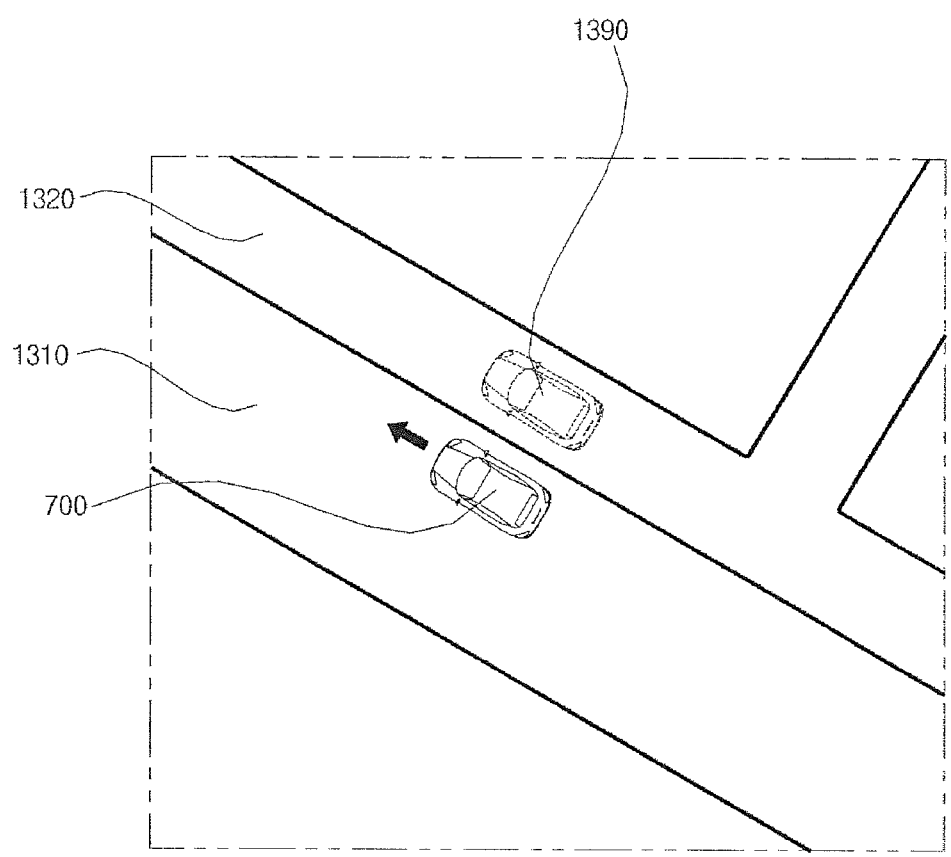
FIGS. 13A and 13B are diagrams illustrating examples of an operation of a driver assistance apparatus or a display apparatus for a vehicle in a scenario in which the vehicle travels on an expressway or a general national road according to some implementations.
Figure 13B:
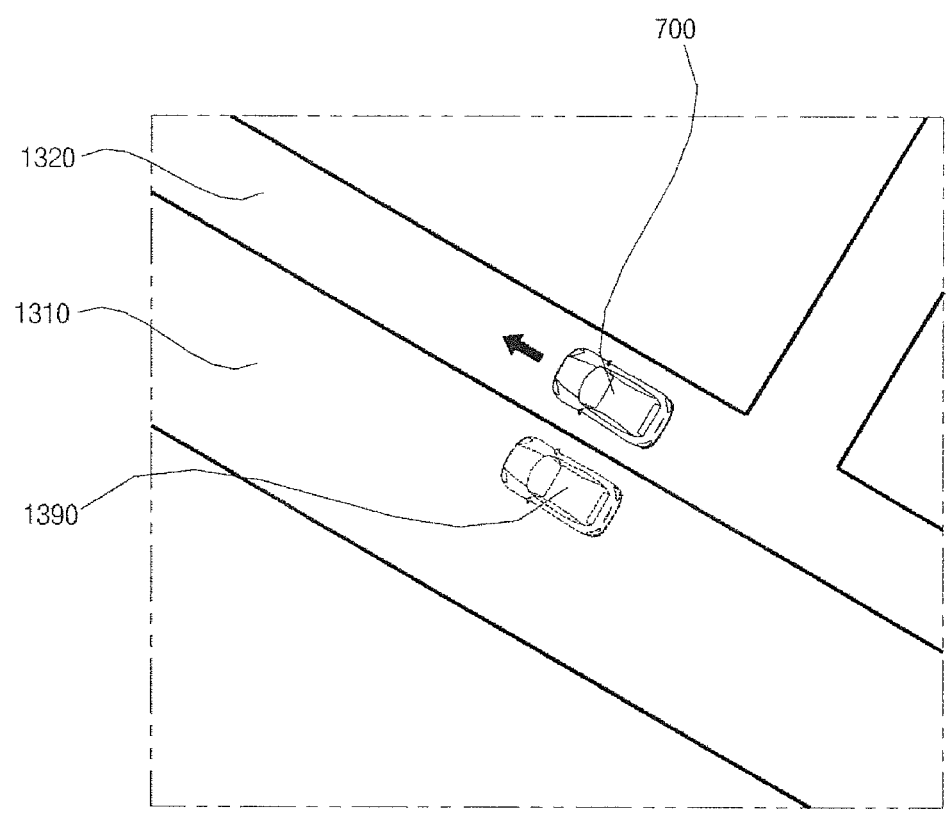

FIGS. 13A and 13B are views for explaining examples of operations of a driver assistance apparatus or a display apparatus for a vehicle when the vehicle travels on an expressway or a general national road.

As shown in FIG. 13A, when the vehicle 700 travels on an expressway 1310, the navigation system may display the vehicle traveling on a general national road 1320 near the expressway 1310. In this case, it is necessary to update navigation information such that the navigation information represents that the road on which the vehicle 700 is traveling is the expressway 1310.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a road from a sidewalk, a road sign, a road surface and a speed limit sign.

The processor 170 may check whether the road on which the vehicle 700 is traveling is an expressway on the basis of the detected object. When at least one of a traffic light, a pedestrian, a two-wheeled vehicle, a crosswalk and a curb that separates a roadway from a sidewalk is not detected predetermined times or more from the acquired image, the processor 170 can detect the expressway 1310 as the road on which the vehicle 700 is traveling.

If a direction indicated on a road sign or road surface detected from the acquired image is a direction in which the vehicle can travel only through the expressway 1310, the processor 170 can detect the expressway 1310 as the road on which the vehicle 700 is traveling.

If a speed limit indicated on a detected speed limit sign corresponds to a speed limit of the expressway 1310, the processor 170 can detect the expressway 1310 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle 1390 based on the first information travels on the general national road 1320 near the expressway 1310, the processor 170 can determine that the detected driving road is not consistent with the first information.

In this case, the processor 170 can generate the second information on the basis of the fact that the vehicle 700 is traveling on the expressway 1310 and provide the second information to the display apparatus 400.

A description will be given of operation of the display apparatus 400 that provides the navigation function.

The processor 470 may generate the first information on the position of the vehicle 700 on the basis of GPS information acquired through the position information module 414. The processor 470 may provide the first information to the driver assistance apparatus 100. In the present implementation, the position of the vehicle 1390 based on the first information corresponds to the general national road 1320.

If the second information representing that the vehicle 700 is traveling on the expressway 1310 is received, the processor 470 may reflect the second information in the map and display, on the display 441, the vehicle 700 traveling on the expressway 1310 on the map. In this case, the processor 470 can display an image corresponding to the vehicle 700 on the map in which the second information is reflected. When a destination is predetermined, the processor 470 may generate and display a route to the destination by reflecting the second information therein.

Referring to FIG. 13B, when the vehicle 700 travels on the general national road 1320, the navigation system may display the vehicle traveling on the expressway 1310 near the general national road 1320. In this case, it is necessary to update navigation information such that the navigation information represents that the vehicle 700 is traveling on the general national road 1320.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a roadway from a sidewalk, a road sign, a road surface and a speed limit sign.

The processor 170 may check whether the road on which the vehicle 700 is traveling is the general national road 1320 on the basis of the detected object. When at least one of a traffic light, a pedestrian, a two-wheeled vehicle, a crosswalk and a curb that separates a roadway from a sidewalk is detected predetermined times or more from the acquired image, the processor 170 can detect the general national road 1320 as the road on which the vehicle 700 is traveling.

If a direction indicated on a road sign or road surface detected from the acquired image is a direction in which the vehicle can travel only through the general national road 1320, the processor 170 can detect the general national road 1320 as the road on which the vehicle 700 is traveling.

If a speed limit indicated on a detected speed limit sign corresponds to a speed limit of the general national road 1320, the processor 170 can detect the general national road 1320 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle 1390 based on the first information travels on the expressway road 1310 near the general national road 1320, the processor 170 can determine that the detected driving road is not consistent with the first information.

In this case, the processor 170 can generate the second information on the basis of the fact that the vehicle 700 is traveling on the general national road 1320 and provide the second information to the display apparatus 400.

A description will be given of operation of the display apparatus 400 that provides the navigation function.

The processor 470 may generate the first information on the position of the vehicle 700 on the basis of GPS information acquired through the position information module 414. The processor 470 may provide the first information to the driver assistance apparatus 100. In the present implementation, the position of the vehicle 1390 based on the first information corresponds to the expressway 1310.

If the second information representing that the vehicle 700 is traveling on the general national road 1320 is received, the processor 470 may reflect the second information in the map and display, on the display 441, the vehicle 700 traveling on the general national road 1320 on the map. In this case, the processor 470 can display an image corresponding to the vehicle 700 on the map in which the second information is reflected. When a destination is predetermined, the processor 470 may generate and display a route to the destination by reflecting the second information therein.

Figure 14A:
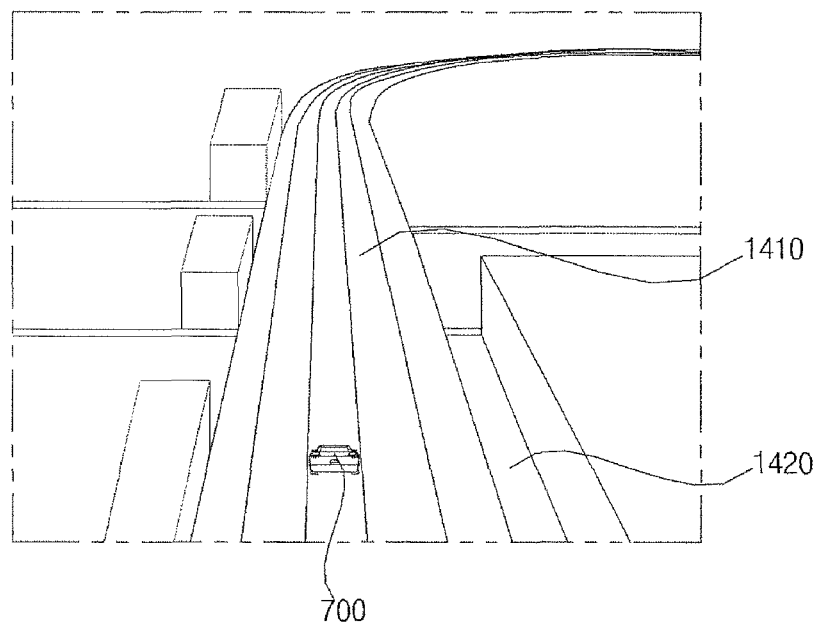
FIGS. 14A and 14B are diagrams illustrating examples of operations of a driver assistance apparatus or a display apparatus for a vehicle in a scenario in which the vehicle travels on a high-level road or a general road according to some implementations.
Figure 14B:
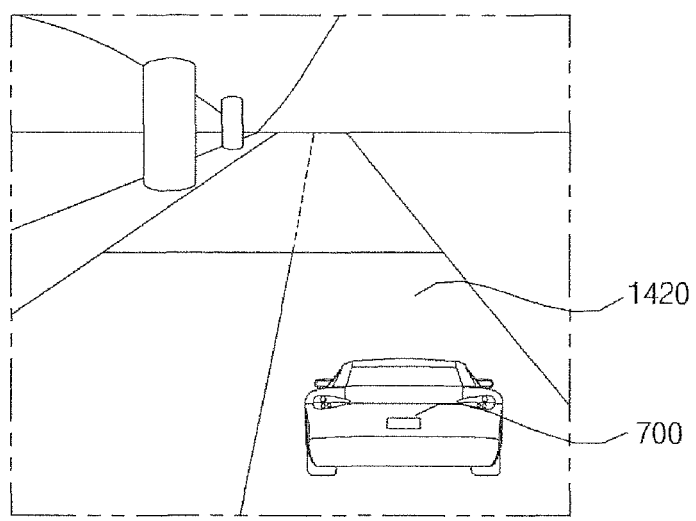

FIGS. 14A and 14B are views for explaining examples of operations of a driver assistance apparatus or a display apparatus for a vehicle when the vehicle travels on a high-level road or a general road.

As shown in FIG. 14A, when the vehicle 700 travels on a high-level road 1410, the navigation system may display the vehicle traveling on a general road 1420 near the high-level road 1410. In this case, it is necessary to update navigation information such that the navigation information represents that the road on which the vehicle 700 is traveling is the high-level road 1410.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a roadway from a sidewalk, a pillar supporting a high-level road, a shadow of the high-level road, a road sign, a road surface and a speed limit sign.

The processor 170 may check whether the road on which the vehicle 700 is traveling is a high-level road on the basis of the detected object. When at least one of a traffic light, a pedestrian, a two-wheeled vehicle, a crosswalk, a curb that separates a roadway from a sidewalk, a pillar supporting the high-level road and a shadow of the high-level road is not detected predetermined times or more from the acquired image, the processor 170 can detect the high-level road 1410 as the road on which the vehicle 700 is traveling.

If a direction indicated on a road sign or road surface detected from the acquired image is a direction in which the vehicle can travel only through the high-level road 1410, the processor 170 can detect the high-level road 1410 as the road on which the vehicle 700 is traveling.

If a speed limit indicated on a detected speed limit sign corresponds to a speed limit of the high-level road 1410, the processor 170 can detect the high-level road 1410 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle based on the first information travels on the general road 1420 near the high-level road 1410, the processor 170 can determine that the detected driving information is not consistent with the first information.

In this case, the processor 170 can generate the second information on the basis of the fact that the vehicle 700 is traveling on the high-level road 1410 and provide the second information to the display apparatus 400.

A description will be given of operation of the display apparatus 400 that provides the navigation function.

The processor 470 may generate the first information on the position of the vehicle 700 on the basis of GPS information acquired through the position information module 414. The processor 470 may provide the first information to the driver assistance apparatus 100. In the present implementation, the position of the vehicle 1390 based on the first information corresponds to the general road 1420.

If the second information representing that the vehicle 700 is traveling on the high-level road 1410 is received, the processor 470 may reflect the second information in the map and display, on the display 441, the vehicle 700 traveling on the high-level road 1410 on the map. In this case, the processor 470 can display an image corresponding to the vehicle 700 on the map in which the second information is reflected. When a destination is predetermined, the processor 470 may generate and display a route to the destination by reflecting the second information therein.

Referring to FIG. 14B, when the vehicle 700 travels on the general road 1420, the navigation system may display the vehicle traveling on the high-level road 1410 near the general road 1420. In this case, it is necessary to update navigation information such that the navigation information represents that the vehicle 700 is traveling on the general road 1420.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a roadway from a sidewalk, a pillar supporting a high-level road, a shadow of the high-level road, a road sign, a road surface and a speed limit sign.

The processor 170 may check whether the road on which the vehicle 700 is traveling is the general road 1420 on the basis of the detected object. When at least one of a traffic light, a pedestrian, a two-wheeled vehicle, a crosswalk, a curb that separates a roadway from a sidewalk, a pillar supporting the high-level road and a shadow of the high-level road is detected predetermined times or more from the acquired image, the processor 170 can detect the general road 1420 as the road on which the vehicle 700 is traveling.

If a direction indicated on a road sign or road surface detected from the acquired image is a direction in which the vehicle can travel only through the general road 1420, the processor 170 can detect the general road 1420 as the road on which the vehicle 700 is traveling.

If a speed limit indicated on a detected speed limit sign corresponds to a speed limit of the general road 1420, the processor 170 can detect the general road 1420 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle based on the first information travels on the high-level road 1410 near the general road 1420, the processor 170 can determine that the detected driving road is not consistent with the first information.

In this case, the processor 170 can generate the second information on the basis of the fact that the vehicle 700 is traveling on the general road 1420 and provide the second information to the display apparatus 400.

A description will be given of operation of the display apparatus 400 that provides the navigation function.

The processor 470 may generate the first information on the position of the vehicle 700 on the basis of GPS information acquired through the position information module 414. The processor 470 may provide the first information to the driver assistance apparatus 100. In the present implementation, the position of the vehicle 1390 based on the first information corresponds to the high-level road 1410.

If the second information representing that the vehicle 700 is traveling on the general road 1420 is received, the processor 470 may reflect the second information in the map and display, on the display 441, the vehicle 700 traveling on the general road 1420 on the map. In this case, the processor 470 can display an image corresponding to the vehicle 700 on the map in which the second information is reflected. When a destination is predetermined, the processor 470 may generate and display a route to the destination by reflecting the second information therein.

Figure 15A:
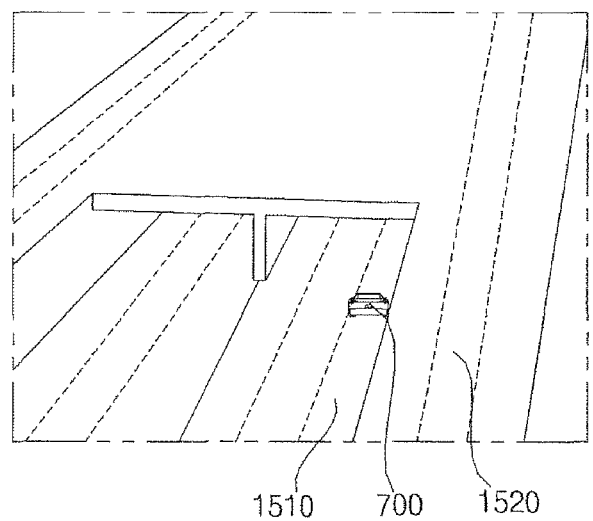
FIGS. 15A and 15B are diagrams illustrating examples of operations of a driver assistance apparatus or a display apparatus for a vehicle in a scenario in which the vehicle travels on an underground road or a general road according to some implementations.
Figure 15B:
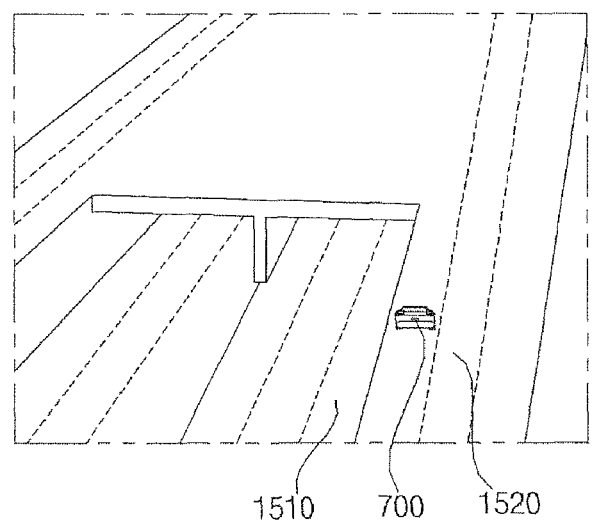

FIGS. 15A and 15B are views for explaining examples of operations of a driver assistance apparatus or a display apparatus for a vehicle when the vehicle travels on an underground roadway or a general road.

As shown in FIG. 15A, when the vehicle 700 travels on an underground roadway 1510, the navigation system may display the vehicle traveling on a general road 1520 near the underground roadway 1510. In this case, it is necessary to update navigation information such that the navigation information represents that the road on which the vehicle 700 is traveling is the underground roadway 1510.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a roadway from a sidewalk, lighting provided to an underground roadway, a traffic sign indicating entry into the underground roadway, an overhead clearance sign, a structure (e.g., ceiling or wall) constituting the underground roadway, a road sign, a road surface and a speed limit sign.

The processor 170 may check whether the road on which the vehicle 700 is traveling is an underground roadway on the basis of the detected object. When at least one of a traffic light, a pedestrian, a two-wheeled vehicle, a crosswalk and a curb that separates a roadway from a sidewalk is not detected predetermined times or more from the acquired image, the processor 170 can detect the underground roadway 1510 as the road on which the vehicle 700 is traveling.

If at least one of lighting provided to an underground roadway, a traffic sign indicating entry into the underground roadway, an overhead clearance sign, and a structure (e.g., ceiling or wall) constituting the underground roadway is detected predetermined times or more from the acquired image, the processor 170 may detect the underground roadway as the road on which the vehicle is traveling.

If a direction indicated on a road sign or road surface detected from the acquired image is a direction in which the vehicle can travel only through the underground roadway 1510, the processor 170 can detect the underground roadway 1510 as the road on which the vehicle 700 is traveling.

If a speed limit indicated on a detected speed limit sign corresponds to a speed limit of the underground roadway 1510, the processor 170 can detect the underground roadway 1510 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle based on the first information travels on the general road 1520 near the underground roadway 1510, the processor 170 can determine that the detected driving road information is not consistent with the first information.

In this case, the processor 170 can generate the second information on the basis of the fact that the vehicle 700 is traveling on the underground roadway 1510 and provide the second information to the display apparatus 400.

A description will be given of operation of the display apparatus 400 that provides the navigation function.

The processor 470 may generate the first information on the position of the vehicle 700 on the basis of GPS information acquired through the position information module 414. The processor 470 may provide the first information to the driver assistance apparatus 100. In the present implementation, the position of the vehicle 1390 based on the first information corresponds to the general road 1520.

If the second information representing that the vehicle 700 is traveling on the underground roadway 1510 is received, the processor 470 may reflect the second information in the map and display, on the display 441, the vehicle 700 traveling on the underground roadway 1510 on the map. In this case, the processor 470 can display an image corresponding to the vehicle 700 on the map in which the second information is reflected. When a destination is predetermined, the processor 470 may generate and display a route to the destination by reflecting the second information therein.

Referring to FIG. 15B, when the vehicle 700 travels on the general road 1520, the navigation system may display the vehicle traveling on the underground roadway 1510 near the general road 1520. In this case, it is necessary to update navigation information such that the navigation information represents that the vehicle 700 is traveling on the general road 1520.

Operation of the driver assistance apparatus 100 will now be described first.

The processor 170 may detect an object from an image acquired through the camera 195. Here, the object may be at least one of a traffic light, a pedestrian, a two-wheeled vehicle, a crosswalk, a curb that separates a roadway from a sidewalk, lighting provided to an underground roadway, a traffic sign indicating entry into the underground roadway, an overhead clearance sign, a structure (e.g., ceiling or wall) constituting the underground roadway, a road sign, a road surface and a speed limit sign.

The processor 170 may check whether the road on which the vehicle 700 is traveling is the general road 1520 on the basis of the detected object. When at least one of a traffic light, a pedestrian, a two-wheeled vehicle, a crosswalk and a curb that separates a roadway from a sidewalk is detected predetermined times or more from the acquired image, the processor 170 can detect the general road 1520 as the road on which the vehicle 700 is traveling.

If at least one of lighting provided to an underground roadway, a traffic sign indicating entry into the underground roadway, an overhead clearance sign, and a structure (e.g., ceiling or wall) constituting the underground roadway is not detected predetermined times or more from the acquired image, the processor 170 may detect the general road 1520 as the road on which the vehicle is traveling.

If a direction indicated on a road sign or road surface detected from the acquired image is a direction in which the vehicle can travel only through the general road 1520, the processor 170 can detect the general road 1520 as the road on which the vehicle 700 is traveling.

If a speed limit indicated on a detected speed limit sign corresponds to a speed limit of the general road 1520, the processor 170 can detect the general road 1520 as the road on which the vehicle 700 is traveling.

The processor 170 may determine whether the detected driving road is consistent with the first information received from the display apparatus 400. Here, the first information may be information on the position of the vehicle 700, which is generated on the basis of GPS information.

When the processor 170 checks that the vehicle based on the first information travels on the underground roadway 1510 near the general road 1520, the processor 170 can determine that the detected driving road is not consistent with the first information.

In this case, the processor 170 can generate the second information on the basis of the fact that the vehicle 700 is traveling on the general road 1520 and provide the second information to the display apparatus 400.

Figure 16:
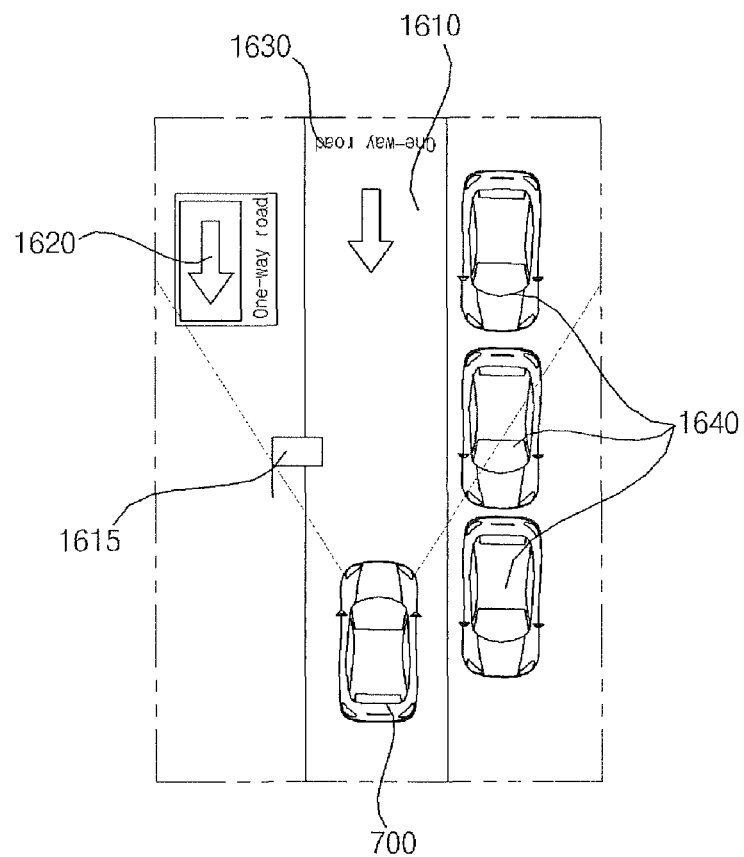
FIG. 16 is a diagram illustrating an example of operations of a driver assistance apparatus or a display apparatus for a vehicle in a scenario in which the vehicle travels the wrong way on a one-way road according to some implementations.

FIG. 16 is a view for explaining an examples of operations of a driver assistance apparatus or a display apparatus for a vehicle when the vehicle travels the wrong way on a one-way road.

Referring to FIG. 16, when the vehicle 700 travels the wrong way on a one-way road 1610, the navigation system may not recognize that the road on which the vehicle 700 is traveling is the one-way road 1610 and may display the vehicle 700 traveling the right way on the one-way road 1610. In this case, it is necessary to update navigation information such that the navigation information represents that the road on which the vehicle 700 is traveling is the one-way road 1610.

A description will be given of operation of the driver assistance apparatus 100.

The processor 170 may detect an object from an image acquired through the camera 195. Here, the object may be at least one of a traffic light 1615, a traffic sign 1620, a road surface 1630 and other vehicles 1640 parked near the vehicle 700.

The processor 170 may detect wrong-way driving situation of the vehicle 700 on the one-way road on the basis of the detected object.

If the back of the traffic light 1615 is detected from the acquired image, the processor 170 can detect the wrong-way driving situation of the vehicle 700. If text or an arrow indicating a direction opposite to a driving direction, which is indicated on the traffic sign 1620 or the road surface 1630, is detected, the processor 170 can detect the wrong-way driving situation of the vehicle 700. If other vehicles 1640 parked in a direction opposite to the driving direction are detected, the processor 170 can detect the wrong-way driving situation of the vehicle 700.

The processor 170 may determine whether the detected driving road is consistent with the first information received from the display apparatus 400. Here, the first information may be driving situation information of the vehicle 700, which is generated on the basis of GPS information.

When it is confirmed that the vehicle is traveling on a two-way road or traveling on a one-way road in the right direction on the basis of the first information, the processor 170 can determine that the detected driving situation information is not consistent with the first information. In this case, the processor 170 can generate the second information on the basis of the wrong-way driving situation of the vehicle 700 on the one-way road 1610 and provide the second information to the display apparatus 400.

A description will be given of operation of the display apparatus 400 providing the navigation function.

The processor 470 can generate the first information on the position of the vehicle 700 on the basis of GPS information and map information acquired through the position information module 414. The processor 470 can provide the first information to the driver assistance apparatus 100. In the present implementation, the driving situation based on the first information corresponds to driving on a two-way road or driving on a one-way road in the right direction.

If the second information representing that the vehicle 700 is traveling the wrong way on the one-way road 1610 is received, the processor 470 can reflect the second information in the map. The processor 470 can switch the road on which the vehicle 700 is traveling to the one-way road on the map and display the map on the display 441.

In this case, the processor 170 can display an image corresponding to the vehicle 700 on the map in which the second information is reflected. In addition, when a destination is predetermined, the processor 470 can generate and display a route to the destination by reflecting the second information therein.

Figure 17A:
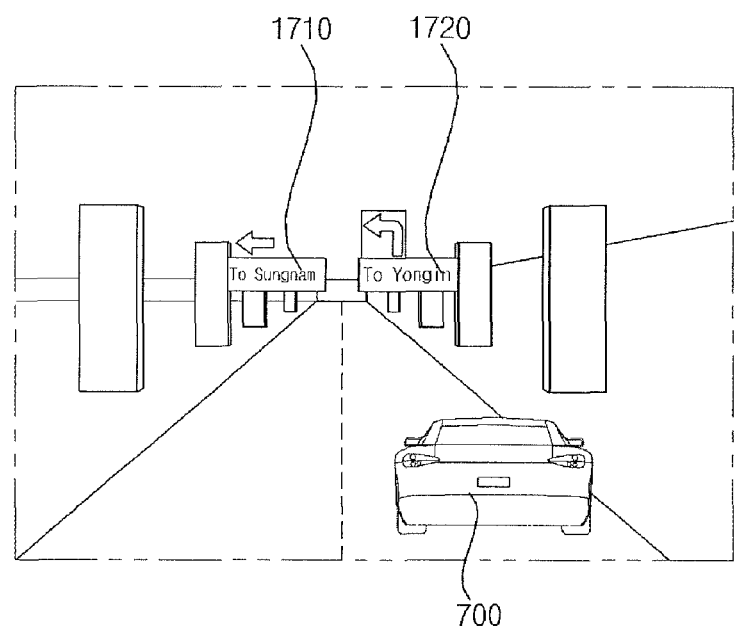
FIGS. 17A and 17B are diagrams illustrating examples of operations of a driver assistance apparatus or a display apparatus for a vehicle in a scenario in which the vehicle travels indoors according to some implementations.
Figure 17B:
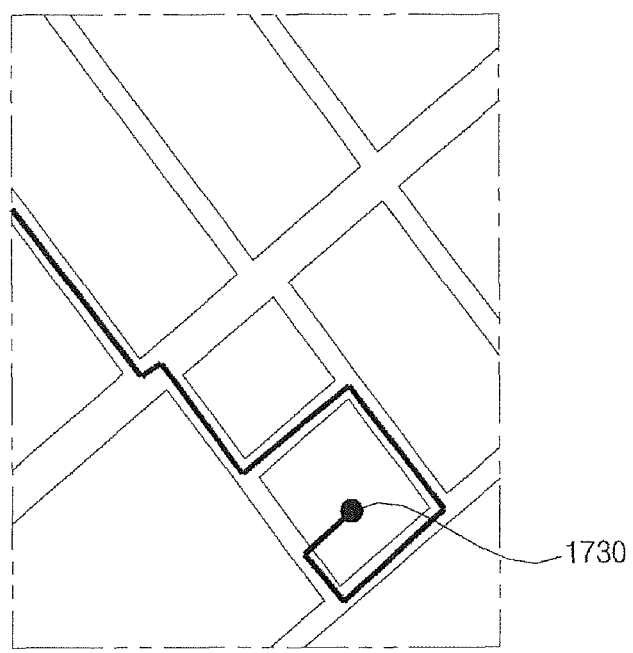

FIGS. 17A and 17B are views for explaining examples of operations of a driver assistance apparatus and a display apparatus for a vehicle when the vehicle travels indoors.

Referring to FIG. 17A, when the vehicle 700 travels indoors, the navigation system may not correctly display driving information of the vehicle 700. In this case, it is necessary to update navigation information such that the navigation information reflects indoor driving situation information of the vehicle 700.

A description will be given of operation of the driver assistance apparatus 100.

The processor 170 may detect an object from an image acquired through the camera 195. Here, the object may be, for example, at least one of a parked vehicle, a pillar, a structure constituting an indoor space, an entrance, and lighting provided to the indoor space.

The processor 170 may detect a location of the vehicle 700 in the indoor space on the basis of the detected object.

The processor 170 may receive the first information from the display apparatus 400 for the vehicle. Here, the first information may be information on the position of the vehicle 700, which is generated on the basis of GPS information. When the vehicle 700 is located indoors, the processor 170 can receive the first information from the display apparatus 400 for the vehicle. When the first information is not received, the processor 170 can recognize that the vehicle 700 is located indoors.

When the vehicle 700 is located indoors, the processor 170 can provide the second information, which is generated on the basis of direction signs 1710 and 1720 detected from the acquired image, to the display apparatus 400 for the vehicle.

An indoor parking lot may include the direction signs 1710 and 1720 for showing directions to drivers. In this case, the processor 170 can detect the direction signs 1710 and 1720. The processor 170 can generate the second information on the basis of the direction signs 1710 and 1720 and provide the second information to the display apparatus 400 for the vehicle.

When the vehicle 700 is moved from the indoor space to the outside, the GPS based first information can be received after a lapse of predetermined time from when the vehicle 700 is moved to the outside. When the first information is not received, the processor 170 can provide the second information which is generated on the basis of a road sign, a building and/or a direction sign, detected from an acquired image. For example, the processor 170 can detect a road sign, a building and/or a direction sign, which are located outdoors, from an image acquired through the camera 195 when the vehicle 700 is moved to the outside through an exit. The processor 170 can provide the second information generated on the basis of the road sign, the building and/or the direction sign.

A description will be given of operation of the display apparatus providing the navigation function.

Upon reception of the second information representing that the vehicle 700 is traveling on an underground roadway, the processor 470 can reflect the second information in the map and display the vehicle 700 located inside of a predetermined building on the map through the display 441.

When the vehicle 700 is traveling in the building, the processor 470 can display the vehicle on the display 441 by reflecting the traveling situation therein. In this case, the processor 470 can display an image corresponding to the vehicle 700 on the map in which the second information is reflected. In addition, if a destination is predetermined, the processor 470 can generate a route to the destination by reflecting the second information therein and display the route.

When the vehicle 700 is moved to the outside from the building, the processor 470 can reflect the received second information in the map and display the map on the display 441. In this case, the second information may be information on the position of the vehicle, which is generated on the basis of a road sign, a building and/or a direction sign detected from an acquired image.

Referring to FIG. 17B, the processor 470 can display a route 1730 from the point where the vehicle 700 is located to a predetermined destination on the map in which the second information is reflected through the display 441. Here, the position of the vehicle 700 may be the inside of a predetermined building.

Figure 18A:
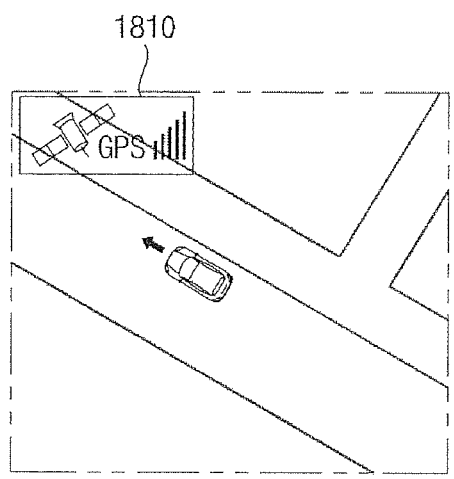
FIGS. 18A to 18D are diagrams illustrating examples of operations of a display apparatus for a vehicle with a driver assistance apparatus in a scenario in which first information or second information is applied to a map according to some implementations.
Figure 18B:
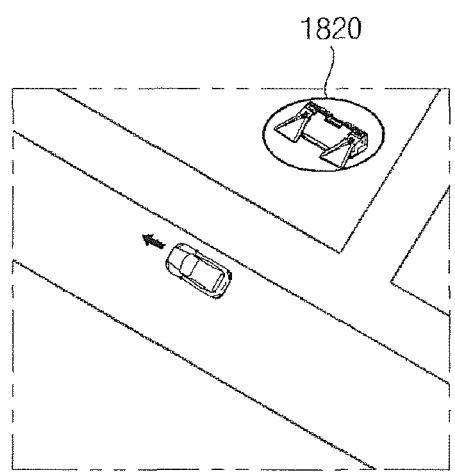
Figure 18C:
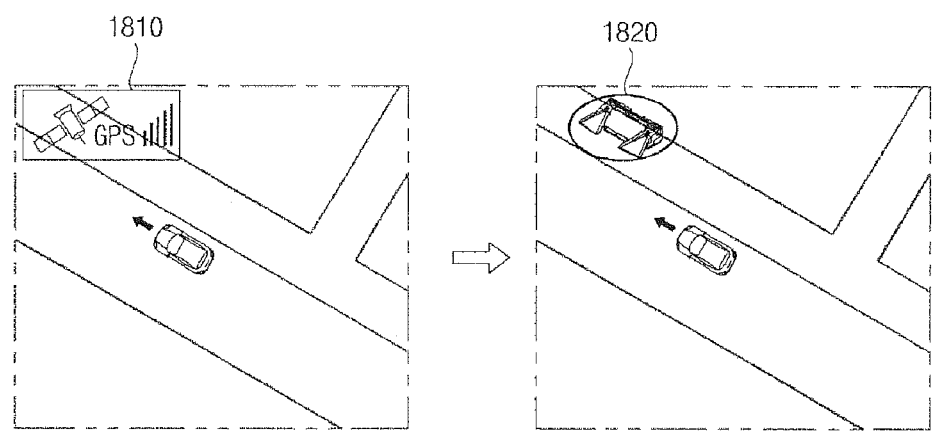

FIGS. 18A to 18C are views for explaining examples of operations of a display apparatus for a vehicle when the first information or the second information is reflected in the map.

Referring to FIG. 18A, when the navigation function is provided on the basis of the first information based on GPS information, the processor 470 of the display apparatus for the vehicle may display a first icon 1810 in a region of the display 441. Here, the first icon 1810 may be an icon corresponding to the first information. That is, the first icon 1810 indicates provision of the navigation function based on the first information to a driver.

The processor 470 may output information representing provision of the navigation function based on the first information through the audio output unit 442.

Referring to FIG. 18B, when the navigation function is provided on the basis of the second information based on image information, the processor 470 of the display apparatus for the vehicle may display a second icon 1820 in a region of the display 441. Here, the second icon 1820 may be an icon corresponding to the second information. That is, the second icon 1820 indicates provision of the navigation function based on the second information to the driver.

The processor 470 may output information representing provision of the navigation function based on the second information through the audio output unit 442.

Referring to FIG. 18C, while the navigation function is provided on the basis of the first information, the processor 470 of the display apparatus for the vehicle may display the first icon 1810 in a region of the display 441.

When information applied to the navigation system is changed from the first information to the second information while the first icon 1810 is displayed, the processor 470 can change the first icon 1810 to the second icon 1820 and display the second icon 1820. Here, the processor 470 may control the first icon 1810 to gradually disappear. The processor 470 may display the second icon 1820 in the region in which the first icon 1810 was disposed. Here, the processor 470 may process the second icon 1820 to gradually become distinct. This can aid in safe driving since the driver is less distracted by displayed information.

Figure 18D:
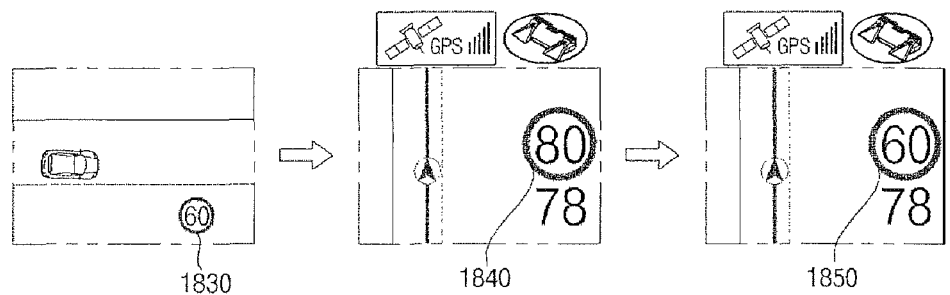

FIG. 18D is a view for explaining an example of operations of updating speed limit information.

Referring to FIG. 18D, the processor 170 of the driver assistance apparatus 100 may detect a speed limit sign 1830 from an acquired image while the vehicle 700 is traveling. A speed limit detected from the speed limit sign 1830 may differ from a speed limit 1840 provided by the display apparatus 400 providing the navigation function. In this case, the processor 170 can provide speed limit information 1850 to the display apparatus 400 for the vehicle.

Upon reception of the speed limit information 1850, the processor 470 of the display apparatus 400 for the vehicle can display a screen in which the received speed limit information 1850 has been reflected on the display 441.

The processor 470 of the display apparatus 400 for the vehicle may transmit actual speed limit information to external devices 600, 500 and 510 through the communication unit 410. The external devices 600, 500 and 510 may update databases on the basis of the received actual speed limit information.

Figure 19:
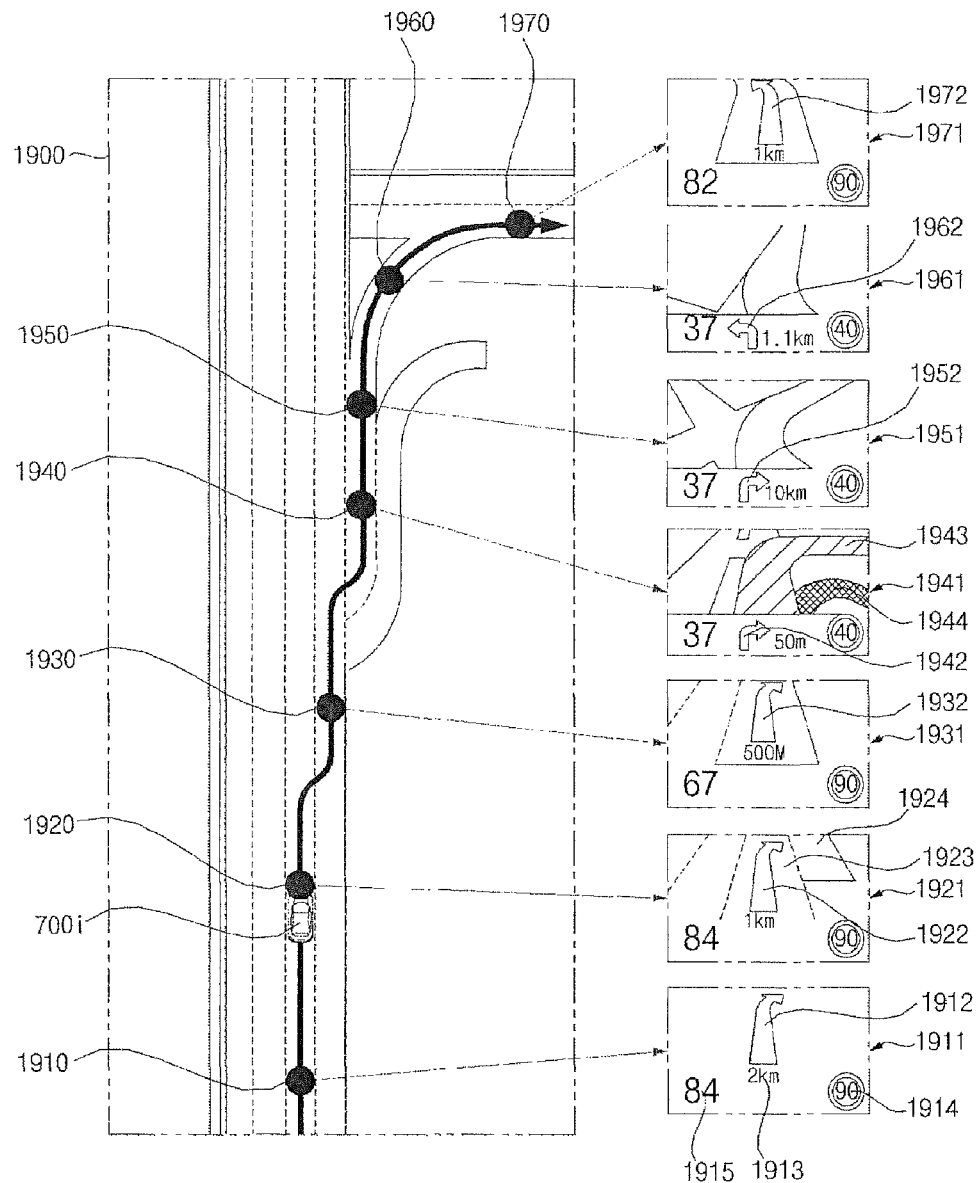
FIG. 19 is a diagram illustrating an example of an operation of matching a turn-by-turn (TBT) image to a point corresponding to a lane on which a vehicle is traveling and displaying the matched image according to some implementations.

FIG. 19 is a view explaining an example of an operation of matching a TBT image to a point corresponding to a lane in which a vehicle is being driven and displaying the TBT image thereon.

Referring to FIG. 19, the processor 470 may control the display 441 to display a map 1900. While FIG. 19 shows that the map 1900 is displayed in the form of a top view, implementations are not limited thereto and the processor 470 may display the map in various manners.

The display 441 may be implemented to display an image in a region of the windshield. In this case, the processor 470 may control the display 441 to display the map in a region of the windshield.

The processor 470 may control the display 441 to display the current position of the vehicle 700 on the map 1900. The processor 470 may display the current position of the vehicle 700 on the basis of GPS information. The processor 470 may display an image 700i corresponding to the vehicle 700 at a point 1920 on the map 1900, which corresponds to the position of the vehicle 700.

Points 1910, 1920, 1930, 1940, 1950, 1960, and 1970 are indicated on the map 1900, which correspond to positions of the vehicle. Display screens 1911, 1921, 1931, 1941, 1951, 1961 and 1971 are displayed when the vehicle is located at the points 1910, 1920, 1930, 1940, 1950, 1960 and 1970 on the map 1900, respectively. The processor 470 may control the display 441 to display each screen in a region of the windshield.

If the vehicle 700 is located at a first position on the corresponding road, the processor 470 can control the display 441 to display the vehicle image 700i at the first point 1910 corresponding to the first position. Here, the processor 470 may control the display 441 to display the first screen 1911 on the windshield.

The processor 470 may display a TBT image 1912, a distance 1913 to a change point, a speed limit 1914 and a vehicle speed 1915 on the first screen 1911.

If the vehicle 700 is located at a second position on the road, the processor 470 can control the display 441 to display the vehicle image 700i at the second point 1920 corresponding to the second position. Here, the processor 470 can control the display 441 to display the second screen 1921 on the windshield.

The processor 470 may display a TBT image 1922 on the second screen 1921. The processor 470 may control the display 441 to display the TBT image 1922 in a first region 1923 corresponding to the lane in which the vehicle is being driven. The processor 470 may control the display 441 to display the first region 1923 and a second region 1924 in different colors. Here, the first region 1923 may be a region corresponding to the lane in which the vehicle 700 is being driven and the second region 1924 may be a region corresponding to a lane other than the lane in which the vehicle 700 is being driven. For example, the second region 1924 can be a region corresponding to a lane that the vehicle 700 will enter.

The processor 470 may control the display 441 to give perspective to the TBT image 1922 displayed thereon. For example, the processor 470 can give perspective to the TBT image 1922 by varying the width of the displayed TBT image 1922 in the length direction.

For example, when the vehicle 700 is located at a third position on the road, the processor 470 can control the display 441 to display the vehicle image 700i at the third point 1930 corresponding to the third position. Here, the processor 470 can control the display 441 to display the third screen 1931 on the windshield.

For example, when the vehicle 700 is located at a fourth position on the road, the processor 470 can control the display 441 to display the vehicle image 700i at the fourth point 1940 corresponding to the fourth position. Here, the processor 470 can control the display 441 to display the fourth screen 1941 on the windshield.

The processor 470 may control the display 441 to display a TBT image 1943 in a region which does not correspond to the lane in which the vehicle is being driven. For example, when the vehicle 700 is located at a fifth position on the road, the processor 470 can control the display 441 to display the vehicle image 700i at the fifth point 1950 corresponding to the fifth position. Here, the processor 470 may control the display 441 to display the fifth screen 1951 on the windshield.

If the vehicle 700 is located at a sixth position on the road, the processor 470 can control the display 441 to display the vehicle image 700i at the sixth point 1960 corresponding to the sixth position. Here, the processor 470 may control the display 441 to display the sixth screen 961 on the windshield.

If the vehicle 700 is located at a seventh position on the road, the processor 470 can control the display 441 to display the vehicle image 700i at the seventh point 1970 corresponding to the seventh position. Here, the processor 470 may control the display 441 to display the seventh screen 1971 on the windshield.

Figure 20A:
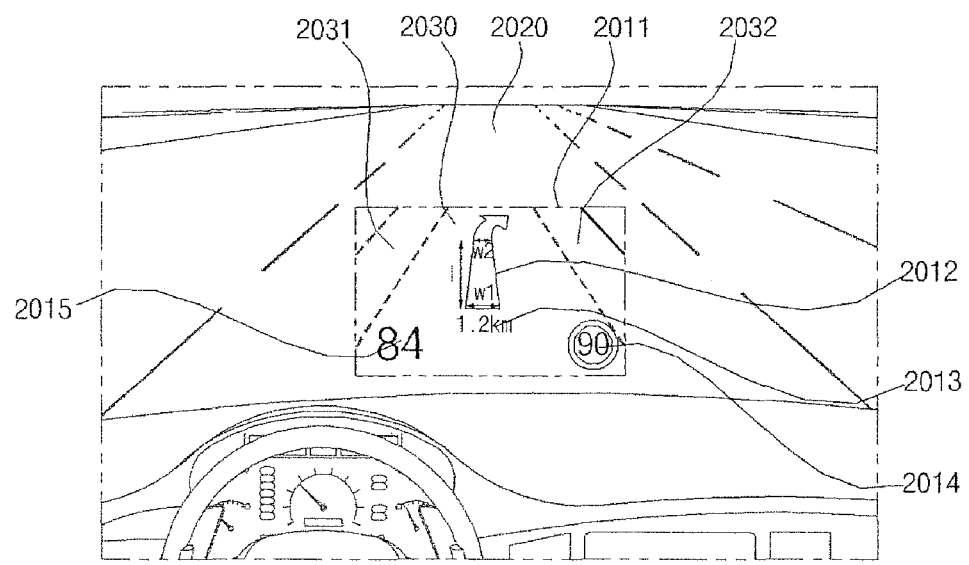
FIGS. 20A and 20B are diagrams illustrating an example of a screen displayed on a region of a windshield of a vehicle according to some implementations.
Figure 20B:
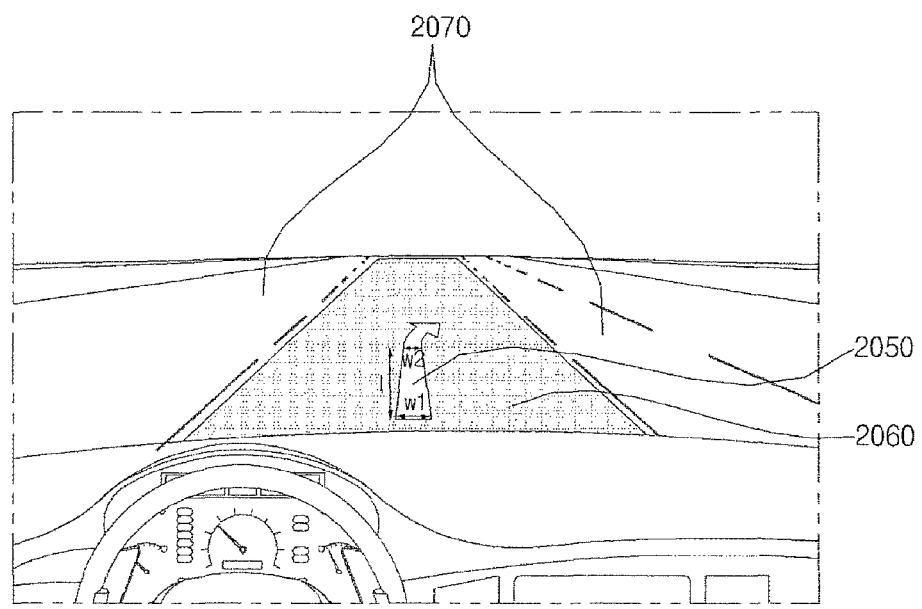

FIGS. 20A and 20B are views explaining examples of images displayed in a region of a windshield of a vehicle.

Referring to FIG. 20A, the processor 470 may receive information on a lane in which the vehicle is being driven, from the driver assistance apparatus 100 through the interface 480.

The processor 470 may control the display 441 to display a screen 2011 in a region of the windshield. The processor 470 may display the screen 2011 in a first region. Here, the first region may be a region corresponding to the lane in which the vehicle is being driven. For example, the first region can correspond to a point of the windshield, which meets a line connecting the eyes of the user and the lane 1020 when the user looks at the lane 2020 in which the vehicle is being driven.

The processor 470 may control the display 441 to display the screen 2011 translucently. The display 441 includes a transparent display or a projection module and the processor 470 may control the transparent display or the projection module to display the screen 2011 translucently. According to an implementation, the processor 470 may control the display 441 to adjust the transparency of the screen 2011. The display 441 includes a transparent display or a projection module and the processor 470 can control the transparent display or the projection module to adjust transparency.

The processor 470 may control the display 441 to display a lane image 2030 corresponding to the lane in which the vehicle is being driven. In this case, the processor 470 may display the lane image 2030 along with images 2031 and 2032 corresponding to lanes other than the lane in which the vehicle is being driven.

The processor 470 may display a TBT image 2012 on the lane image 2030. The processor 470 may control the display 441 to display the TBT image on the screen 2011. The processor 470 may control the display 441 to give perspective to the TBT image 2012 displayed thereon. For example, the processor 470 can give perspective to the TBT image 2012 by displaying the TBT image 2012 in different widths w1 and w2 in the length direction 1. The processor 470 may give perspective to the TBT image 2012 by displaying the TBT image 2012 in such a manner that the width w1 thereof, closer to the user, is greater than the width w2 thereof at a distance from the user.

The processor 470 may control the display 441 to display information 2013 on a distance to a change point on the screen 2011. The processor 470 may control the display 441 to display speed limit information 2014 or vehicle speed information 2015 on the screen 2011.

Referring to FIG. 20B, the processor 470 may receive information on the lane in which the vehicle is being driven from the driver assistance apparatus 100 through the interface 480.

The processor 470 may control the display 441 to display a TBT image 2050 in a first region 2060 of the windshield. Here, the first region 2060 corresponds to the lane in which the vehicle is being driven. That is, the first region 2060 may be a region of the windshield, which meets a line connecting the eyes of the user and the road when the user looks at the road through the windshield.

The processor 470 may control the display 441 to display the first region 2060 of the windshield, which corresponds to the lane in which the vehicle is being driven, and a second region 2070 of the windshield, which corresponds to a lane other than the lane, in different colors.

As described above with reference to FIG. 20A, the processor 470 can control the display 441 to give perspective to the displayed TBT image 2050.

Figure 21A:
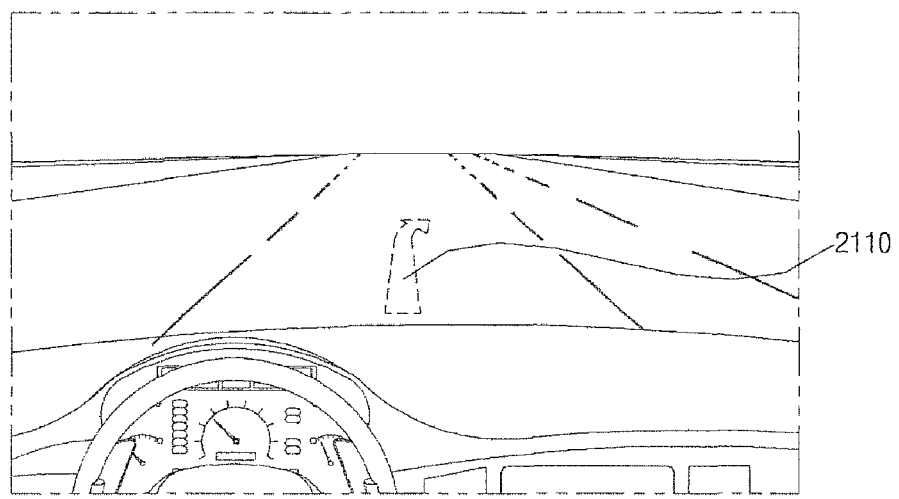
FIGS. 21A and 21B are diagrams illustrating an example of a TBT image display operation corresponding to lane change according to some implementations.
Figure 21B:
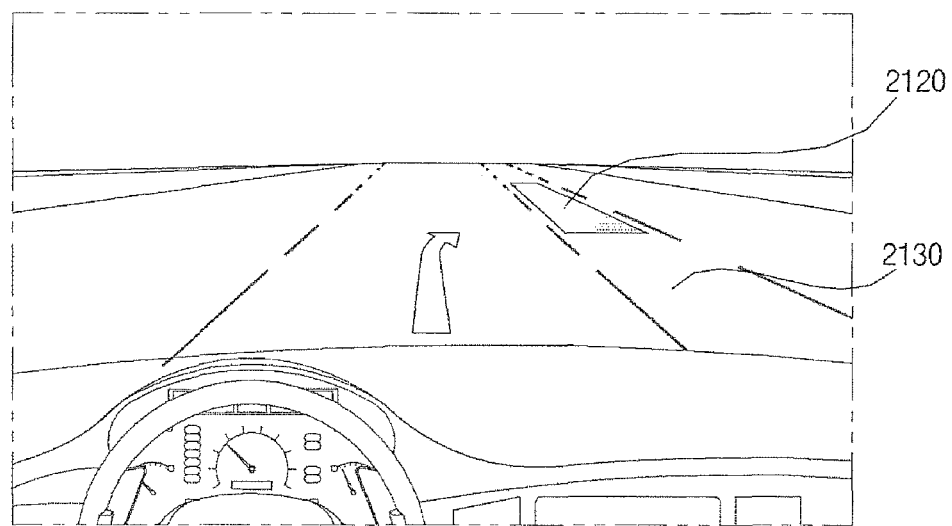

FIGS. 21A and 21B are views explaining examples of operations of displaying a TBT image corresponding to lane change.

When it is necessary to change the lane in which the vehicle is being driven to a neighboring lane, the processor 470 may control the display 441 to display a TBT image corresponding to lane change.

Referring to FIG. 21A, the processor 470 may control the display 441 to display a TBT image corresponding to lane change. Here, lane change may be performed on the route as necessary when the vehicle needs to enter, exit or change roads.

The TBT image corresponding to lane change may be displayed differently from a TBT image corresponding to direction change. The TBT image corresponding to lane change may be displayed in a shape, color, transparency or line shape different from the TBT image corresponding to direction change. As shown in FIG. 21A, the TBT image corresponding to lane change may be displayed using a dotted line.

Referring to FIG. 21B, when a lane change point 2130 is determined, the processor 470 may control the display 441 to display an indicator 2120 that indicates the lane change point 2130. Here, the lane change point 2130 can be determined on the basis of the vehicles that are being driven on neighboring lanes and a distance to a change point. The vehicles that are being driven on the neighboring lanes may be detected by the driver assistance apparatus 100. The distance to the change point may be checked on the basis of the map and GPS information.

The processor 470 may display the indicator 2120 in a color different from other regions, from the lane change point on the lane 2130 to be changed from the current lane.

Figure 22:
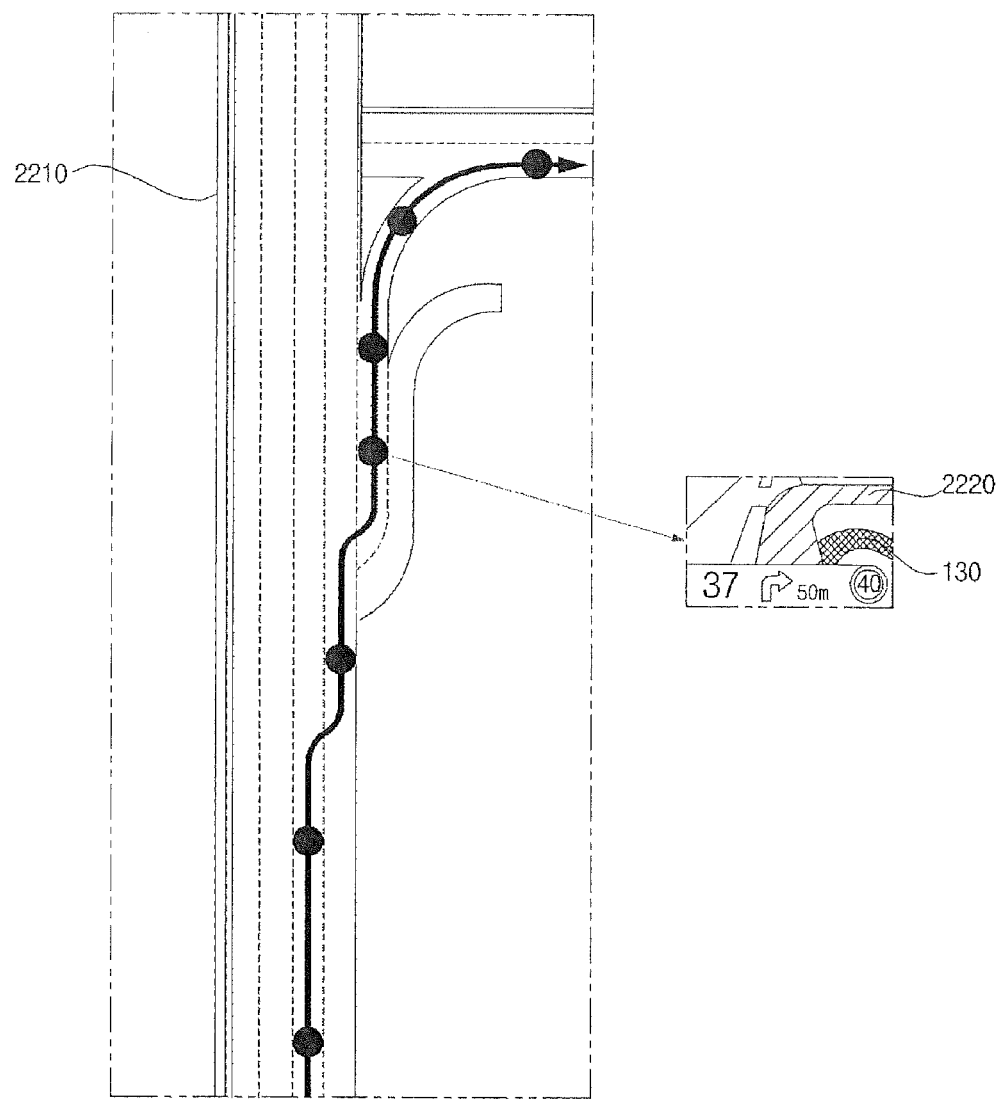
FIG. 22 is a diagram illustrating an example of an operation of displaying regions corresponding to a plurality of forks in a road according to some implementations.

FIG. 22 is a view explaining an example of an operation of displaying regions corresponding to a plurality of forks in a road.

Referring to FIG. 22, when the lane in which the vehicle is being driven meets a plurality of forks, the processor 470 may control the display 441 to display a first region 2220 of the windshield, which corresponds to a first fork, and a second region 2230 of the windshield, which corresponds to a second fork, in different colors. Here, the first fork may be a road matched to the route on the map, from among the plurality of forks, and the second fork may be a road other than the first fork from among the plurality of forks.

FIGS. 23A to 23I are views explaining examples of operations of displaying an image corresponding to information.

The processor 470 may control the display 441 to display an image corresponding to information. The processor 470 may receive information through the communication unit 410 or the input unit 420. Furthermore, the processor 470 may receive information from the driver assistance apparatus 100, the sensing unit 760 or the controller 770 through the interface 480.

Figure 23A:
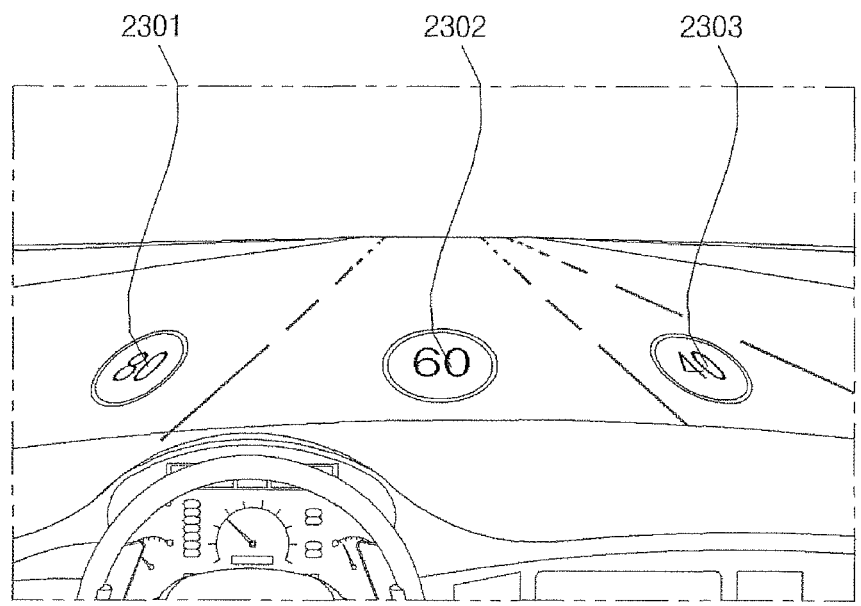
FIGS. 23A to 23L are diagrams illustrating examples of an operation of further displaying an image corresponding to information according to some implementations.

As shown in FIG. 23A, the processor 470 may control the display 441 to display images 2301, 2302 and 2303 corresponding to speed limits of a road.

The driver assistance apparatus 100 may detect information on speed limits of roads by recognizing road signs. The processor 470 may receive the information on speed limits from the driver assistance apparatus 100 through the interface 480.

When a road has a plurality of lanes, the respective lanes may have different speed limits. For example, speed limits of first, second and third lanes may be 80 km, 60 km and 40 km, respectively. In this case, the processor 470 may display the images 2301, 2302 and 2303 respectively corresponding to the speed limits of the lanes in regions of the windshield, which respectively correspond to the lanes. Here, the processor 470 may control the display 441 to display the images 2301, 2302 and 2303 on the same plane as that formed by the surface of the road. Accordingly, the user can intuitively recognize the speed limits of the respective lanes.

Figure 23B:
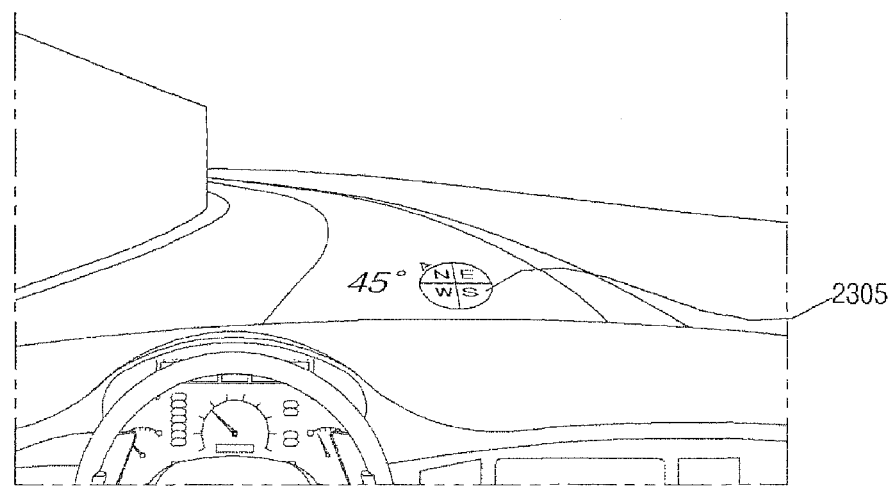

Referring to FIG. 23B, the processor 470 may control the display 441 to display an image 2305 corresponding to a heading of the vehicle 700. Here, the image 2305 may be a compass image.

The processor 470 may receive information on the heading of the vehicle from the sensing unit 760 through the interface 480. Here, the information on the direction of the vehicle may be information sensed by a heading sensor.

The processor 470 may display north, south, east or west to which the vehicle is driven.

When the direction of the vehicle is changed, the processor 470 may naturally change the image 2305 in the changed direction by applying animation effects to the image 2305.

Figure 23C:
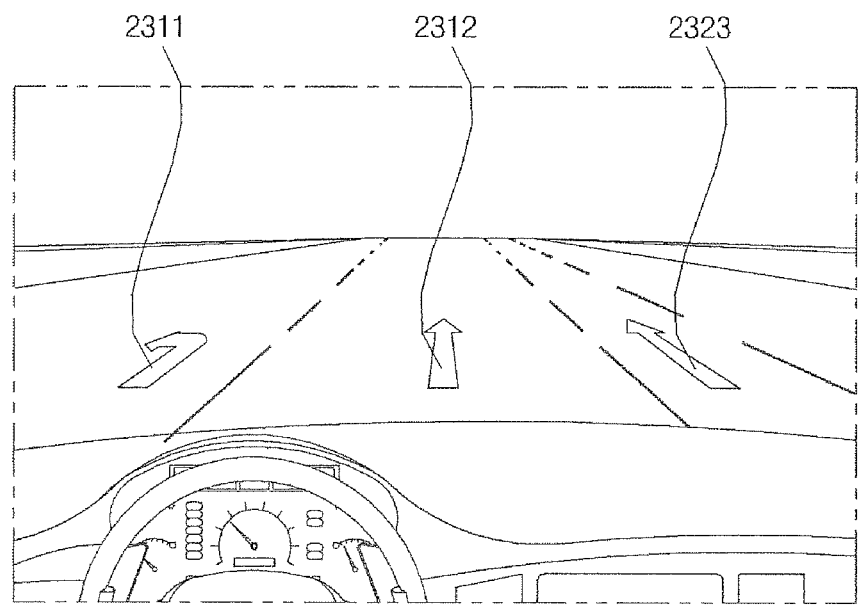

Referring to FIG. 23C, the processor 470 may control the display 441 to display images 2311, 2312 and 2313 corresponding to lane information. The processor 470 may receive the lane information from the driver assistance apparatus 100 through the interface 480.

The driver assistance apparatus 100 may detect the lane information on the basis of images of road sings or an image of the surface of the corresponding road. Here, the lane information may be information indicating a normal lane, a left-turn lane, a right-turn lane and a U-turn lane at a change point.

The processor 470 may display one of a normal image, a left-turn image, a right-turn image and a U-turn image respectively corresponding to the lane information. In this case, the processor 470 may display each image in a region of the windshield, which corresponds to each lane.

Figure 23D:
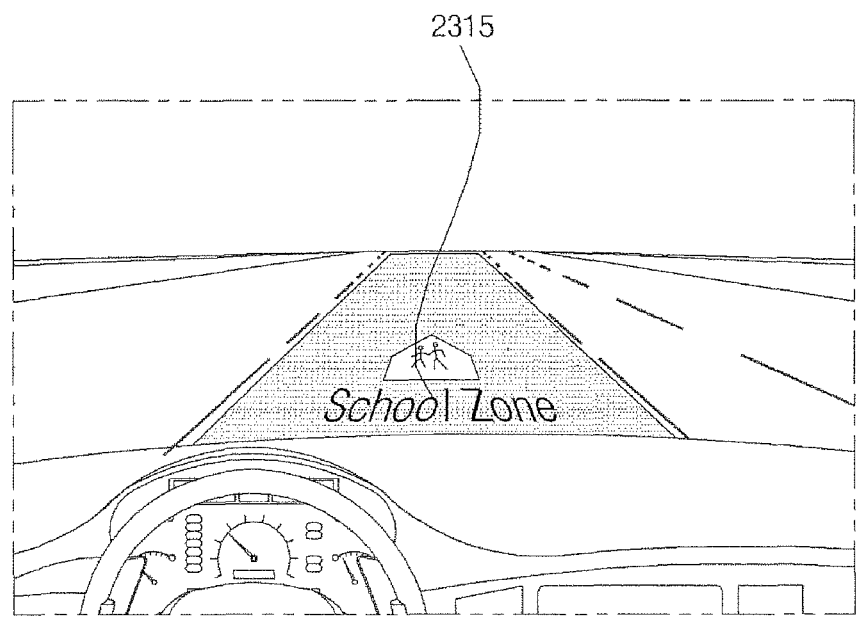

Referring to FIG. 23D, the processor 470 may control the display 441 to display an image 2315 corresponding to lane information. The processor 470 may receive the lane information from the driver assistance apparatus 100 through the interface 480.

The driver assistance apparatus 100 may detect the lane information on the basis of images of road signs or an image of the surface of the corresponding road. Here, the lane information may be information on a school zone lane or a high occupancy vehicle lane.

The processor 470 may control the display 441 to display the image 2315 corresponding to the information on the school zone lane or high occupancy vehicle lane in a region of the windshield, which corresponds to the school zone lane or high occupancy vehicle lane.

Figure 23E:
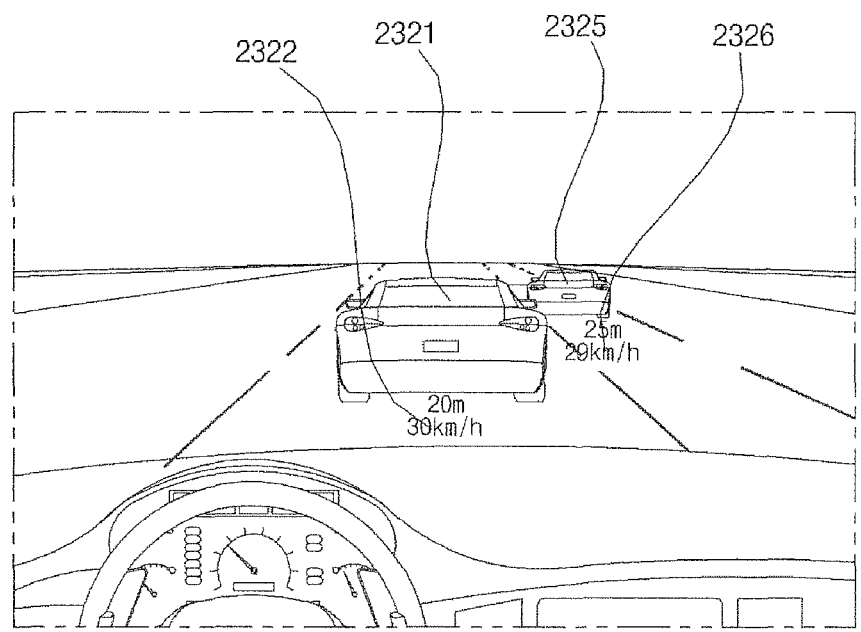

Referring to FIG. 23E, the processor 470 may control the display 441 to display an image 2322 corresponding to distances to objects 2321 and 2325 or speed information. The processor 470 may receive object information from the driver assistance apparatus 100 through the interface 480.

The driver assistance apparatus 100 may detect an object and generate object information. Here, the object information may include presence or absence of the object, a distance to the object and the speed of the object. In addition, the driver assistance apparatus 100 may calculate the distance to the object and the speed of the object on the basis of disparity calculation of stereo cameras or a variation in object size with time, acquired through a mono camera.

The processor 470 may control the display 441 to display the object information. The processor 470 may control the display 441 to display the object information differently depending on the distance to the object.

For example, the processor 470 can control the display 441 to display the image 2322 corresponding to the object information in different transparencies, colors and sizes in response to the distance to the object.

Figure 23F:
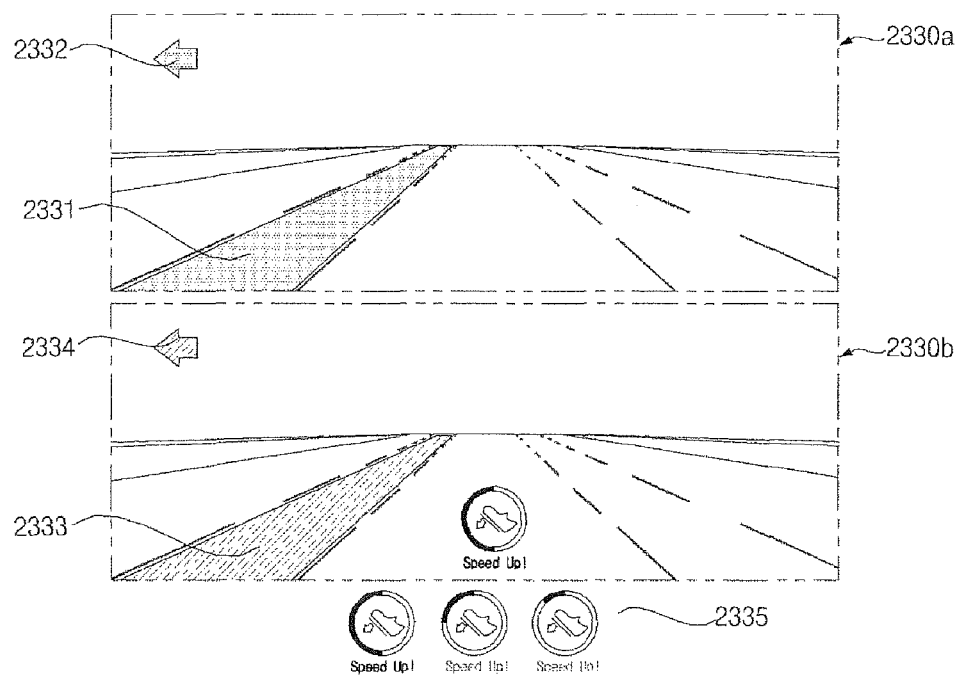

Referring to FIG. 23F, the processor 470 may control the display 441 to display an image corresponding to lane change information.

When the user inputs turn signal information for lane change during driving, the processor 470 may receive the turn signal information from the controller 770 through the interface 480. The processor 470 may recognize user's intention of changing lanes through the turn signal information.

The processor 470 may receive object information regarding a lane to be changed to from the driver assistance apparatus 100 through the interface 480.

The driver assistance apparatus 100 may detect an object from the lane to be changed to on the basis of an around view image. The processor 470 may control the display 441 to display an image corresponding to lane change information.

When an object is not detected from the lane to be changed to within a predetermined distance while a turn signal has been input, as indicated by reference numeral 1330*a*, the processor 470 may control the display 441 to display a region 1331 of the windshield, which corresponds to the lane to be changed to, in a first color. Here, the first color may be a color by which the user can intuitively recognize that the lane can be changed. For example, the first color is green.

When an object is not detected from the lane to be changed to within a predetermined distance while a turn signal has been input, the processor 470 may control the display 441 to display an arrow image 2332 in the first color. Here, the first color may be a color by which the user can intuitively recognize that the lane can be changed. For example, the first color is green.

When a turn signal is input, as indicated by reference numeral 2330*b*, and an object is detected from the lane to be changed to within a predetermined distance, the processor 470 may control the display 441 to display a region 2333 of the windshield, which corresponds to the lane to be changed to, in a second color. Here, the second color may be a color by which the user can intuitively recognize that there is concern of traffic accident when the lane is changed. For example, the first color can be red.

When a turn signal is input and an object is detected from the lane to be changed to within a predetermined distance, the processor 470 may control the display 441 to display an arrow image 2334 in the second color. Here, the second color may be a color by which the user can intuitively recognize that there is concern of traffic accident when the lane is changed. For example, the first color can be red.

When an object is detected in the lane to be changed to within a predetermined distance, the processor 470 may control the display 441 to display an icon 2335 indicating that acceleration is required. Here, the icon may be an accelerator pedal image. The processor 470 may display a rim around the accelerator pedal image and change the color of the rim according to acquired acceleration degree.

Figure 23G:
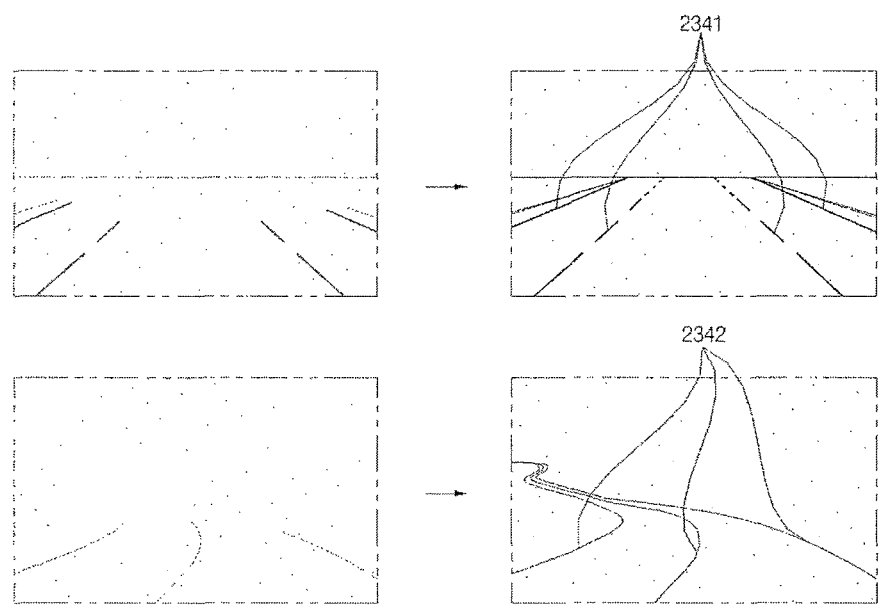

Referring to FIG. 23G, the processor 470 may control the display 441 to display images 2341 and 2342 corresponding to lane information. The processor 470 may receive the lane information from the driver assistance apparatus 100 through the interface 480.

The driver assistance apparatus 100 may detect a lane. At night, particularly, the driver assistance apparatus 100 can detect a lane even in a dark environment by adjusting exposure of the camera and generate lane information.

The processor 470 may control the display 441 to display images 2341 and 2342 in a region corresponding to the lanes.

The processor 470 may recognize whether the front road is an uphill road or a downhill road through map data stored in the memory 430. In this case, the processor 470 may display the image 2342 in three dimensions by indicating an uphill or downhill road.

Figure 23H:
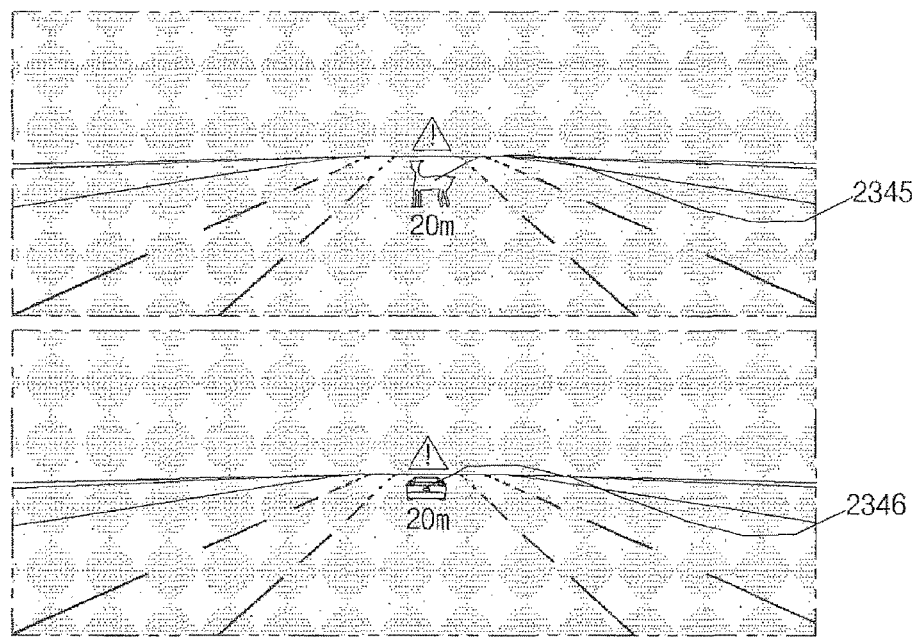

Referring to FIG. 23H, the processor 470 may control the display 441 to display images 2345 and 2346 corresponding to object information.

The vehicle 700 may further include a night vision device (not shown). The night vision device (not shown) can sense an object using a thermal imaging camera. Here, the object may be a person or animal that radiates heat.

The processor 470 may receive object information from the night vision device (not shown) through the interface 480. The processor 470 may display the image 2345 corresponding to the received object information in a region of the windshield, which corresponds to a region in which the object is located, during night driving.

The vehicle 700 may further include a radar system (not shown) or a lidar system (not shown). The radar system (not shown) can sense an object using radio waves. The lidar system (not shown) can sense an object using infrared lasers.

The processor 470 may receive object information from the radar system (not shown) or the lidar system (not shown) through the interface 480. The processor 470 may display the image 2346 corresponding to the received object information in a region of the windshield, which corresponds to a region in which the corresponding object is located, during driving in bad weather.

Figure 23I:
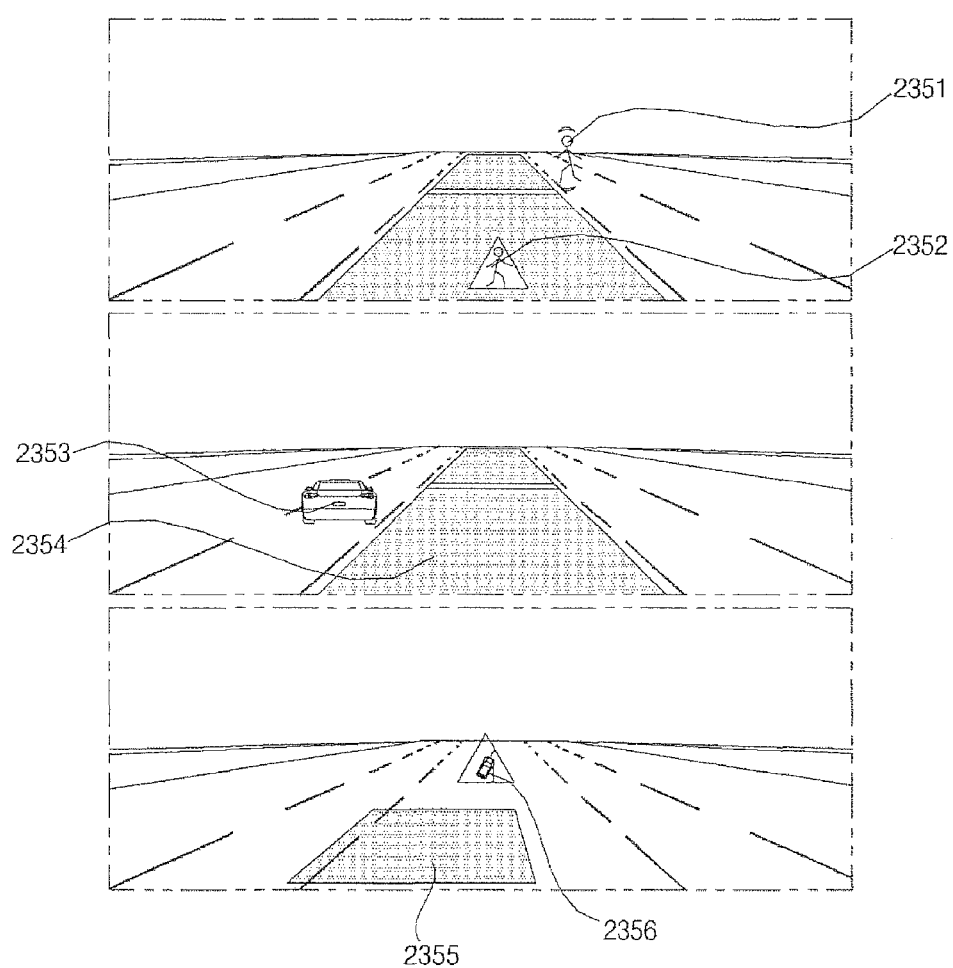

Referring to FIG. 23I, the processor 470 may control the display 441 to display an image corresponding to object information. The processor 470 may receive the object information from the driver assistance apparatus 100 through the interface 480.

The driver assistance apparatus 100 may detect an object on the basis of a front view image or an around view image of the vehicle. Here, the object may be a pedestrian, another vehicle or a lane.

Upon reception of information on detection of a pedestrian 2351, the processor 470 may display a pedestrian caution image 2352 corresponding to the received information in a region of the windshield.

Upon reception of information on lane change of a neighboring vehicle 2353 to the lane in which the vehicle 700 is being driven, the processor 470 may display a collision caution image 2354 corresponding to the received information in a region of the windshield. Upon reception of information on lane departure of the vehicle 700, the processor 470 may display a lane departure caution image 2355 corresponding to the received information in a region of the windshield.

Figure 23J:
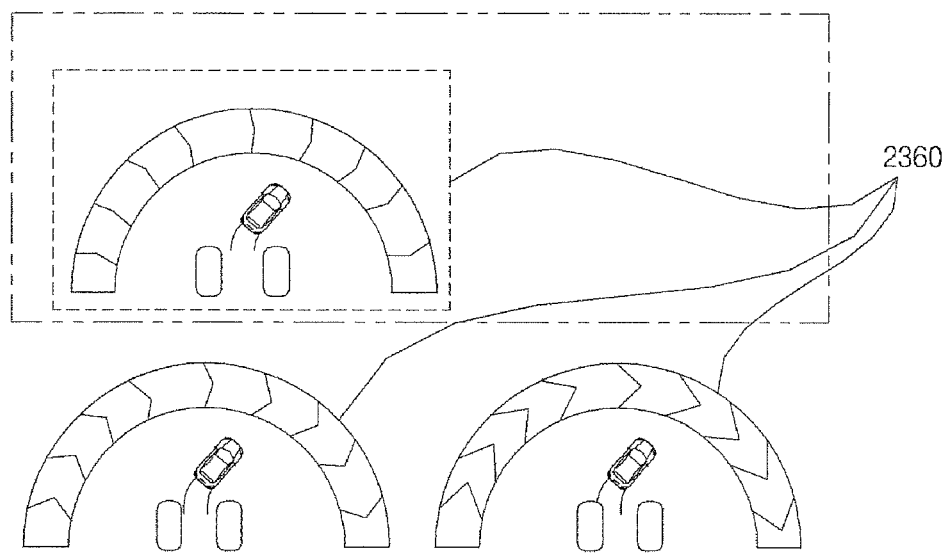

Referring to FIG. 23J, the processor 470 may control the display 441 to display an image 2360 corresponding to information on steering wheel rotation during parking. The processor 470 may receive the information on steering wheel rotation from the sensing unit 760 through the interface 480.

The processor 470 may receive information on neighboring objects from the driver assistance apparatus 100 through the interface 480.

The processor 470 may display the image 2360 corresponding to the position of the vehicle 700 during parking and the information on steering wheel rotation, on the basis of the information on neighboring objects and the information on steering wheel rotation. Specifically, the processor 470 can display the steering wheel image 2360 in different colors according to possibility that the vehicle 700 collides with a neighboring vehicle depending on a degree of steering wheel rotation.

For example, when collision with a neighboring vehicle is anticipated according to steering wheel rotation degree, the processor 470 can display the steering wheel image 1360 in a first color. If collision with a neighboring vehicle is not anticipated according to steering wheel rotation degree, the processor 470 can display the steering wheel image 1360 in a second color.

When the possibility that the vehicle 700 collides with a neighboring vehicle is expected to be within a predetermined range according to steering wheel rotation degree, the processor 470 may display the steering wheel image 1360 in a third color.

Figure 23K:
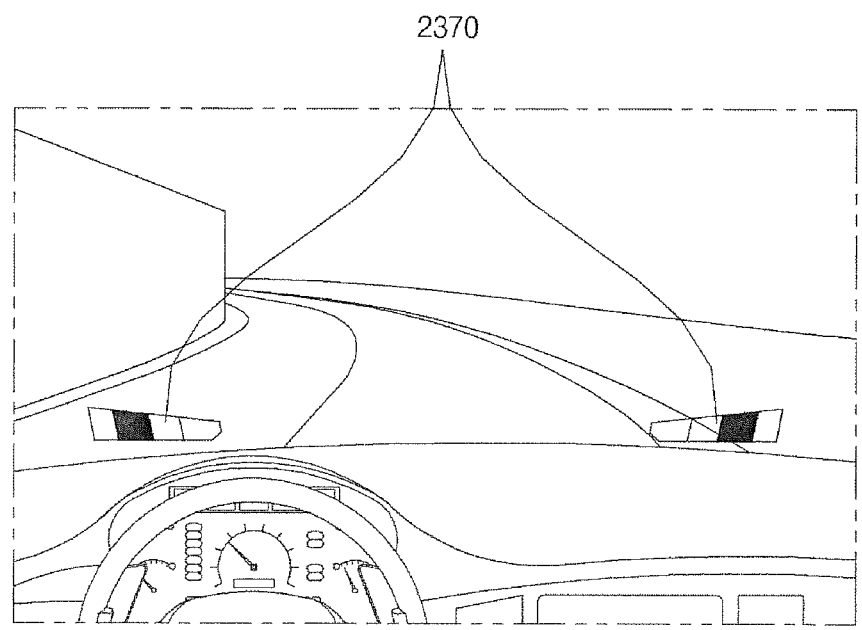

Referring to FIG. 23K, the processor 470 may control the display 441 to display an image 2370 corresponding to information on operation of the headlamp. The processor 470 may receive the information on operation of the headlamp from the controller 770 through the interface 480. When the headlamp is composed of a plurality of lamp modules, the information on operation of the headlamp may be on/off information of each lamp module according to the location of a vehicle on the opposite lane or a preceding vehicle.

The processor 470 may display the image 2370 corresponding to information on a turn-on lamp module and a turn-off lamp module from among the plurality of lamp modules in a region of the windshield.

Figure 23L:
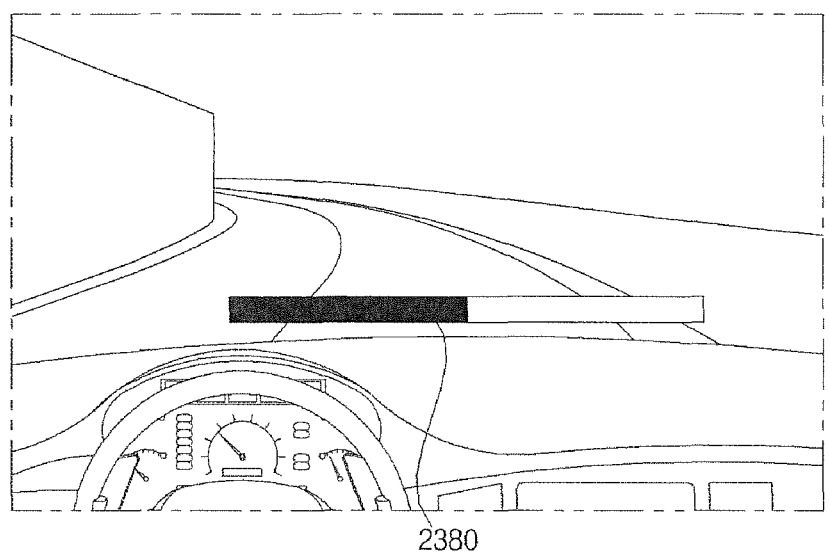

Referring to FIG. 23l, the processor may control the display 441 to display an image 2380 corresponding to information on a distance to a destination. The processor 470 may display a bar in a first color, which corresponds to a route from a departure point to a destination, and control the bar to be changed to a second color as the vehicle 700 approaches the destination. In this case, a region of the bar, displayed in the first color, can correspond to a remaining distance and a region of the bar, displayed in the second color, can correspond to a distance traveled.

Figure 24A:
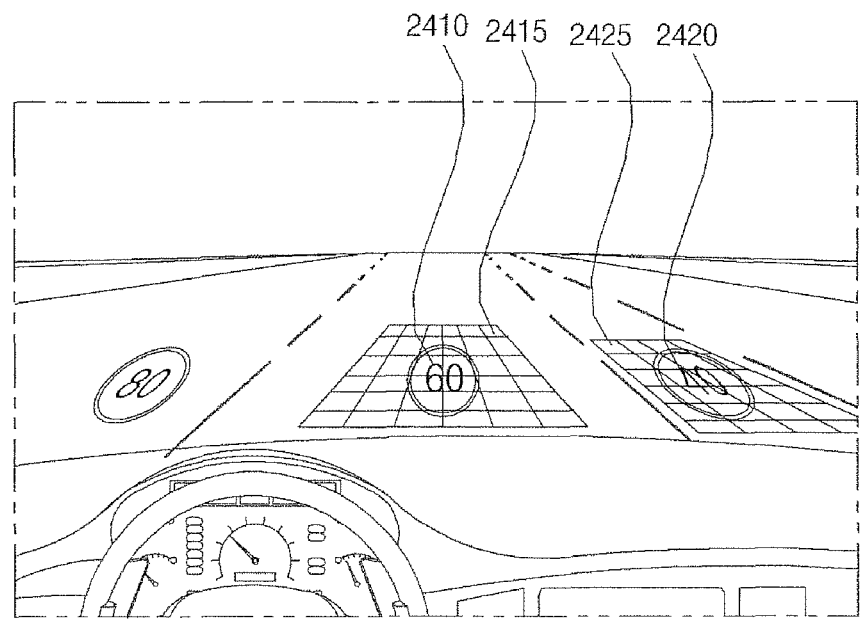
FIGS. 24A and 24B are diagrams illustrating examples of an information display operation according to some implementations.
Figure 24B:
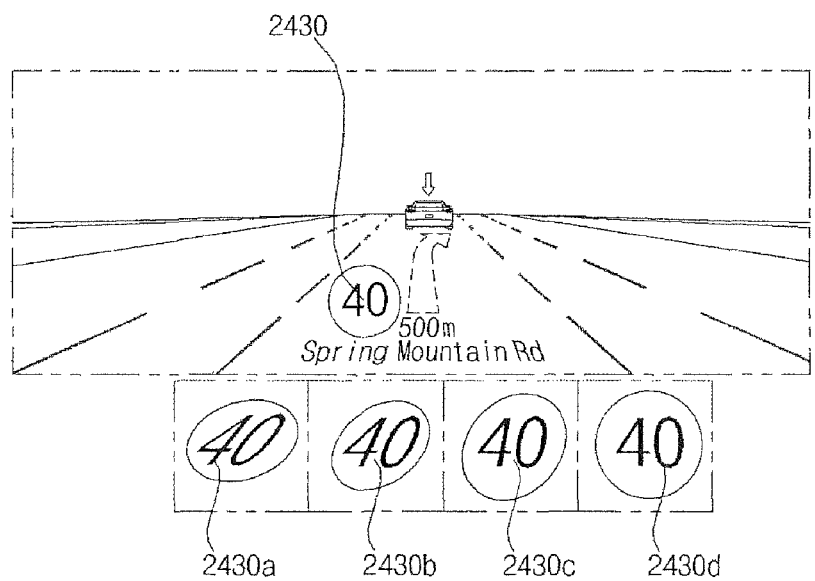

FIGS. 24A and 24B are views explaining examples of an information display operation.

Referring to FIG. 24A, the processor 470 may control the display 441 to display a first image 2410 in a first region of the windshield, which corresponds to the lane in which the vehicle is being driven. The processor 470 may control the display 441 to display second images 2420 and 2430 in a second region of the windshield, which corresponds to lanes other than the lane in which the vehicle is being driven. The processor 470 may display the first image and the second image in different shapes or different colors.

For example, the processor 470 can control the display 441 to display the first image 2410 at a predetermined angle to the plane 2415 including the lane in which the vehicle is being driven. In this case, the processor 470 can control the display 441 to display the second image 2420 on the same plane 2425 as that including a lane other than the lane in which the vehicle is being driven.

When an image displayed corresponding to the lane in which the vehicle is being driven and an image displayed corresponding to a lane other than the lane in which the vehicle is being driven are displayed differently, the user can clearly recognize the image displayed corresponding to the lane in which the vehicle is being driven.

The first image may correspond to first information and the second image may correspond to second information different from the first information. That is, the processor 470 can display different pieces of information in the first region and the second region. For example, the processor 470 can display speed limit information in the first region and display information on a high occupancy vehicle lane operation time in the second region.

Referring to FIG. 24B, the processor 470 may control the display 441 to display a first image 2430 in the first region of the windshield, which corresponds to the lane in which the vehicle is being driven. The processor 470 may control the display 441 to display the first image 2410 at a predetermined angle to the plane 2415 including the lane in which the vehicle is being driven.

The processor 470 may change and display the predetermined angle by applying animation effects thereto. The processor 470 can change the predetermined angle over time. For example, the processor 470 can gradually increase the predetermined angle over time.

The processor 470 may change the predetermined angle depending on a distance between the vehicle and a predetermined point. For example, when the vehicle 700 is being driven on a road along which speed cameras are set, the processor 470 can gradually increase the predetermined angle as the vehicle 700 approaches a speed camera.

When the predetermined angle between the first image 2410 and the plane 2415 is changed, concentration of the user on the first image 2410 is increased and thus important information can be successfully transmitted to the user.

In addition, the processor 470 may control the display 441 to display the first image or the second image at a predetermined angle to the plane including the lane in which the vehicle is being driven or the plane including a lane other than the lane, according to importance.

The importance may be predetermined. For example, when the vehicle 700 is driven on an expressway, importance of speed limit information can be set to a highest level. When the vehicle 700 is driven on a city street, importance of school zone information can be set to a highest level.

Figure 25A:
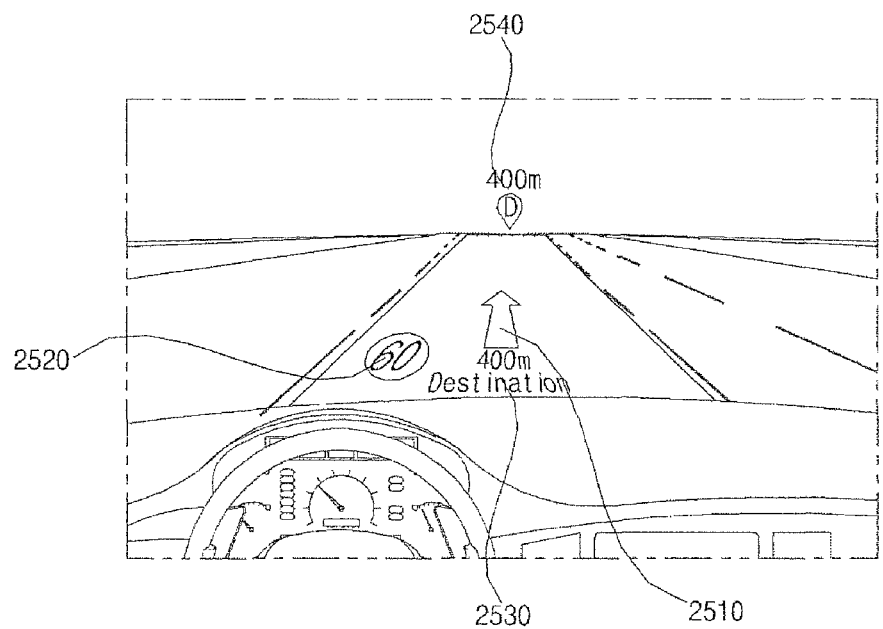
FIGS. 25A to 25C are diagrams illustrating examples of an image display operation in a scenario in which a destination of a vehicle is predetermined according to some implementations.
Figure 25B:
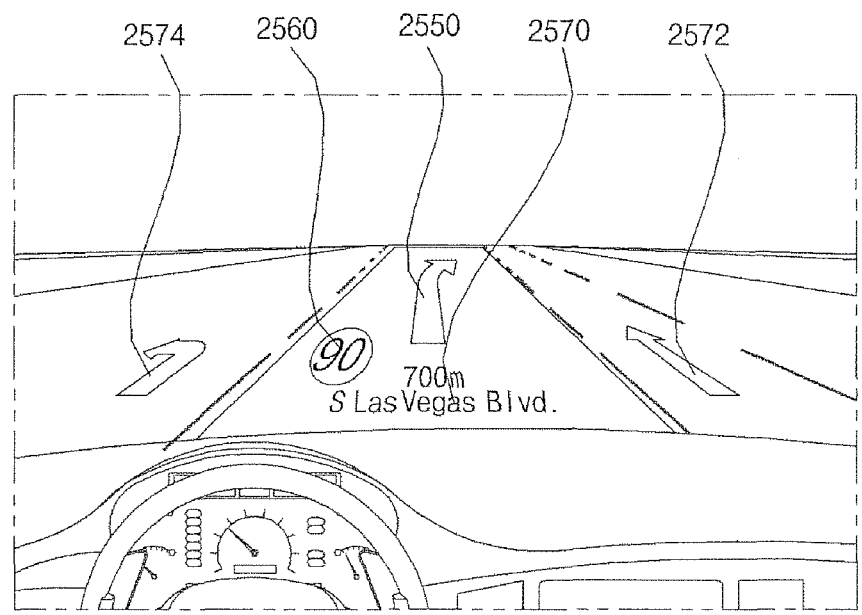
Figure 25C:
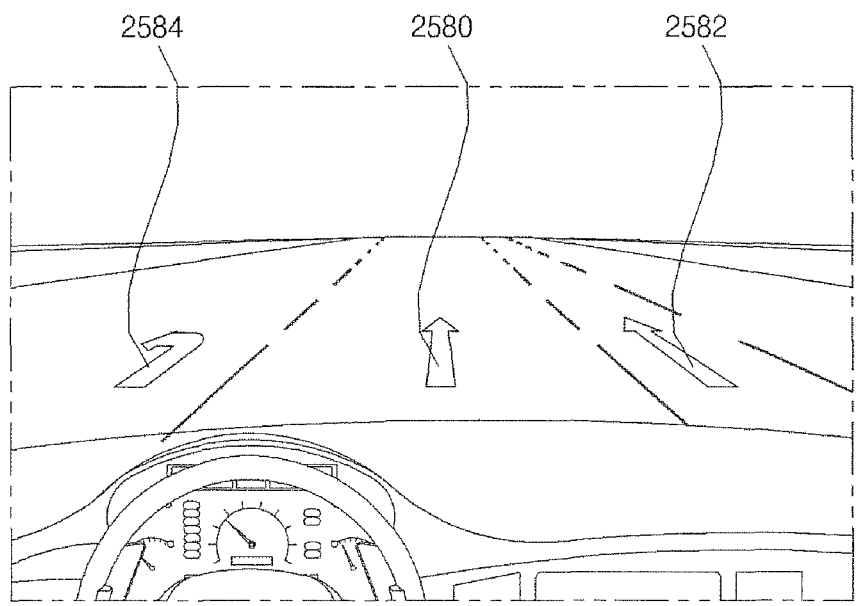

FIGS. 25A to 25C are views explaining examples of an image display operation when a destination is preset.

FIGS. 25A and 25B show a case in which a destination is set and FIG. 25C shows a case in which a destination is not set.

A destination can be set according to user input while the navigation function is being executed. When the destination is set, the processor 470 may control the display 441 to respectively display a first image and a second image in a first region and a second region of the windshield in different shapes or different colors. Here, the first region may be a region of the windshield, which corresponds to the lane in which the vehicle is being driven, and the second region may be a region of the windshield, which corresponds to a lane other than the lane in which the vehicle is being driven.

Referring to FIG. 25A, the processor 470 may control the display 441 to display a TBT image 2510, an image 2520 corresponding to speed limit information and an image 2530 corresponding to destination information in the first region. In this case, the processor 470 may not display an image in the second region.

In this manner, an image corresponding to information is displayed only in the first region corresponding to the lane in which the vehicle is being driven so as to prevent the concentration of the user from being dispersed, thereby promoting safe driving.

The processor 470 may control the display 441 to display an image 2540 corresponding to the destination at a region of the windshield, which corresponds to the destination.

Referring to FIG. 25B, the processor 470 may control the display 441 to display a TBT image 2550, an image 2560 corresponding to speed limit information and an image 2570 corresponding to destination information in the first region. Here, the processor 470 may control the display 441 to display images 2572 and 2574 corresponding to lane information in the second region.

The processor 470 may control the display 441 to respectively display images corresponding to different pieces of information in the first region and the second region.

When a destination is not set, the processor 470 may display images corresponding to the same information in the same form in the first region and the second region, as shown in FIG. 25C.

Figure 26:
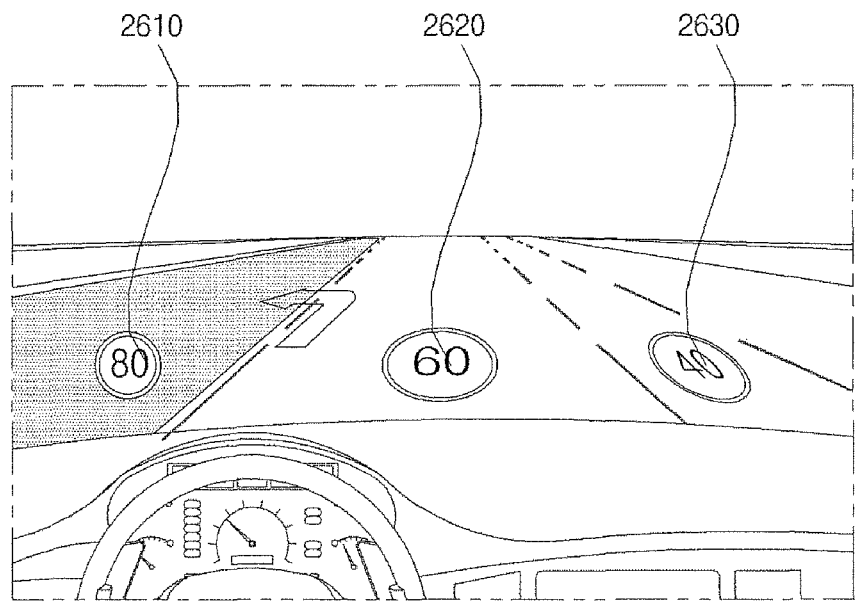
FIG. 26 is a diagram illustrating an example of an operation of displaying an image in a region of a windshield of a vehicle, the image corresponding to a lane to be changed to according to some implementations.

FIG. 26 is a view explaining an example of an operation of displaying an image in a region of the windshield, the image corresponding to a lane to be changed to.

Referring to FIG. 26, the processor 470 may control the display 441 to display images 2610, 2620 and 2630 corresponding to information.

The processor 470 may respectively display a first image and a second image in a first region and a second region of the windshield in different shapes or different colors. Here, the first region may be a region of the windshield, which corresponds to a lane to be changed to. For example, the first region may be a region of the windshield, which meets a line connecting the eyes of the user and the lane to be changed to. The second region may be a region of the windshield, which corresponds to a lane other than the lane to be changed to. For example, the second region may be a region of the windshield, which meets a line connecting the eyes of the user and a lane other than the lane to be changed to.

For example, the processor 470 can control the display 441 to display the first image 2610 at a predetermined angle to the plane corresponding to the lane in which the vehicle is being driven. In this case, the processor 470 can control the display 441 to display the second image 2620 on the same plane as that corresponding to a lane other than the lane in which the vehicle is being driven.

Figure 27A:
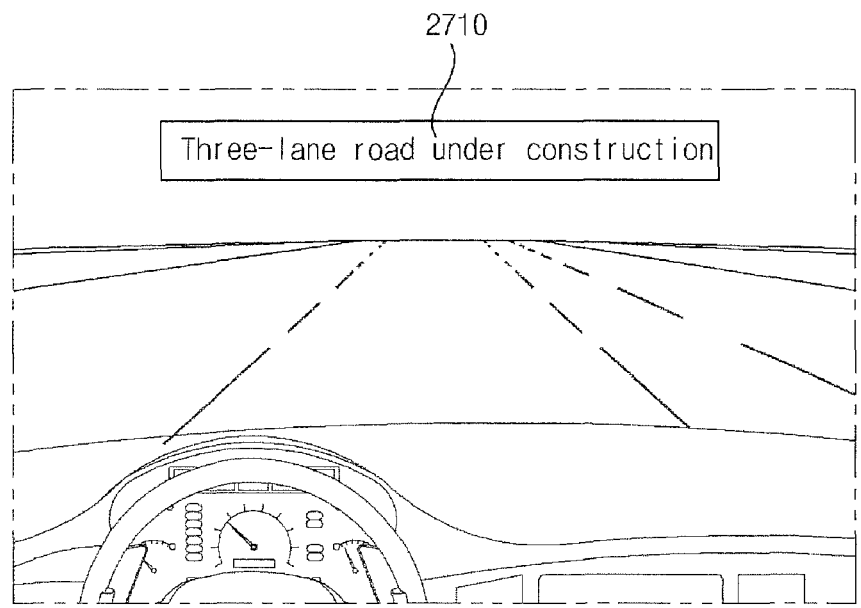
FIGS. 27A to 27C are diagrams illustrating examples of an operation of changing a route of the vehicle based on traffic information received through a driver assistance apparatus according to some implementations.
Figure 27B:
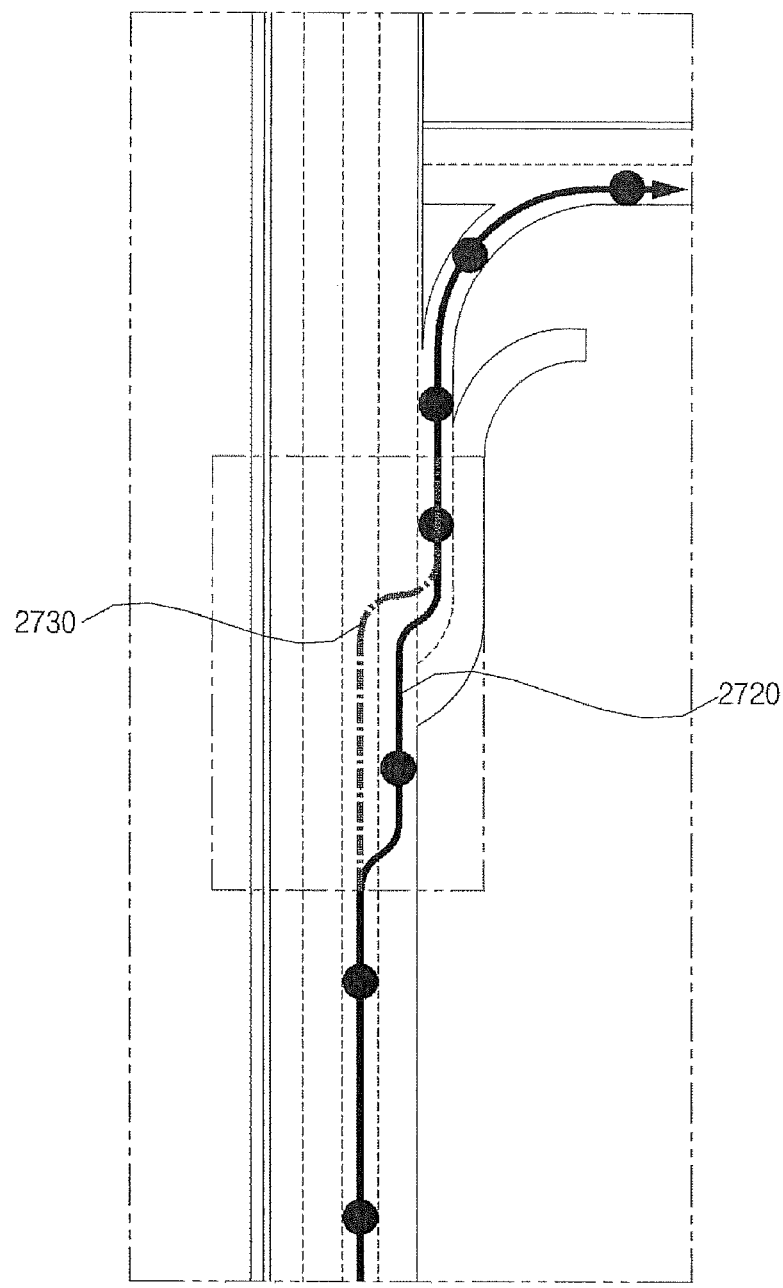
Figure 27C:
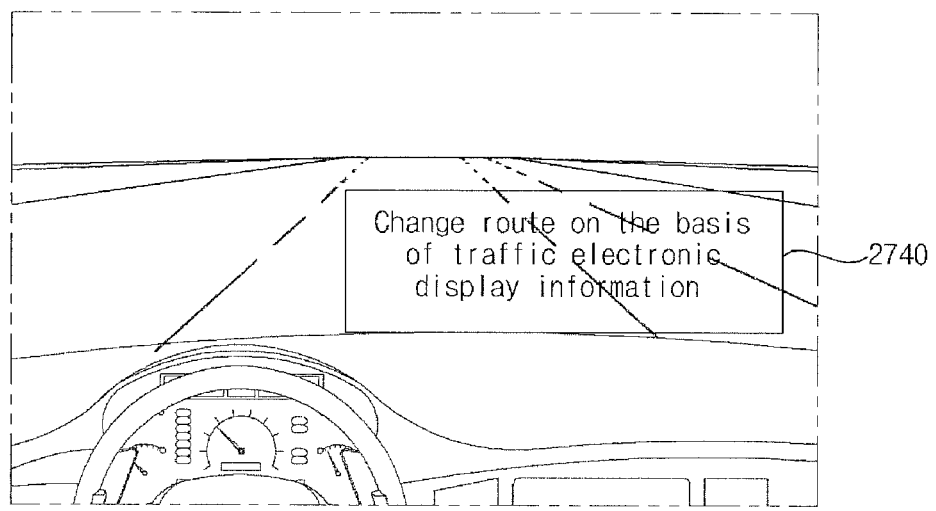

FIGS. 27A to 27C are views explaining examples of operations of changing a route on the basis of traffic information received from a driver assistance apparatus.

Referring to FIG. 27A, the driver assistance apparatus 100 may acquire a front view image or an around view image of the vehicle. The front view image or around view image of the vehicle may include an image of a traffic light, a road sign, a traffic electronic signboard or a road surface.

The vehicle deriving assistance device 100 may detect traffic information from the image of a traffic light, a road sign, a traffic electronic signboard or a road surface. Here, the traffic information may include traffic accident information, construction information, road congestion information and extra lane information.

The processor 470 may receive the traffic information from the driver assistance apparatus 100 through the interface 480.

FIG. 27A shows that a traffic electronic signboard 2710 displays construction information. In this case, the driver assistance apparatus 100 detects the construction information from the traffic electronic signboard image and the processor 470 receives the construction information.

Referring to FIG. 27B, the processor 470 may change the current route on the basis of the received traffic information. For example, the processor 470 can change the current route to a route that takes a minimum time on the basis of traffic accident information, construction information, road congestion information or extra lane information.

In FIG. 27B, when construction is underway on the current route 2720, the processor 470 changes the current route 2720 to a route 2730 on which construction is not underway.

In addition, the processor 470 may control the display 441 to match a TBT image to a point corresponding to the lane in which the vehicle is being driven and to display the TBT image on the changed route.

When the route is changed on the basis of traffic information received from the driver assistance apparatus 100, the processor 470 may control the display 441 to display a route change event 2740, as shown in FIG. 27C.

Figure 28A:
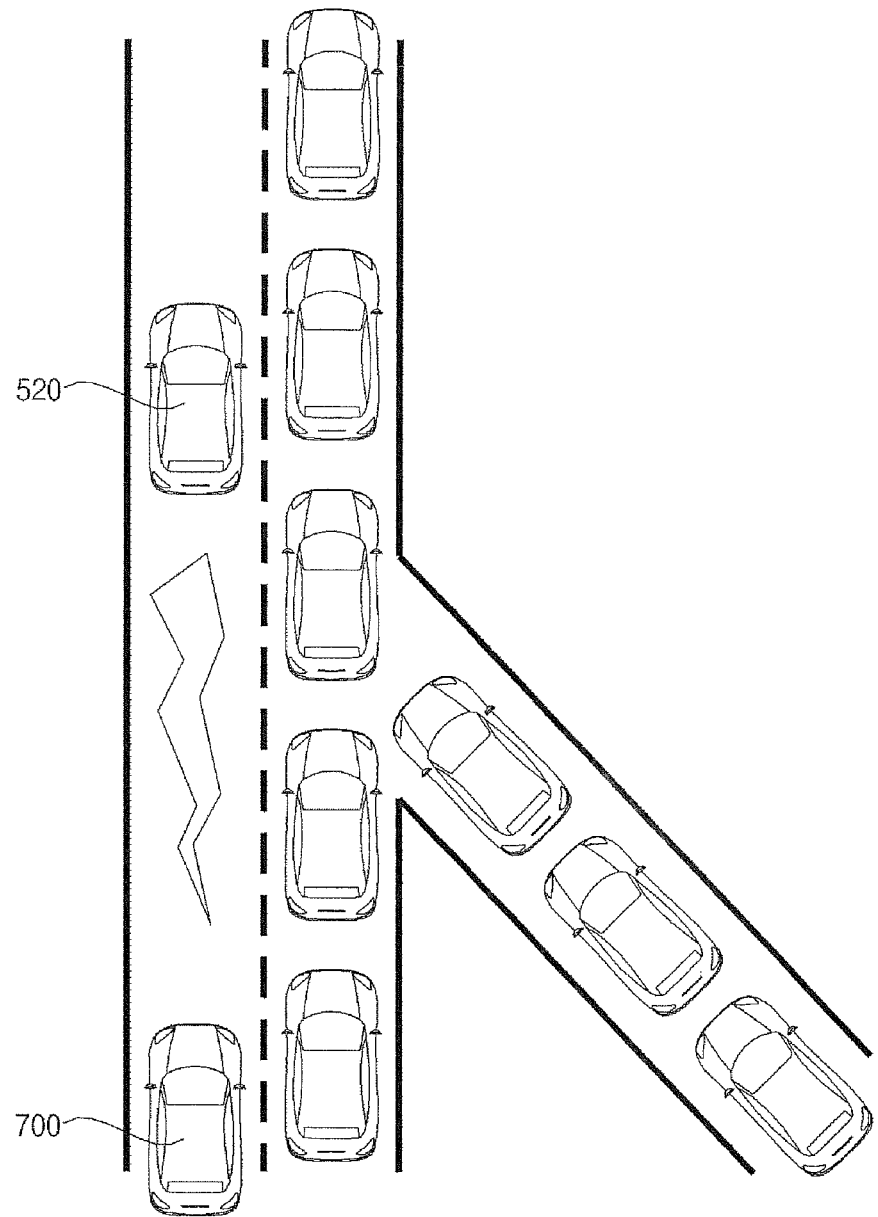
FIGS. 28A to 28C are diagrams illustrating examples of an operation of changing a route of a vehicle based on traffic information received from other vehicles according to some implementations.
Figure 28B:
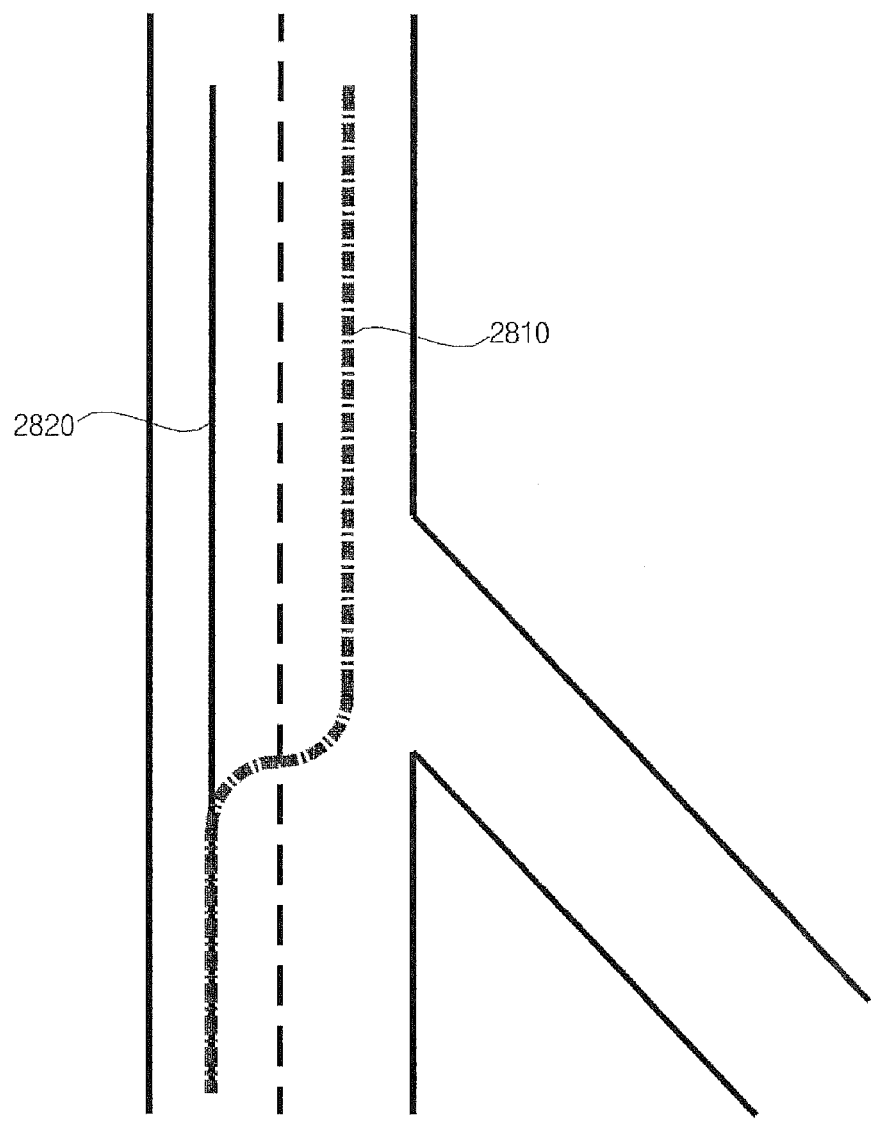
Figure 28C:
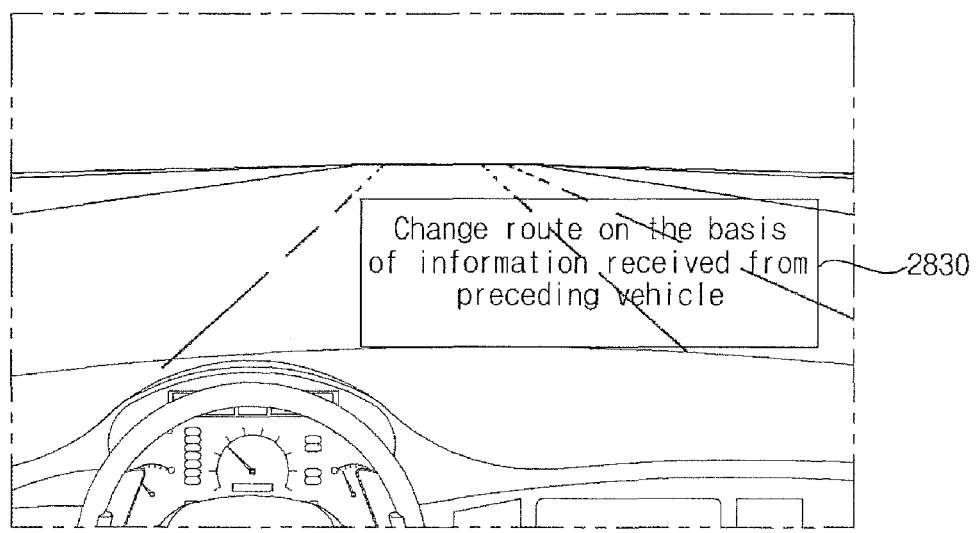

FIGS. 28A to 28C are views explaining examples of operations of changing a route on the basis of traffic information received from other vehicles.

Referring to FIG. 28A, the processor 470 may receive traffic information from the other vehicle 510 through the communication unit 410. Here, the traffic information may include traffic accident information, construction information, road congestion information and extra lane information. The other vehicle 510 may be a preceding vehicle. The other vehicle 510 can acquire traffic information through various sensors (e.g. a camera) while being driven.

FIG. 28A shows that the other vehicle 510 acquires road congestion information. The processor 470 receives the road congestion information.

Referring to FIG. 28B, the processor 470 may change the current route on the basis of the received traffic information. For example, the processor 470 can change the current route to a route that takes a minimum time on the basis of traffic accident information, construction information, road congestion information or extra lane information.

In FIG. 28B, when the current route 2720 is congested, the processor 470 changes the current route 2720 to a route 2820 that is not congested.

In addition, the processor 470 may control the display 441 to match a TBT image to a point corresponding to the lane in which the vehicle is being driven and to display the TBT image on the changed route.

When the route is changed on the basis of traffic information received from the other vehicle 510, the processor 470 may control the display 441 to display a route change event 2830, as shown in FIG. 28C.

Figure 29A:
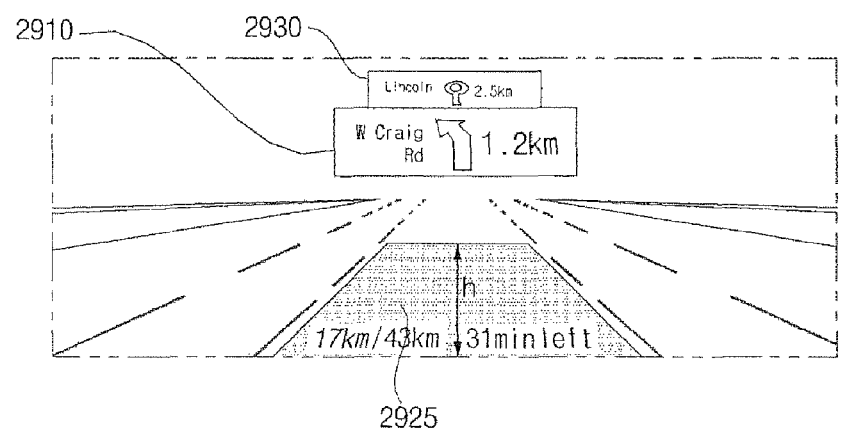
FIGS. 29A and 29B are diagrams illustrating examples of an operation of displaying a TBT image according to some implementations.
Figure 29B:
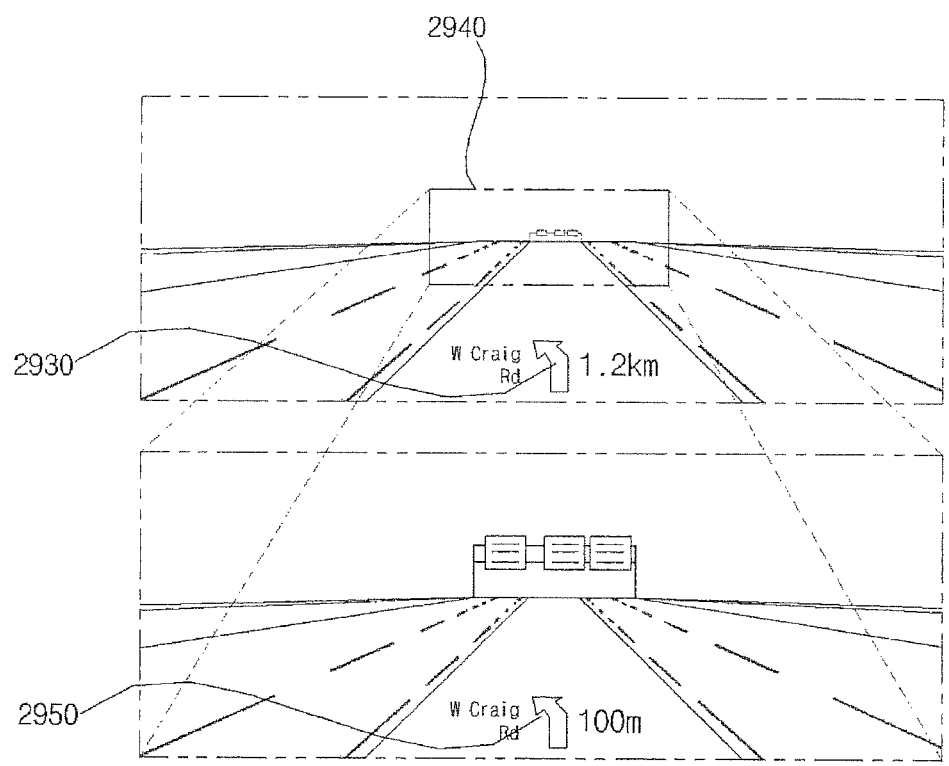

FIGS. 29A and 29B are views explaining examples of operations of displaying a TBT image.

Referring to FIG. 29A, the processor 470 may control the display 441 to display a plurality of TBT images. The processor 470 may control the display 441 to display the plurality of TBT images in three dimensions.

For example, the processor 470 can display a first TBT image 2910 in a region of the windshield. Here, the first TBT image 2910 can indicate direction information at a first change point closest to the current position of the vehicle 700 on the route.

While the first TBT image 2910 is displayed, the processor 470 may display a second TB2T image 2920 around the first TBT image 2910. Here, the processor 470 may display the second TBT image 2920 smaller than the first TBT image 2910. In this case, perspective is applied to the second TBT image 2920 and thus the second TBT image 2920 appears farther from the current position of the vehicle than the first TBT image 2910. That is, the first and second TBT images 2910 and 2920 are displayed in three dimensions. The second TBT image 2920 can indicate direction information at a second change point second-closest to the current position of the vehicle 700 on the route.

As the vehicle 700 is driven, the vehicle 700 gradually approaches the first and second change points. In this case, the processor 470 can control the display 441 to gradually change the sizes, colors or transparency of the first and second TBT images 2910 and 2920.

Accordingly, it is possible to provide more intuitive road guidance to the user and to enable the user to recognize a vehicle direction change point without seeing numerical information by displaying TBT images.

In addition, when a destination is set, the processor 470 may control the display 441 to display an image 2925 corresponding to a total distance from the departure point to the destination, a distance between the current position and the destination and estimated time taken to arrive at the destination in a region of the windshield. In this case, the processor 470 may display a graph image in a region of the windshield, which corresponds to the lane in which the vehicle is being driven. The graph image may be matched to the region of the windshield, which corresponds to the lane in which the vehicle is being driven. The processor 470 may control the display 441 to change the height h of the graph image in response to the remaining distance to the destination. For example, the processor 470 can change the height h of the graph image in such a manner that the height h decreases as the remaining distance to the destination decreases.

Referring to FIG. 29B, the processor 470 may control the display 441 to change the sizes of TBT images 2930 and 2950.

The processor 470 may display the TBT image 2930 indicating direction information at a change point. When the vehicle 700 is a first distance from the change point, the processor 470 can display the TBT image 2930 in a first size. When the vehicle 700 becomes spaced apart from the change point by a second distance as the vehicle 700 moves, the processor 470 can display the TBT image 2950 in a second size.

The second size may be greater than the first size. In this manner, a TBT image can be displayed in different sizes according to distance variation so as to enable the user to intuitively recognize approach to a change point.

The screen illustrated in the lower part of FIG. 29B is a screen displayed when the vehicle 700 arrives at a point 2940 in the screen shown in the upper part of FIG. 29B.

Figure 30A:
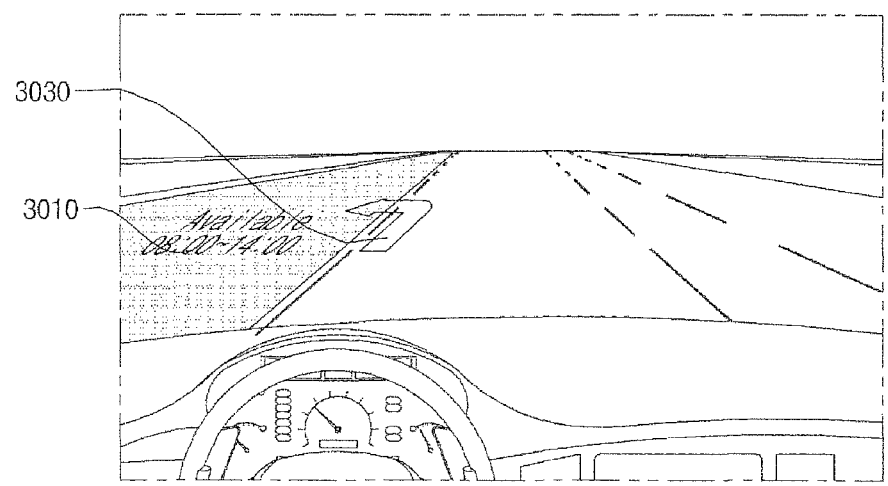
FIGS. 30A and 30B are diagrams illustrating examples of an operation of displaying an image corresponding to high-occupancy vehicle lane information according to some implementations.
Figure 30B:
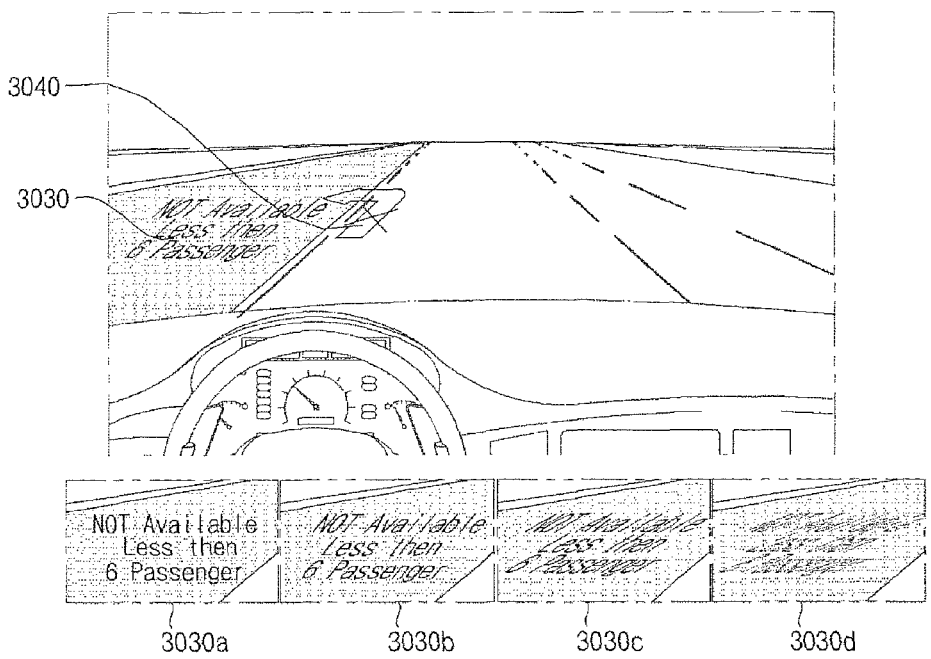

FIGS. 30A and 30B are views explaining examples of operations of displaying an image corresponding to high occupancy vehicle lane information.

Referring to FIG. 30A, the processor 470 may display an image 3010 corresponding to high occupancy vehicle lane information in a region of the windshield, which corresponds to a high occupancy vehicle lane. Here, the region of the windshield may be a part of the windshield, which meets a line connecting the eyes of the user and the high occupancy vehicle lane.

The high occupancy vehicle lane information may be acquired on the basis of the map data stored in the memory 430. Alternatively, the processor 470 may receive the high occupancy vehicle lane information from the driver assistance apparatus 100 through the interface 480. The driver assistance apparatus 100 may detect the high occupancy vehicle lane information from images of road surfaces and traffic signs, which are included in a front view image or an around view image of the vehicle.

The high occupancy vehicle lane information may include information on high occupancy vehicle lane operation time.

The processor 470 may control the display 441 to display whether the vehicle can enter the high occupancy vehicle lane on the basis of the information on high occupancy vehicle lane operation time. In this case, the processor 470 may display whether the vehicle can enter the high occupancy vehicle lane as a TBT image 3020.

If the vehicle can enter the high occupancy vehicle lane, the processor 470 can display a region of the windshield, which corresponds to the high occupancy vehicle lane, in a first color. Here, the first color may be green as a color indicating that the vehicle can enter the high occupancy vehicle lane to the user.

Referring to FIG. 30B, the processor 470 may receive passenger information from the internal camera 195c through the interface 480. The passenger information may be information on the number of passengers.

The processor 470 may control the display 441 to display whether the vehicle can enter the high occupancy vehicle lane on the basis of the received passenger information. In this case, the processor 470 may display whether the vehicle can enter the high occupancy vehicle lane as a TBT image 2040.

If the number of passengers is small and thus the vehicle cannot enter the high occupancy vehicle lane, the processor 470 can display a region of the windshield, which corresponds to the high occupancy vehicle lane, in a second color. Here, the second color may be red as a color indicating that the vehicle cannot enter the high occupancy vehicle lane to the user.

The high occupancy vehicle lane information may include information on a minimum number of passengers, which is necessary to use the high occupancy vehicle lane.

In addition, the processor 470 may control the display 441 to display an image 3030 corresponding to the high occupancy vehicle lane information at a predetermined angle to the plane corresponding to the high occupancy vehicle lane. Here, the processor 470 may display the image 3030 in such a manner that the predetermined angle between the image 3030 and the plane including the high occupancy vehicle lane is changed (3030a, 3030b, 3030c and 3030d) over time.

Implementations described herein may be implemented as code that can be written to a computer-readable recording medium and can thus be read by a computer. The computer-readable recording medium may be any type of recording device in which data can be stored in a computer-readable medium. Examples of the computer-readable recording medium include a HDD (Hard Disc Drive), an SSD (Solid State Disc), an SDD (Silicon Disc Drive), a ROM, a RAM, a CD-ROM, a magnetic tape, a floppy disk, optical data storage, and a carrier wave, e.g., data transmission over the Internet. The computer may include the processors 170 and 470 or the controller 770. Although the examples above have been disclosed for illustrative purposes, various modifications, additions and substitutions may be implemented.

What is claimed is:

1. A driver assistance apparatus, comprising:
   an interface configured to receive first navigation information generated based on GPS information of the vehicle;
   a camera configured to acquire an image of a view ahead of the vehicle; and
   at least one processor configured to:
      detect an object in the acquired image of the view ahead of the vehicle;
      determine, based on the object detected in the acquired image, a driving situation of the vehicle;
      determine whether the driving situation of the vehicle is consistent with the first navigation information that was generated based on the GPS information; and
      based on a determination that the driving situation of the vehicle is not consistent with the first navigation information:
         generate, based on the driving situation of the vehicle, second navigation information of the vehicle, and provide the second navigation information to an output unit,
   wherein the at least one processor is configured to determine that the driving situation of the vehicle is not consistent with the first navigation information by:
      determining, based on the object detected in the acquired image, that the driving situation of the vehicle corresponds to the vehicle travelling on a road with a second elevation that is different from a first elevation of a road indicated by the first navigation information.

2. The driver assistance apparatus of claim 1, wherein the at least one processor is configured to determine the driving situation of the vehicle by:
   determining, based on the object detected in the image of the view ahead of the vehicle, information regarding at least one of a traffic signal, a surface of the road on which the vehicle is travelling, a structure located around the road, or a moving object; and
   determining the driving situation of the vehicle based on the determined information regarding at least one of the traffic signal, the surface of the road on which the vehicle is travelling, the structure located around the road, or the moving object.

3. The driver assistance apparatus of claim 1, wherein the at least one processor is configured to determine that the driving situation of the vehicle is not consistent with the first navigation information by:
   determining that the first navigation information indicates that the vehicle is travelling on a first type of road;
   determining, based on the object detected in the acquired image, that the driving situation of the vehicle corresponds to the vehicle travelling on a second type of road; and
   determining that the second type of road is not consistent with the first type of road.

4. The driver assistance apparatus of claim 3, wherein determining that the driving situation of the vehicle corresponds to the vehicle travelling on the second type of road comprises:
   detecting, in the acquired image, at least one of a traffic light, a pedestrian, a two-wheeled vehicle, a crosswalk, a curb, a road sign, a road surface, or a speed limit sign.

5. The driver assistance apparatus of claim 3, wherein determining that the driving situation of the vehicle corresponds to the vehicle travelling on the second type of road comprises:
   detecting that the vehicle is travelling on an on-ramp entering a highway; and
   determining, based on detecting that the vehicle is travelling on the on-ramp entering the highway, that the driving situation of the vehicle corresponds to the vehicle travelling on a highway.

6. The driver assistance apparatus of claim 3, wherein determining, based on the object detected in the acquired image, that the driving situation of the vehicle corresponds to the vehicle travelling on the second type of road comprises:
   detecting that the vehicle is travelling on an off-ramp exiting a highway; and
   determining, based on detecting that the vehicle is travelling on the off-ramp exiting the highway, that the driving situation of the vehicle corresponds to the vehicle travelling on a local road.

7. The driver assistance apparatus of claim 1, wherein the at least one processor is configured to determine that the driving situation of the vehicle corresponds to the vehicle travelling on the road with the second elevation by:
   detecting, in the acquired image, at least one of a traffic light, a pedestrian, a two-wheeled vehicle, a crosswalk, a curb, a pillar, a shadow, a road sign, or a road surface.

8. The driver assistance apparatus of claim 7, wherein determining that the driving situation of the vehicle corresponds to the vehicle travelling on a road with a second elevation that is different from a first elevation of a road indicated by the first navigation information comprises:
   detecting, based on the object detected in the acquired image, that the vehicle is travelling on an inclined road; and
   determining, based on the detection that the vehicle is travelling on an inclined road, that the driving situation of the vehicle corresponds to the vehicle travelling on the road with the second elevation that is different from the first elevation of the road indicated by the first navigation information.

9. The driver assistance apparatus of claim 1, wherein the at least one processor is configured to determine that the driving situation of the vehicle is not consistent with the first navigation information by:
   determining, based on the first navigation information, that the vehicle is travelling on one of an outdoor road or a tunnel; and
   determining, based on the object detected in the acquired image, that the driving situation of the vehicle corresponds to the vehicle travelling on the other of the outdoor road or the tunnel.

10. The driver assistance apparatus of claim 9, wherein determining that the driving situation of the vehicle corresponds to the vehicle travelling on the other of the outdoor road or the tunnel comprises:
  detecting, in the acquired image, at least one of a traffic light, a pedestrian, a two-wheeled vehicle, a crosswalk, a curb, lighting provided to the underground roadway, a traffic sign indicating entry into the underground roadway, an overhead clearance sign, a structure constituting the underground roadway, a road sign, or a road surface.

11. The driver assistance apparatus of claim 9, wherein determining that the driving situation of the vehicle corresponds to the vehicle travelling on the other of the outdoor road or the tunnel comprises:
  determining that the first information has not been received; and
  based on the determination that first information has not been received, determining that the driving situation of the vehicle corresponds to the vehicle travelling in the tunnel.

12. The driver assistance apparatus of claim 1, wherein the at least one processor is configured to determine that the driving situation of the vehicle is not consistent with the first navigation information by:
  determining a direction of travel of the vehicle;
  determining, based on the object detected in the acquired image, that the vehicle is travelling on a one-way road; and
  determining, based on the direction of travel of the vehicle and the determination that the vehicle is travelling on the one-way road, that the driving situation of the vehicle corresponds to a wrong-way driving situation.

13. The driver assistance apparatus of claim 12, wherein determining that the vehicle is travelling on a one-way road comprises detecting, in the acquired image, at least one of a traffic light, a traffic sign, a road surface, or a neighboring parked vehicle.

14. The driver assistance apparatus of claim 12, wherein the at least one processor is further configured to, based on the determination that the driving situation of the vehicle corresponds to a wrong-way driving situation, provide a signal to perform an alarm output or a braking operation of the vehicle.

15. The driver assistance apparatus of claim 1, wherein the at least one processor is configured to provide the second navigation information to an output unit by:
  determining that the first information has not been received; and
  providing, to the output unit and based on the determination that the first information has not been received, the second information.

16. The driver assistance apparatus of claim 15, wherein the at least one processor is configured to generate second navigation information of the vehicle by:
  determining that the vehicle is traveling indoors;
  detecting, based on the determination that the vehicle is traveling indoors, a direction sign in the acquired image; and
  generating the second navigation information based on the direction sign detected in the acquired image.

17. The driver assistance apparatus of claim 15, wherein the at least one processor is configured to generate second navigation information of the vehicle by:
  detecting that the vehicle has traveled from an indoor space to an outdoor space;
  detecting, in the acquired image, at least one of a road sign, a building, or a direction sign; and
  generating the second navigation information based on the detected at least one of the road sign, the building, or the direction sign.

18. A display apparatus for a vehicle, comprising:
  a display;
  a position information module configured to provide GPS information of the vehicle;
  an interface configured to receive second navigation information indicating a position of the vehicle, the second navigation information being generated based on a driving situation of the vehicle determined from an image acquired of a view ahead of the vehicle; and
  at least one processor configured to:
    determine whether the second navigation information has been received;
    based on a determination that the second navigation information has been received, include the second navigation information in a map and provide a navigation function with the map including the second navigation information; and
    based on a determination that the second navigation information has not been received, generate first navigation information of the vehicle based on the GPS information received through the position information module, include the first navigation information in the map, and provide the navigation function with the map including the first navigation information,
  wherein the at least one processor is further configured to:
    determine whether the first navigation information or the second navigation information is included in the map;
    based on a determination that the first navigation information is included in the map, display a first image corresponding to the first navigation information in a region of the display; and
    based on a determination that the first navigation information is included in the map, display a second image corresponding to the second navigation information in the region of the display.

19. The display apparatus for a vehicle of claim 18, wherein the at least one processor is configured to:
  determine that information applied to the map is changed from the first navigation information to the second navigation information; and
  based on the determination that the information applied to the map is changed from the first navigation information to the second navigation information, change a display of the first image to a display of the second image.

20. The display apparatus for a vehicle of claim 19, wherein the at least one processor is configured to change a display of the first image to a display of the second image by:
  displaying the first image to gradually become faint and displaying the second image to gradually become distinct over time.

21. The display apparatus for a vehicle of claim 18, further comprising a display, wherein the at least one processor is configured to include the second navigation information in the map by:
  determining a location on the map based on the position of the vehicle indicated by the second navigation information; and displaying, on the display, the map including the position of the vehicle indicated by the second navigation information.

22. The display apparatus for a vehicle of claim 21, wherein the at least one processor is further configured to display, on the display, a route generated based on the position of the vehicle indicated by the second navigation information.

23. The display apparatus for a vehicle of claim 22, wherein the at least one processor is further configured to determine that the position of the vehicle indicated by the second navigation information is an indoor position.

\* \* \* \* \*